(12) United States Patent
Taguchi et al.

(10) Patent No.: US 7,776,144 B2
(45) Date of Patent: *Aug. 17, 2010

(54) INK AND INK SET FOR INKJET RECORDING

(75) Inventors: Toshiki Taguchi, Tokyo (JP); Takashi Ozawa, Shizuoka (JP); Manabu Ogawa, Shizuoka (JP); Naotaka Wachi, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 789 days.

This patent is subject to a terminal disclaimer.

(21) Appl. No.: 10/576,941

(22) PCT Filed: Oct. 22, 2004

(86) PCT No.: PCT/JP2004/016059

§ 371 (c)(1),
(2), (4) Date: Mar. 19, 2007

(87) PCT Pub. No.: WO2005/040292

PCT Pub. Date: May 6, 2005

(65) Prior Publication Data

US 2007/0266890 A1    Nov. 22, 2007

(30) Foreign Application Priority Data

| Oct. 23, 2003 | (JP) | 2003-363727 |
| Oct. 23, 2003 | (JP) | 2003-363728 |
| Oct. 23, 2003 | (JP) | 2003-363883 |

(51) Int. Cl.
C09D 11/02 (2006.01)

(52) U.S. Cl. .............. 106/31.46; 106/31.47; 106/31.48; 106/31.5; 106/31.52

(58) Field of Classification Search .............. 106/31.46, 106/31.47, 31.48, 31.5, 31.52
See application file for complete search history.

(56) References Cited

U.S. PATENT DOCUMENTS

| 7,083,668 B2 * | 8/2006 | Taguchi et al. ........... 106/31.46 |
| 7,175,268 B2 * | 2/2007 | Taguchi ..................... 347/100 |
| 7,273,519 B2 * | 9/2007 | Taguchi et al. ........... 106/31.46 |
| 7,303,272 B2 * | 12/2007 | Taguchi et al. ........... 106/31.46 |
| 7,323,045 B2 * | 1/2008 | Hanmura et al. .......... 106/31.47 |
| 7,462,228 B2 * | 12/2008 | Ohno et al. ............... 106/31.52 |
| 7,520,928 B2 * | 4/2009 | Ikeda et al. ............... 106/31.52 |
| 2002/0107301 A1 | 8/2002 | Yamanouchi et al. |
| 2003/0159617 A1 | 8/2003 | Nishita et al. |
| 2004/0050291 A1 * | 3/2004 | Taguchi et al. ........... 106/31.48 |
| 2007/0109376 A1 * | 5/2007 | Tojo et al. .................... 347/100 |

FOREIGN PATENT DOCUMENTS

| EP | 1548073 A1 | 6/2005 |
| JP | 2002-309133 A | 10/2002 |
| JP | 2003-128953 A | 5/2003 |
| JP | 2003-221234 A | 8/2003 |
| JP | 2003-221534 A | 8/2003 |
| JP | 2004-75959 A | 3/2004 |
| JP | 2004-115620 A | 4/2004 |
| JP | 2004-115702 A | 4/2004 |
| JP | 2004-115703 A | 4/2004 |
| JP | 2004-123771 A | 4/2004 |
| JP | 2004-123772 A | 4/2004 |
| JP | 2004-123804 A | 4/2004 |
| JP | 2004-123824 A | 4/2004 |
| JP | 2004-123826 A | 4/2004 |
| JP | 2004-168865 A | 6/2004 |
| WO | 00/36030 A1 | 6/2000 |
| WO | WO 03/068872 | * 8/2003 |
| WO | WO 2004/029166 | * 4/2004 |
| WO | WO 2004/078860 | * 9/2004 |

OTHER PUBLICATIONS

Machine translation of JP 2003/221534, Aug. 2003.*
Machine translation of JP 2003/231835, Aug. 2003.*
Machine translation of JP 2003/192930, Jul. 2003.*
Supplementary European Search Report dated Feb. 20, 2009.
International Search Report for PCT/JP04/016059 dated Jan. 25, 2005.

* cited by examiner

*Primary Examiner*—Helene Klemanski
(74) *Attorney, Agent, or Firm*—Sughrue Mion, PLLC

(57) ABSTRACT

To provide inks and ink sets for inkjet recording, which have good fastness and good jet-out stability and which give good images with no bleeding trouble, yellow ink, black ink and magenta ink for inkjet printing contain at least two dyes each having an oxidation potential over 1.0 V (vs SCE).

15 Claims, No Drawings

INK AND INK SET FOR INKJET RECORDING

TECHNICAL FIELD

The present invention relates to an ink composition for inkjet recording, which provides images of good storage stability and which always enjoys good jet-out stability even after long-term storage.

BACKGROUND ART

With the recent popularization of computers, inkjet printers are much used for printing on paper, films, cloths and others, not only in office work but also for home use.

The inkjet recoding method includes a system of applying pressure to ink drops by the use of a piezoelectric device to thereby make the ink drops jet out, a system of thermally bubbling ink to jet the ink drops, a system of using ultrasonic waves, and a system of sucking and jetting ink drops by electrostatic force. For the ink compositions for such inkjet recording, usable are aqueous inks, oily inks and solid (hot-melt) inks. Of those, aqueous inks are most used because of their productivity, handlability, odorlessness and safety.

Colorant to be used in such inkjet recording inks must satisfy the following requirements: Its solubility in solvent is good; it enables high-density recording; its hue is good; it is fast to light, heat, air, water and chemicals; it well fixes in image-receiving material and hardly bleeds out; its storage stability in inks is good; it is not toxic; its purity is high; and it is inexpensive and is readily available. However, it is extremely difficult to seek such colorant that satisfies all these requirements on a high level.

Various dyes and pigments have been already proposed for inkjet recording, and are now in practical use. At present, however, no one knows colorant that satisfies all the requirements. Dyes and pigments heretofore well known in the art such as those listed in Color Index (C.I.) could hardly satisfy both the color hue and the fastness, which inks for inkjet recording need.

Having developed inkjet inks that contain dyes, we, the present inventors have found that heterocyclic azo-type-yellow dyes have good weather fastness (for example, JP-A-2004-168865).

However, we have known that, when the dyes are used singly, then there occurs a problem in that the light fastness of the gray area where the dye is mixed with other dyes is not good.

On the other hand, magenta dyes have merits and demerits depending on their type. Concretely, some magenta dyes may have good fastness but cause bleeding in images in high-humidity condition, while some others may have average-level fastness but have a low absorption coefficient per weight and therefore worsen the jet-out stability of inkjet inks. We have known that single dyes could not satisfy all the necessary requirements for inkjet inks.

We have further known that aqueous black inks are problematic in that their image durability is low. Apart from carbon black, there are known few black dyes capable of providing high-quality black images such as letters by themselves, and we have known that some different types of dyes each having a different absorption spectrum must be mixed for forming the intended black images. In this case, however, we have further known that the fading rate may differ between the dyes mixed, and that, when the dyes having abroad absorption characteristic have faded and changed in their absorption wavelength, then the quality of the black-containing image is significantly worsened.

To evade the problem, a method of mixing different types of dyes may be taken into consideration. However, when dyes in a group having the same structure are mixed, then it causes a problem in that a black image having a high reflection density is difficult to obtain.

On the other hand, water-soluble black inks must satisfy the absorption characteristics of covering a broad wavelength range, and are therefore problematic in that their solid concentration is apt to increase and they may worsen the jet-out stability of inks.

DISCLOSURE OF THE INVENTION

An object of the invention is to provide an ink and ink set for inkjet recording, which have good fastness to light, heat and ozone gas and have good jet-out stability and which provide good images resistant to bleeding.

The object of the invention is attained by inks and ink sets for inkjet recording of the following items 1 to 19.

1. An yellow ink for inkjet recording, which comprises:
   an aqueous medium; and
   at least two dyes, wherein the at least two dyes each independently has: a μmax of from 390 nm to 470 nm; a ratio of I(λmax+−70 nm) to I(λmax) of 0.4 or less, wherein I(λmax+70 nm) represents an absorbance at a wavelength of λmax+70 nm and I(λmax) represents an absorbance at a wavelength of λmax; and an oxidation potential higher than 1.0 V versus SCE,
   wherein at least one of the at least two dyes is a dye represented by formula (Y1):

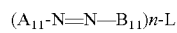
   $(A_{11}-N{=}N-B_{11})n\text{-}L$ wherein
   $A_{11}$ and $B_{11}$ each independently represents a heterocyclic group that may be substituted; n is 1 or 2; and L represents a hydrogen atom, a monovalent substituent, a single bond, or a divalent linking group,
   provided that when n is 1, L is a hydrogen atom or a monovalent substituent, and $A_{11}$ and $B_{11}$ are both monovalent heterocyclic groups; and when n is 2, L is a single bond or a divalent linking group, $A_{11}$ is a monovalent heterocyclic group, and $B_{11}$ is a divalent heterocyclic group.

2. The yellow ink for inkjet recording according to item 1, wherein at least one of the at least two dyes is a dye represented by formula (Y2) or (Y3):

   $$P-N{=}N\text{-}Q \qquad (Y2)$$

wherein P represents an aryl group that may be substituted; and Q represents a heterocyclic group that may be substituted,

   $$X-N{=}N-Y \qquad (Y3)$$

wherein X and Y each represents an aryl group that may be substituted.

3. The yellow ink for inkjet recording according to item 1 or 2, wherein a content of the dye represented by formula (Y1) is 50% or more by weight with respect to total amount of all dyes in the yellow ink.

4. A black ink for inkjet recording, which comprises:
   an aqueous medium; and
   at least two dyes, wherein the at least two dyes each independently has: a λmax of from 500 nm to 700 nm; and a half-value width of 100 nm or more in an absorption spectrum of a diluted solution, the absorption spectrum being standardized to have an absorbance of 1.0 at the λmax,
   wherein at least one of the at least two dyes has an oxidation potential higher than 1.0 V versus SCE.

5. The black ink for inkjet recording according to item 4, which further comprises a dye having a λmax of from 350 nm to 500 nm.

6. The black ink for inkjet recording according to item 4 or 5, wherein at least one dye is a compound represented by formula (B1):

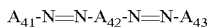

wherein $A_{41}$, $A_{42}$ and $A_{43}$ each independently represents an aromatic group or a heterocyclic group that may be substituted; $A_{41}$ and $A_{43}$ are monovalent groups; and $A_{42}$ is a divalent group.

7. The black ink for inkjet recording according to any of items 4 to 6, wherein at least one dye is a compound represented by formula (B2):

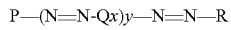

wherein P, Q and R each represent an aromatic group that may be substituted; x is an integer of 1 or more; and y is an integer of 0 or more.

8. The black ink for inkjet recording according to item 7, wherein Q in formula (B2) is a polycyclic aromatic ring.

9. The black ink for inkjet recording according to item 5, wherein the dye having the λmax of from 350 nm to 500 mm according to claim 6 is the compound represented by formula (B1).

10. A magenta ink for inkjet recording, which comprises: a first dye; and a second dye having a different structure from the first dye, the first dye and the second dye each independently having an oxidation potential higher than 1.0 V versus SCE, wherein the first dye is an azo dye comprising an azo group, each end of the azo group having a hetero ring.

11. The magenta ink for inkjet recording according to item 10, wherein the second dye is an anthrapyridone dye.

wherein
$A_{31}$ represents a 5-membered heterocyclic ring;
$B_{31}$ and $B_{32}$ each represents $=CR_{31}-$ or $-CR_{32}=$, or either one of $B_{31}$ and $B_{32}$ represents a nitrogen atom while the other one represents $=CR_{31}-$ or $-CR_{32}=$;
$R_{35}$ and $R_{36}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, each of which may further have a substituent;

$G_3$, $R_{31}$ and $R_{32}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an arylamino group, a heterocyclic amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, an alkylsulfonyl group, an arylsulfonyl group, a heterocyclic sulfonyl group, an alkylsulfinyl group, an aryl sulfinyl group, a heterocyclic sulfinyl group, a sulfamoyl group, a sulfo group or a heterocyclic thio group, each of which may be further substituted; and $R_{31}$ and $R_{35}$, or $R_{35}$ and $R_{36}$ may be bonded to form a 5- or 6-membered ring.

13. The magenta ink for inkjet recording according to item 11 or 12, wherein the anthrapyridone dye is a compound represented by formula (M2):

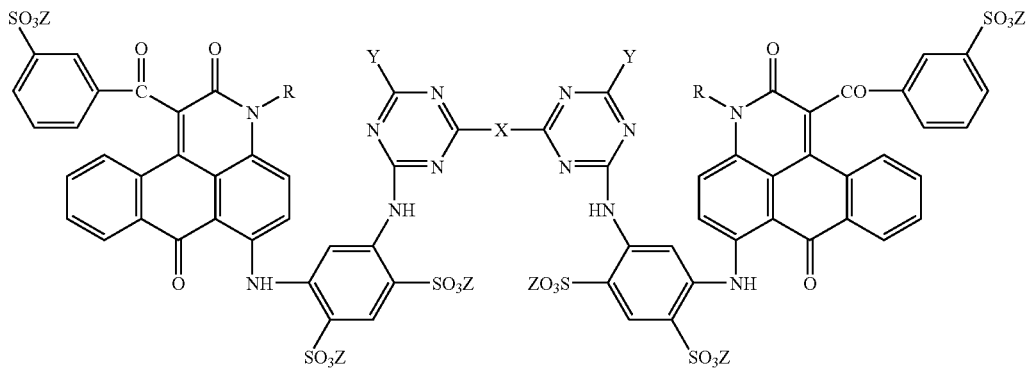

12. The magenta ink for inkjet recording according to item 10 or 11, wherein the azo dye is a compound represented by formula (M1):

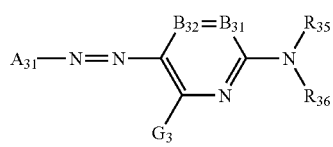

wherein
R represents a hydrogen atom, an alkyl group, a hydroxy-lower alkyl group, a cyclohexyl group, a mono or dialkylaminoalkyl group, or a cyano-lower alkyl group;
Y represents: a chlorine atom; a hydroxyl group; an amino group; a mono or dialkylamino group in which the alkyl moiety may have a substituent selected from a sulfonic acid group, a carboxyl group and a hydroxyl group; an aralkylamino group; a cycloalkylamino group; an alkoxy group; a phenoxy group in which the benzene ring may have a substituent selected from a sulfonic acid group, a carboxyl group, an acetylamino group, an amino group and a hydroxyl group;

an anilino group that may have one or two substituents selected from a sulfonic acid group and a carboxyl group; a naphthylamino group in which the naphthyl group may be substituted with a sulfonic acid group; or a mono or dialkylaminoalkylamino group;

X represents a crosslinking group; and

Z represents a hydrogen atom, an alkali metal element, an alkaline earth metal element, an alkylamino group, an alkanolamino group, or an ammonium group.

14. An ink set for inkjet recording, which comprises at least one of an yellow ink according to any of items 1 to 3, a black ink according to any of items 4 to 9, and a magenta ink according to any of items 10 to 13.

15. An ink set for inkjet recording, which comprises at least two magenta inks each independently comprising a dye having an oxidation potential higher than 1.0 V versus SCE, wherein one magenta ink comprises an azo dye comprising: an azo group; and hetero rings bonding to both ends of the azo group, and the other magenta ink comprises a dye having a structure other than the azo dye.

16. The ink set for inkjet recording according to item 15, wherein at least one dye in the at least two magenta inks is a dye represented by formula (M1) according to item 12 or formula (M2) according to item 13.

17. The ink set for inkjet recording according to item 15 or 16, wherein at least one of the at least two magenta inks comprises a dye represented by formula (M1) according to item 12.

18. The ink set for inkjet recording according to any of items 15 to 17, wherein at least one of the at least two magenta inks comprises a dye represented by formula (M2) according to item 13.

19. The ink set for inkjet recording according to any of items 15 to 18, wherein at least one of the at least two magenta inks comprises: a dye represented by formula (M1) according to item 12; and a dye represented by formula (M2) according to item 13.

The invention has attained yellow inks and ink sets for inkjet recording, which always ensure and enjoy good weather fastness and good jet-out stability anytime when they are pure color or mixed color.

Using two or more different types of black dyes in combination, the invention has attained black inks having good absorption characteristics and having a flat spectrum. Accordingly, the invention has attained high-density black images, and has solved the problem with black inks that has heretofore been discussed in the related art in point of their solubility.

The black inks and ink sets of the invention have good ink-jet stability and provide high-density images of good durability.

In addition, the invention has attained magenta inks and ink sets for inkjet recording, which provide images of good storage stability and which always enjoy good jet-out stability even after long-term storage.

DETAILED DESCRIPTION OF THE INVENTION

Hereinafter, the invention is described in detail.

λmax of an ink in the invention is a wavelength at which an aqueous solution of the ink shows a maximum absorbance in absorption spectrum measurement, wherein the aqueous solution of the ink is diluted with water to have a maximum absorbance of from 1 to 2.

An yellow ink in the invention is an ink having a λmax of from 390 nm to 470 nm and a half-value width of less than 100 nm.

Preferably, yellow dyes for use in the invention have an oxidation potential over 1.00 V (vs SCE) in view of their fastness especially to ozone gas. More preferably, the dyes have an oxidation potential over 1.1 V (vs SCE), even preferably over 1.2V (vs SCE). Regarding their type, azo dyes that satisfy the above-mentioned physical requirements are especially preferred.

The oxidation potential (Eox) of dyes may be readily measured by anyone skilled in the art. The method for the measurement is described in, for example, P. Delahay, *New Instrumental Methods in Electrochemistry*, 1954, Interscience Publishers; A. J. Bard et al., *Electrochemical Methods*, 1980, John Wiley & Sons; A. Fujishima et al., *Electrochemical Measurement Methods*, 1984, Gihodo Publishing.

Concretely, the oxidation potential may be measured as follows: A sample to be analyzed is dissolved in a solvent such as dimethylformamide or acetonitrile that contains a supporting electrolyte such as sodium perchlorate or tetrapropylammonium perchlorate to have a concentration of from $1\times10^{-6}$ to $1\times10^{-2}$ mol/liter, and its value of oxidation potential versus SCE (saturated calomel electrode) is measured through cyclic voltammetry. The value of oxidation potential may deviate by tens millivolts or so, owing to the influence of the liquid junction potential or the sample solution resistance thereon, but it may be calibrated with a standard sample (e.g., hydroquinone). In that manner, the reproducibility of the thus-measured potential value is ensured.

In the invention, the oxidation potential of dye is measured in dimethylformamide (in this, the concentration of the dye is 0.001 mol·dm$^3$) that contains 0.1 mol·dm$^3$ of a supporting electrolyte, tetrapropylammonium perchlorate (vs. SCE), in order to indiscriminately define the potential.

Eox indicates the electron mobility from sample to electrode. Samples having a larger value of Eox (those having an oxidation potential) mean that electrons move more hardly from them to electrode, or that is, the samples are more hardly oxidized. Relative to the structure of compounds, introduction of an electron-attractive group makes the compounds have an oxidation potential while introduction of an electron-donating group makes them have a negative oxidation potential. In the invention, it is desirable that an electron-attractive group is introduced into the skeleton of the dyes to thereby make the dyes have an oxidation potential, in order to lower the reactivity of the dyes with ozone, a type of electrophilic agent.

In addition to having good fastness, it is further desirable that yellow dyes for use in the invention give good hue, and more preferably, the long wavelength side of the absorption spectral pattern of the dyes shows a sharply-ending tail profile. Accordingly, it is desirable that the yellow dye has a λmax of from 390 nm to 470 mm, and the ratio of the absorbance at (λmax+70 nm), I(λmax+70 nm) to the absorbance at λmax I(λmax), I(λmax+70 nm)/I(λmax) is 0.4 or less, more preferably 0.2 or less, even more preferably 0.15 or less, still more preferably 0.10 or less.

The absorbance ratio may be controlled in the desired manner as above by specifically so designing the dye molecule that the transition moment of the diazo component and the coupler component with the azo group sandwiched therebetween could be as uniform as possible. The absorption wavelength and the absorbance as defined herein are those measured in a solvent (water or ethyl acetate).

For the dyes that satisfy the oxidation potential and the absorbance characteristics as above, those of the following formula (Y1) are used in the invention.

(A$_{11}$-N=N-B$_{11}$)$n$-L　　　　　　　　　　(Y1)

In (Y1), A$_{11}$ and B$_{11}$ each independently represents an optionally-substituted heterocyclic group. The hetero ring is preferably a 5-membered or 6-membered hetero ring. It may have a monocyclic structure or a multi-cyclic structure of two or more rings condensed to each other; or may be an aromatic hetero ring or a non-aromatic hetero ring. Preferably, the hetero atom to constitute the hetero ring includes N, O and S atoms. n is an integer selected from 1 or 2, and is more preferably 2. L represents a substituent bonding to A$_{11}$ or B$_{11}$ at any desired position thereof. When n is 1, then L is a hydrogen atom or a monovalent substituent; and when n is 2, then L is a single bond or a divalent linking group. When n is 2, then two A's may be the same or different, and two B's may be the same or different.

In formula (Y1), the hetero ring for A$_{11}$ is preferably any of 5-pyrazolone, pyrazole, triazole, oxazolone, isoxazolone, barbituric acid, pyridone, pyridine, rhodanine, pyrazolidinedione, pyrazolopyridone, Meldrum's acid, and condensed hetero rings formed through condensation of these hetero rings with any additional hydrocarbon aromatic ring or hetero ring. Above all, 5-pyrazolone, 5-aminopyrazole, pyridone, 2,6-diaminopyridine, and pyrazoloazole are preferred; and 5-aminopyrazole, 2-hydroxy-6-pyridone and pyrazolotriazole are more preferred.

For the hetero ring for B$_{11}$, preferred are pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, isoxazole, benzoxazole, thiazole, benzothiazole, isothiazole, benzisothiazole, thiadiazole, benzisoxazole, pyrrolidine, piperidine, piperazine, imidazolidine, thiazoline. Of those, more preferred are pyridine, quinoline, thiophene, benzothiophene, pyrazole, imidazole, benzimidazole, triazole, oxazole, isoxazole, benzoxazole, thiazole, benzothiazole, isothiazole, benzisothiazole, thiadiazole, benzisoxazole; and even more preferred are quinoline, thiophene, pyrazole, thiazole, benzoxazole, benzisoxazole, isothiazole, imidazole, benzothiazole, thiadiazole; and still more preferred are pyrazole, benzothiazole, benzoxazole, imidazole, 1,2,4-thiadiazole, 1,3,4-thiadiazole.

A$_{11}$ and B$_{11}$ may be substituted, and examples of the substituent for them are a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic-thio group, a sulfamoyl group, an alkyl or arylsulfinyl group, an alkyl or arylsulfonyl group, an acyl group, an aryloxycarbonyl group, an alkoxycarbonyl group, a carbamoyl group, an imido group, a phosphino group, a phosphinyl group, a phosphinyloxy group, a phosphinylamino group, a silyl group and a ionic hydrophilic group mentioned below.

The monovalent substituent for L includes the substituents substitutable in A$_{11}$ and B$_{11}$, and an ionic hydrophilic group mentioned below.

The divalent linking group for L includes an alkylene group, an arylene group, a hetero ring residue, —CO—, —SOn- (n is 0, 1 or 2), —NR— (R is a hydrogen atom, an alkyl group or an aryl group), —O—, and other divalent groups of combinations of these linking groups. These groups may have substituents such as those mentioned hereinabove for A$_{11}$ and B$_{11}$ and an ionic hydrophilic group mentioned below.

In case where the dyes of formula (Y1) are used as water-soluble dyes, the dyes preferably have at least one ionic hydrophilic group in the molecule. The ionic hydrophilic group includes, for example, a sulfo group, a carboxyl group, a phosphono group and a quaternary ammonium group. For the ionic hydrophilic group, preferred are a carboxyl group, a phosphono group and a sulfo group; and more preferred are a carboxyl group and a sulfo group. Most preferably, at least one ionic hydrophilic group is a carboxyl group. The carboxyl group, phosphono group and sulfo group may form salts. Examples of the counter ion to form the salts are ammonium ions, alkali metal ions (e.g., lithium ion, sodium ion, potassium ion), and organic cations (e.g., tetramethylammonium ion, tetramethylguanidium ion, tetramethylphosphonium ion). For the counter ion, preferred are alkali metal ions.

Of the dyes of formula (Y1), those in which the part of A$_{11}$-N=N-B$_{11}$ is represented by the following formula (Y4), (Y5) or (Y6) are preferred.

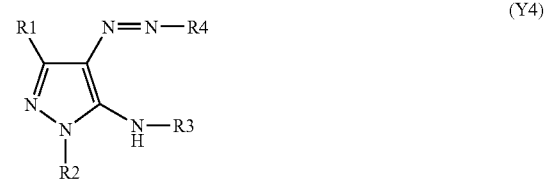

wherein R1 and R3 each represent a hydrogen atom, a cyano group, an alkyl group, a cycloalkyl group, an aralkyl group, an alkoxy group, an alkylthio group, an arylthio group, an aryl group, or an ionic hydrophilic group; R2 represents a hydrogen atom, an alkyl group, a cycloalkyl group, an aralkyl group, a carbamoyl group, an acyl group, an aryl group, or a heterocyclic group; and R4 represents a heterocyclic group.

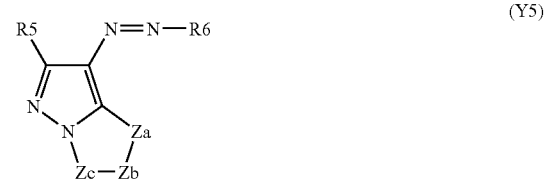

wherein R5 represents a hydrogen atom, a cyano group, an alkyl group, a cycloalkyl group, an aralkyl group, an alkoxy group, an alkylthio group, an arylthio group, an aryl group, or an ionic hydrophilic group; Za represents —N=, —NH—, or —C(R11)=: Zb and Zc each independently represent —N= or —C(R11)=; R11 represents a hydrogen atom or a non-metallic substituent; R6 represents a heterocyclic group.

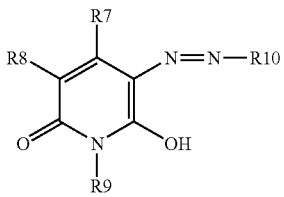

(Y6)

wherein R7 and R9 each independently represent a hydrogen atom, a cyano group, an alkyl group, a cycloalkyl group, an aralkyl group, an aryl group, an alkylthio group, an arylthio group, an alkoxycarbonyl group, a carbamoyl group, or an ionic hydrophilic group; R8 represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkylthio group, an arylthio group, an alkoxycarbonyl group, a carbamoyl group, a sulfamoyl group, a sulfonyl group, an acyl group, an alkylamino group, an arylamino group, a hydroxyl group, or an ionic hydrophilic group; R10 represents a heterocyclic group.

The alkyl group for R1, R2, R3, R5, R7, R8 and R9 in formulae (Y4), (Y5) and (Y6) includes a substituted alkyl group and an unsubstituted alkyl group. Preferably, the alkyl group has from 1 to 20 carbon atoms. Examples of the substituent for the alkyl group are a hydroxyl group, an alkoxy group, a cyano group, a halogen atom, and an ionic hydrophilic group. Examples of the alkyl group are methyl, ethyl, butyl, isopropyl, t-butyl, hydroxyethyl, methoxyethyl, cyanoethyl, trifluoromethyl, 3-sulfopropyl and 4-sulfobutyl groups.

The cycloalkyl group for R1, R2, R3, R5, R7, R8 and R9 includes a substituted cycloalkyl group and an unsubstituted cycloalkyl group. Preferably, the cycloalkyl group has from 5 to 12 carbon atoms. An example of the substituent for the cycloalkyl group is an ionic hydrophilic group. An example of the cycloalkyl group is a cyclohexyl group. The aralkyl group for R1, R2, R3, R5, R7, R8 and R9 includes a substituted aralkyl group and an unsubstituted aralkyl group. Preferably, the cycloalkyl group has from 7 to 20 carbon atoms. An example of the substituent for the aralkyl group is an ionic hydrophilic group. Examples of the aralkyl group are benzyl and 2-phenethyl groups.

The aryl group for R1, R2, R3, R5, R7, R8 and R9 includes a substituted aryl group and an unsubstituted aryl group. Preferably, the aryl group has from 6 to 20 carbon atoms. Examples of the substituent for the aryl group are an alkyl group, an alkoxy group, a halogen atom, an alkylamino group, and an ionic hydrophilic group. Examples of the aryl group are phenyl, p-tolyl, p-methoxyphenyl, o-chlorophenyl, and m-(3-sulfopropylamino)phenyl groups.

The alkylthio group for R1, R2, R3, R5, R7, R8 and R9 includes a substituted alkylthio group and an unsubstituted alkylthio group. Preferably, the alkylthio group has from 1 to 20 carbon atoms. An example of the substituent for the alkylthio group is an ionic hydrophilic group. Examples of the alkylthio group are methylthio and ethylthio groups. The arylthio group for R1, R2, R3, R5, R7, R8 and R9 includes a substituted arylthio group and an unsubstituted arylthio group. Preferably, the arylthio group has from 6 to 20 carbon atoms. Examples of the substituent for the arylthio group are an alkyl group and an ionic hydrophilic group. Examples of the arylthio group are phenylthio and p-tolylthio groups.

The heterocyclic group for R2 is preferably 5-membered or 6-membered, and it may be condensed with any other ring. For the hetero atom to constitute the hetero ring, preferred are N, S and O. The hetero ring for the group may be an aromatic hetero ring or a non-aromatic hetero ring. The hetero ring may be further substituted. For the substituent for the ring, referred to are those mentioned hereinabove for the aryl group. Preferably, the hetero ring is a 6-membered, nitrogen-containing aromatic hetero ring, and its preferred examples are triazine, pyrimidine and phthalazine.

The halogen atom for R8 includes fluorine atom, chlorine atom and bromine atom. The alkoxy group for R1, R3, R5 and R8 includes a substituted alkoxy group and an unsubstituted alkoxy group. Preferably, the alkoxy group has from 1 to 20 carbon atoms. Examples of the substituent for the alkoxy group are a hydroxyl group and an ionic hydrophilic group. Examples of the alkoxy group are methoxy, ethoxy, isopropoxy, methoxyethoxy, hydroxyethoxy and 3-carboxypropoxy groups.

The aryloxy group for R8 includes a substituted alkoxy group and an unsubstituted alkoxy group. Preferably, the aryloxy group has from 6 to 20 carbon atoms. Examples of the substituent for the aryloxy group are an alkoxy group and an ionic hydrophilic group. Examples of the aryloxy group are phenoxy, p-methoxyphenoxy and o-methoxyphenoxy groups. The acylamino group for R8 includes a substituted acylamino group and an unsubstituted acylamino group. Preferably, the acylamino group has from 2 to 20 carbon atoms. An example of the substituent for the acylamino group is an ionic hydrophilic group. Examples of the acylamino group are acetamido, propionamido, benzamido and 3,5-disulfobenzamido groups.

The sulfonylamino group for R8 includes a substituted sulfonylamino group and an unsubstituted sulfonylamino group. Preferably, the sulfonylamino group has from 1 to 20 carbon atoms. Examples of the sulfonylamino group are methylsulfonylamino and ethylsulfonylamino groups. The alkoxycarbonylamino group for R8 includes a substituted alkoxycarbonylamino group and an unsubstituted alkoxycarbonylamino group. Preferably, the alkoxycarbonylamino group has from 2 to 20 carbon atoms. An example of the substituent for the alkoxycarbonylamino group is an ionic hydrophilic group. An example of the alkoxycarbonylamino group is an ethoxycarbonylamino group.

The ureido group for R8 includes a substituted ureido group and an unsubstituted ureido group. Preferably, the ureido group has from 1 to 20 carbon atoms. Examples of the substituent for the ureido group are an alkyl group and an aryl group. Examples of the ureido group are 3-methylureido, 3,3-dimethylureido and 3-phenylureido groups.

The alkoxycarbonyl group for R7, R8 and R8 includes a substituted alkoxycarbonyl group and an unsubstituted alkoxycarbonyl group. Preferably, the alkoxycarbonyl group has from 2 to 20 carbon atoms. An example of the substituent for the alkoxycarbonyl group is an ionic hydrophilic group. Examples of the alkoxycarbonyl group are methoxycarbonyl and ethoxycarbonyl groups.

The carbamoyl group for R2, R7, R8 and R9 includes a substituted carbamoyl group and an unsubstituted carbamoyl group. An example of the substituent for the carbamoyl group is an alkyl group. Examples of the carbamoyl group are methylcarbamoyl and dimethylcarbamoyl groups. The sulfamoyl group for R8 includes a substituted sulfamoyl group and an unsubstituted sulfamoyl group. An example of the substituent for the sulfamoyl group is an alkyl group. Examples of the sulfamoyl group are dimethylsulfamoyl and di-(2-hydroxyethyl)sulfamoyl groups.

Examples of the sulfonyl group for R8 are methanesulfonyl and phenylsulfonyl groups. The acyl group for R2 and R8 includes a substituted acyl group and an unsubstituted acyl group. Preferably, the acyl group has from 1 to 20 carbon atoms. An example of the substituent for the acyl group is an ionic hydrophilic group. Examples of the acyl group are acetyl and benzoyl groups.

The amino group for R8 includes a substituted amino group and an unsubstituted amino group. Examples of the substituent for the amino group are an alkyl group, an aryl group, and a heterocyclic group. Examples of the amino group are methylamino, diethylamino, anilino and 2-chloroanilino groups.

The heterocyclic group for R4, R6 and R10 may be the same as the optionally-substituted heterocyclic group for $B_{11}$ in formula (Y1). For its preferred examples, more preferred examples and even more preferred examples, referred to are those mentioned hereinabove for the group for $B_{11}$. Concretely, the substituent for the heterocyclic group includes, for example, an ionic hydrophilic group, an alkyl group having from 1 to 12 carbon atoms, an aryl group, an alkyl or arylthio group, a halogen atom, a cyano group, a sulfamoyl group, a sulfonamino group, a carbamoyl group, and an acylamino group. The alkyl group and the aryl group may be further substituted.

In formula (Y5), Za represents —N=, —NH— or —C(R11)=; Zb and Zc each independently represent —N= or —C(R11)=; and R11 represents a hydrogen atom or a non-metallic substituent. For the non-metallic substituent for R11, preferred are a cyano group, a cycloalkyl group, an aralkyl group, an aryl group, an alkylthio group, an arylthio group, and an ionic hydrophilic group. These substituents may have the same meanings as those of the substituents for R1, and their preferred examples may also be the same as those for R1. Examples of the skeleton of the hetero ring that comprises two 5-membered rings in formula (Y5) are mentioned below.

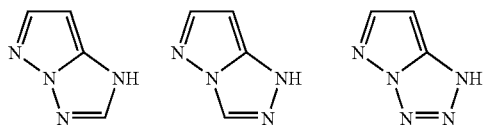

For examples of the substituent for the optionally-substituted groups mentioned above, referred to are those mentioned hereinabove for the optionally-substituted groups for the hetero rings $A_{11}$ and $B_{11}$ in formula (Y1).

When the dyes of formulae (Y4) to (Y6) are water-soluble dyes, then it is desirable that they have at least one ionic hydrophilic group in the molecule. The preferred dyes of the type include those of formulae (Y4) to (Y6) where any of R1, R2, R3, R5, R7, R8 and R9 is an ionic hydrophilic group, and those of formulae (Y4) to (Y6) where any of R1 to R11 has a substituent of an ionic hydrophilic group. The ionic hydrophilic group includes a sulfo group, a carboxyl group, a phosphono group and a quaternary ammonium group. For the ionic hydrophilic group, preferred are a carboxyl group, a phosphono group and a sulfo group; and more preferred are a carboxyl group and a sulfo group. The carboxyl group, phosphono group and sulfo group may form salts. Examples of the counter ion to form the salts are ammonium ions, alkali metal ions (e.g., lithium ion, sodium ion, potassium ion), and organic cations (e.g., tetramethylammonium ion, tetramethylguanidium ion, tetramethylphosphonium ion). For the counter ion, preferred are alkali metal ions.

Of the dyes of formulae (Y4), (Y5) and (Y6), preferred are those of formula (Y4), and more preferred are those of the following formula (Y4-1):

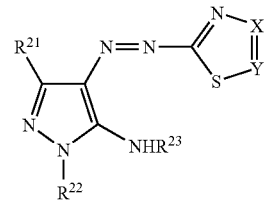

wherein $R^{21}$ and $R^{23}$ each represent a hydrogen atom, an alkyl group, a cycloalkyl group, an aralkyl group, an alkoxy group or an aryl group; $R^{22}$ represents a hydrogen atom, an aryl group or a heterocyclic group; one of X and Y represents a nitrogen atom and the other represents —$CR^{24}$; $R^{24}$ represents a hydrogen atom, a halogen atom, a cyano group, an alkyl group, an alkylthio group, an alkylsulfonyl group, an alkylsulfinyl group, an alkyloxycarbonyl group, a carbamoyl group, an alkoxy group, an aryl group, an arylthio group, an arylsulfonyl group, an arylsulfinyl group, an aryloxy group or an acylamino group. These substituents may be further substituted.

Preferred examples of the dyes for use in the invention are described in JP-A-2004-83903, 2003-277662, 2003-277661 2003-128953 and 2003-41160. Above all, the compounds mentioned below are more preferred in the invention. However, the dyes for use in the invention should not be limited to these. These compounds may be produced with reference to the above-mentioned patent references and to JP-A 2-24191 and 2001-279145.

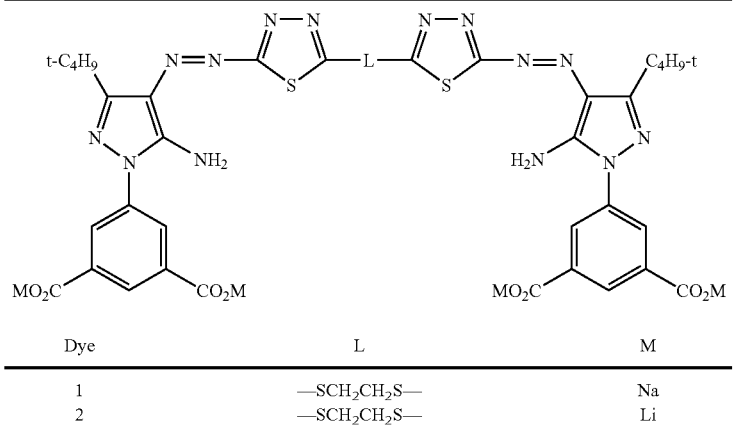

| Dye | L | M |
|---|---|---|
| 1 | —SCH$_2$CH$_2$S— | Na |
| 2 | —SCH$_2$CH$_2$S— | Li |

-continued

| Dye | L | M |
|---|---|---|
| 3 | —SCH$_2$CH$_2$CH$_2$S— | Na |
| 4 | —SCH$_2$CH$_2$CH$_2$S— | K |
| 5 | —SCH$_2$CH$_2$CH$_2$S— | Li |
| 6 | —SCH$_2$CH$_2$CH$_2$S— | NH$_4$ |
| 7 | —SCH$_2$CH$_2$CH$_2$S— | HN(Et)$_3$ |
| 8 | —SCH$_2$CH(CH$_3$)S— | Na |
| 9 | —SCH$_2$CH$_2$OCH$_2$CH$_2$S— | Na |
| 10 | —SCH$_2$CH(OH)CH$_2$S— | Na |
| 11 | —SCH$_2$CH(CH$_2$OH)S— | Na |
| 12 | —SCH$_2$CH(CO$_2$Na)S— | Na |
| 13 | m-phenylene | Na |
| 14 | —C$_6$H$_4$—NHCONH—C$_6$H$_4$— | Na |

| Dye | Ar | L | R |
|---|---|---|---|
| 15 | 4-methyl-1,2-bis(CO$_2$Na)phenyl | —SCH$_2$CH$_2$CH$_2$S— | t-C$_4$H$_9$— |

-continued

[Structure: R—C(pyrazole with NH₂, N-Ar)=N—N=(thiadiazole-S)—L—(thiadiazole-S)=N—N=C(pyrazole with NH₂, N-Ar)—R]

| Dye | Ar | L | R |
|---|---|---|---|
| 16 | 2-methyl-4-(SO₃Na)-phenyl with SO₃Na (benzene bearing 2-CH₃, 1-SO₃Na, 4-SO₃Na) | —SCH₂CH₂CH₂S— | t-C₄H₉— |
| 17 | 3,5-bis(CO₂Na)phenyl—NH—(6-methyl-1,3,5-triazine-2,4-diyl)—NH—3,5-bis(CO₂Na)phenyl | —SCH₂CH₂CH₂S— | t-C₄H₉— |
| 18 | 3,5-bis(CO₂Na)phenyl—NH—(6-methyl-1,3,5-triazine-2,4-diyl)—NH—3,5-bis(CO₂Na)phenyl | —SCH₂CH₂S— | t-C₄H₉— |
| 19 | 3,5-bis(CO₂Na)phenyl—NH—(6-methyl-1,3,5-triazine-2,4-diyl)—NH—3,5-bis(CO₂Na)phenyl | —CH₂CH₂CH₂CH₂— | t-C₄H₉— |
| 20 | 3,5-bis(CO₂Na)phenyl—NH—(6-methyl-1,3,5-triazine-2,4-diyl)—NH—3,5-bis(CO₂Na)phenyl | —S—(1,3,5-triazine with NHC₂H₄SO₃Na at 6-position)—S— | t-C₄H₉— |
| 21 | 3,5-bis(CO₂Na)phenyl | —SCH₂CH₂CH₂S— | Ph |

-continued
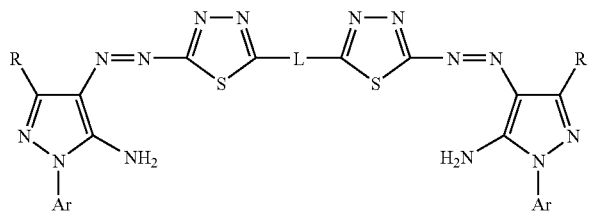
| Dye | Ar | L | R |
|---|---|---|---|
| 22 | 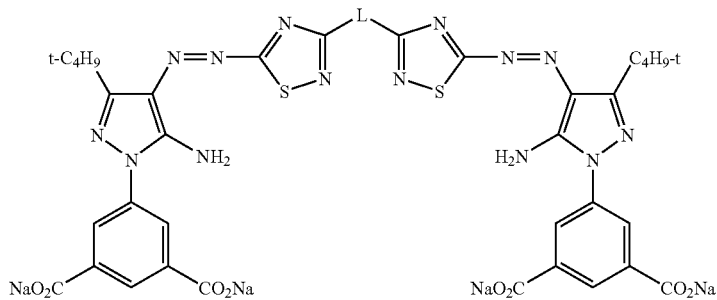 | —SCH$_2$CH$_2$CH$_2$S— | t-C$_4$H$_9$— |
| 23 |  | —SCH$_2$CH$_2$S— | t-C$_4$H$_9$— |
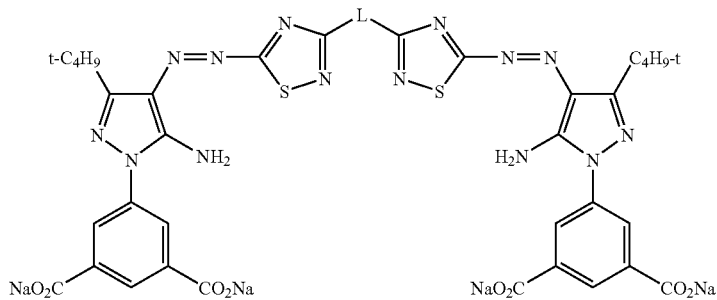
| Dye | L |
|---|---|
| 24 | —SCH$_2$CH$_2$CH$_2$S— |
| 25 |  |

| Dye | Ar | L | R |
|---|---|---|---|
| 26 | 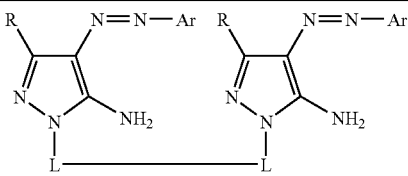 |  | t-C$_4$-H$_9$— |
| 27 | 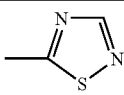 | 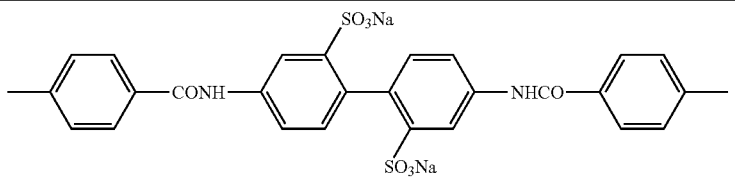 | t-C$_4$-H$_9$— |
| 28 | 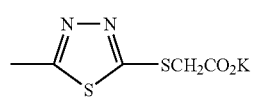 | 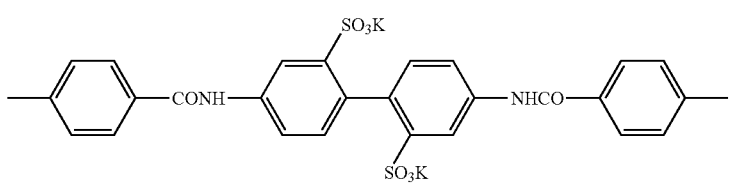 | t-C$_4$-H$_9$— |
| 29 | 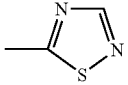 | 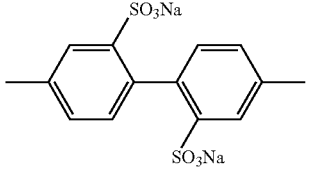 | t-C$_4$-H$_9$— |
| 30 | 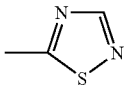 | 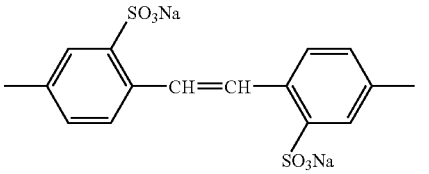 | t-C$_4$-H$_9$— |
| 31 | 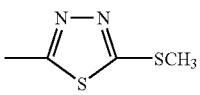 | 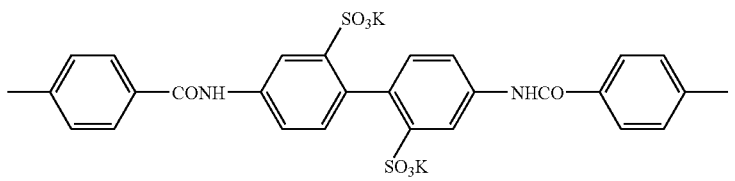 | t-C$_4$-H$_9$— |
| 32 | 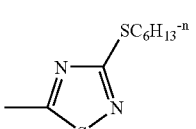 | 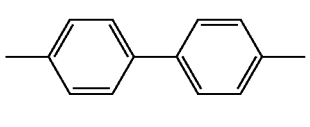 | t-C$_4$-H$_9$— |

-continued
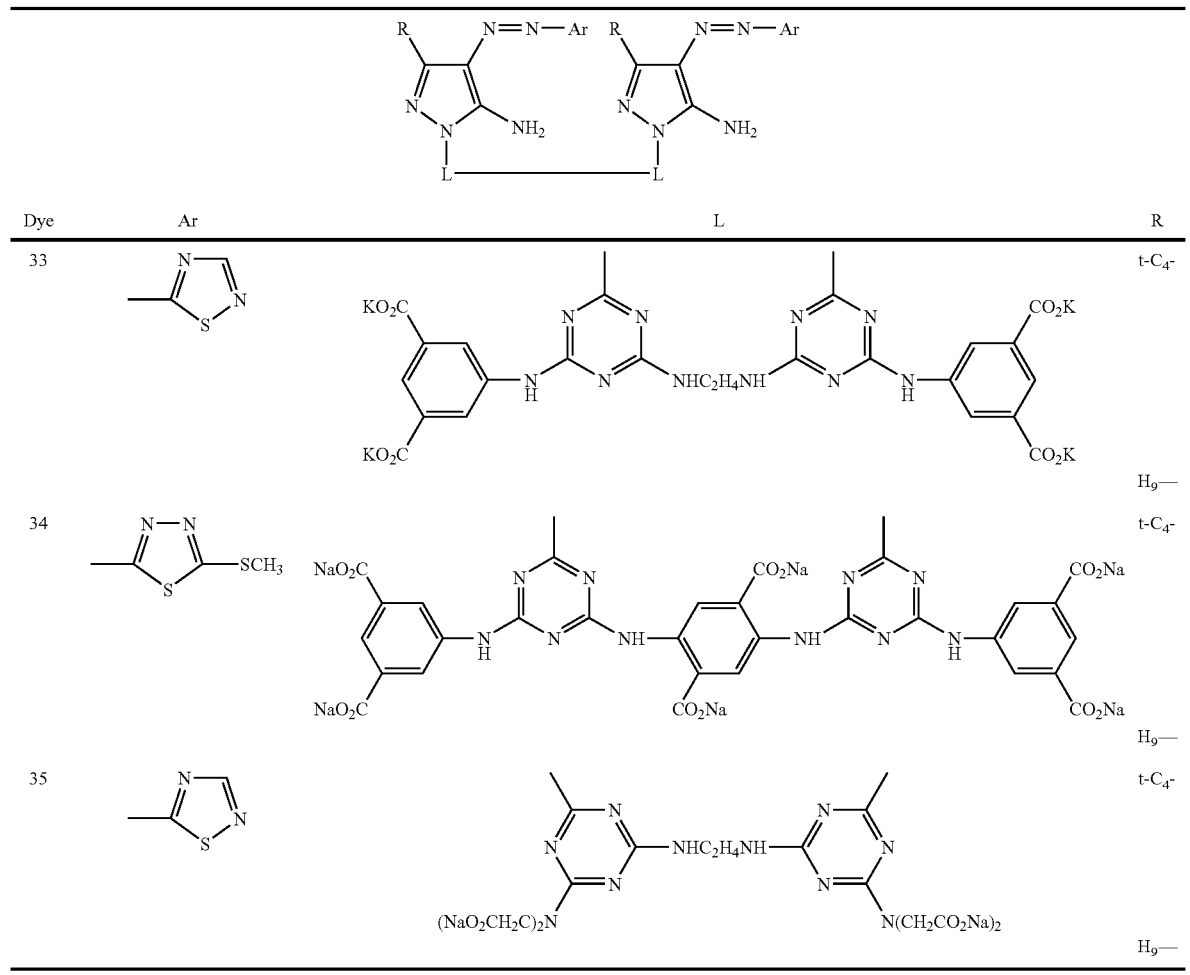
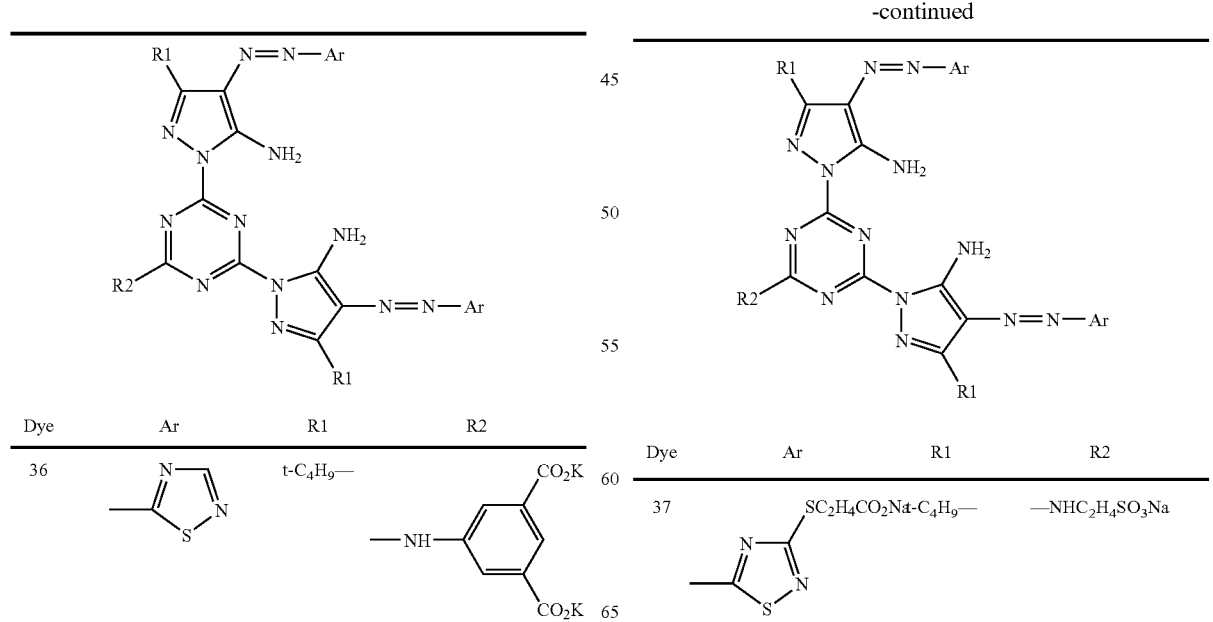

-continued

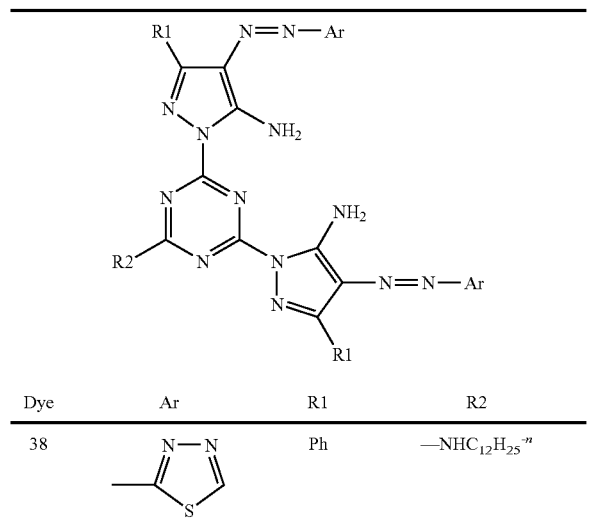

| Dye | Ar | R1 | R2 |
|---|---|---|---|
| 38 | (5-methyl-1,3,4-thiadiazol-2-yl) | Ph | —NHC$_{12}$H$_{25}$-$n$ |

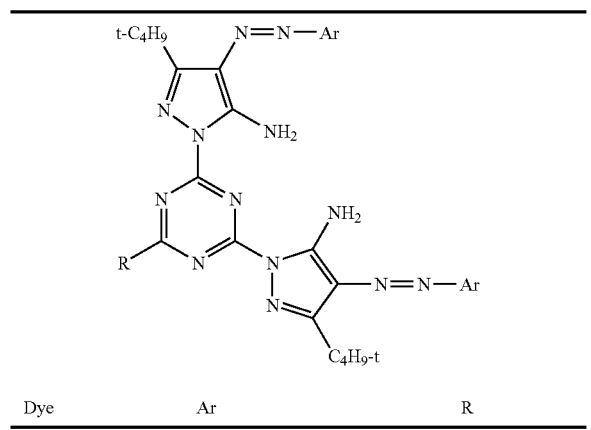

| Dye | Ar | R |
|---|---|---|
| 39 | (5-methyl-1,2,4-thiadiazol-3-yl) | —NH-(3,5-di-SO$_3$Na-phenyl) |
| 40 | (5-methyl-3-phenyl-1,2,4-thiadiazol-2-yl) | —NH-(3,5-di-CO$_2$K-phenyl) |
| 41 | (5-methyl-1,3,4-thiadiazol-2-yl)-SCH$_2$CO$_2$Na | —NHC$_2$H$_4$SO$_3$Na |
| 42 | (2-methyl-4,5-dicyano-imidazol-1-yl)-CH$_2$CO$_2$Na | —NHC$_2$H$_4$SO$_3$Na |

-continued

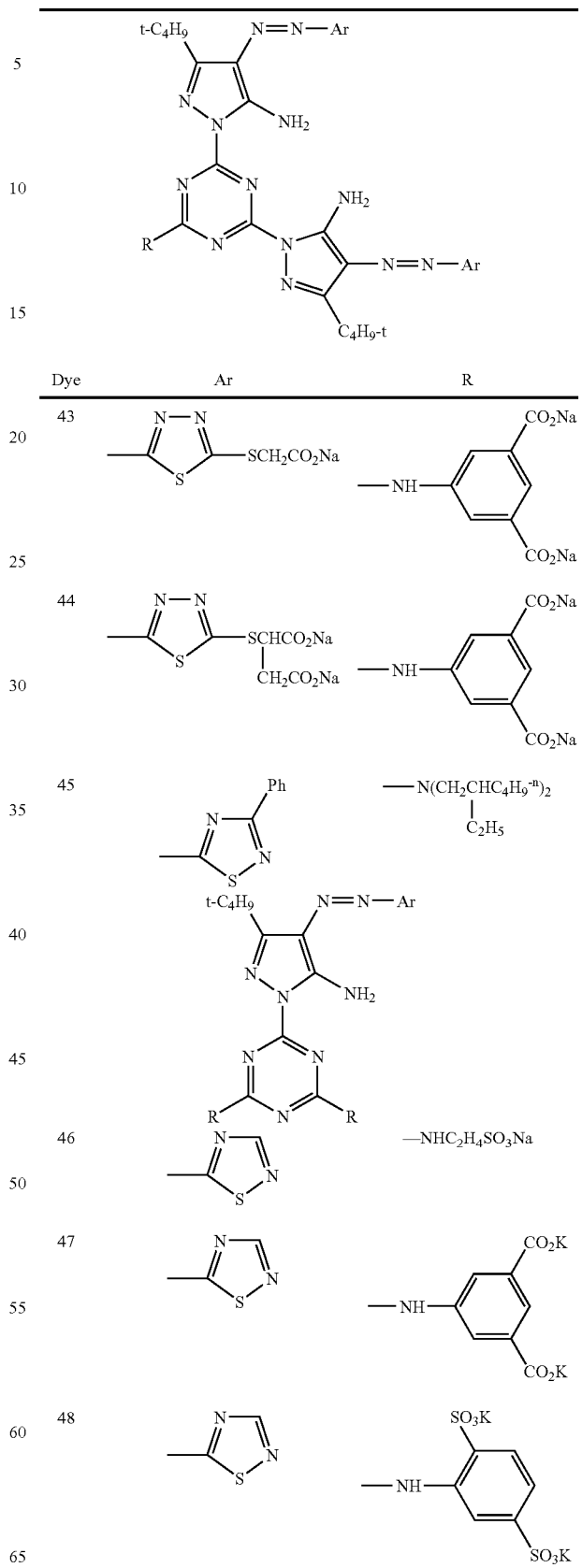

| Dye | Ar | R |
|---|---|---|
| 43 | (5-methyl-1,3,4-thiadiazol-2-yl)-SCH$_2$CO$_2$Na | —NH-(3,5-di-CO$_2$Na-phenyl) |
| 44 | (5-methyl-1,3,4-thiadiazol-2-yl)-SCH(CO$_2$Na)CH$_2$CO$_2$Na | —NH-(3,5-di-CO$_2$Na-phenyl) |
| 45 | (5-methyl-3-phenyl-1,2,4-thiadiazol-2-yl) | —N(CH$_2$CHC$_4$H$_9$-$n$)$_2$ C$_2$H$_5$ |
| 46 | (5-methyl-1,2,4-thiadiazol-3-yl) | —NHC$_2$H$_4$SO$_3$Na |
| 47 | (5-methyl-1,2,4-thiadiazol-3-yl) | —NH-(3,5-di-CO$_2$K-phenyl) |
| 48 | (5-methyl-1,2,4-thiadiazol-3-yl) | —NH-(2,5-di-SO$_3$K-phenyl) |

-continued

[Structure shown: pyrazole-triazine-pyrazole bis-azo dye with t-C₄H₉, NH₂, N=N—Ar substituents and R group on triazine]

| Dye | Ar | R |
|---|---|---|
| 49 | 5-methyl-1,2,4-thiadiazol-3-yl | —N(CH₂CO₂Na)₂ |
| 50 | 5-methyl-3-phenyl-1,2,4-thiadiazol-3-yl | —NH—(3,5-di-CO₂Na-phenyl) |
| 51 | 5-methyl-3-(SC₂H₄SO₃Na)-1,2,4-thiadiazol-3-yl | —NH—(3,5-di-CO₂Na-phenyl) |
| 52 | 2-methyl-4,5-dicyano-1-(CH₂CO₂Na)-imidazolyl | —NH—(3,5-di-CO₂Na-phenyl) |
| 53 | 5-methyl-1,3,4-thiadiazol-2-yl | —NH—(3,5-di-CO₂Na-phenyl) |
| 54 | 5-methyl-2-phenyl-1,3,4-thiadiazol-2-yl | —NH—(3,5-di-CO₂Na-phenyl) |

-continued

[Structure shown: isomeric pyrazole-triazine-pyrazole bis-azo dye]

| Dye | Ar | R |
|---|---|---|
| 55 | 5-methyl-2-(3-CO₂Na-phenyl)-1,3,4-thiadiazol-2-yl | —NH—(3,5-di-CO₂Na-phenyl) |
| 56 | 5-methyl-2-(SCH₂CO₂Na)-1,3,4-thiadiazol-2-yl | —NH—(3,5-di-CO₂Na-phenyl) |
| 57 | 5-methyl-2-(SCH₂CHMe₂)-1,3,4-thiadiazol-2-yl | —NH—(3,5-di-CO₂Na-phenyl) |
| 58 | 5-methyl-2-(SC₂H₄OC₂H₅)-1,3,4-thiadiazol-2-yl | —NH—(3,5-di-CO₂Na-phenyl) |
| 59 | 5-methyl-2-(SCH₂CHMe₂)-1,3,4-thiadiazol-2-yl | —NH—(3,5-di-SO₃Li-phenyl) |
| 60 | 5-methyl-2-(SCH₂CHMe₂)-1,3,4-thiadiazol-2-yl | —NH—(3,5-di-CO₂⁻NH₄⁺-phenyl) |
| 61 | 5-methyl-2-(SCH₂CHMe₂)-1,3,4-thiadiazol-2-yl | —NHC₈H₁₇-n |

-continued

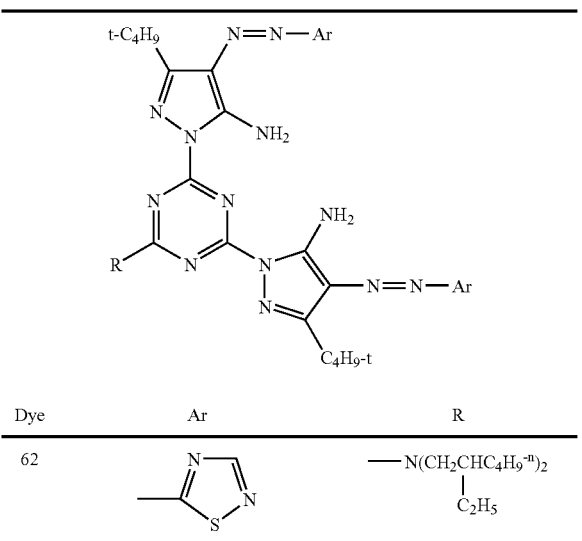

| Dye | Ar | R |
|---|---|---|
| 62 | 5-methyl-1,2,4-thiadiazol-3-yl | —N(CH$_2$CHC$_4$H$_9$-$^n$)$_2$ with C$_2$H$_5$ branch |

-continued

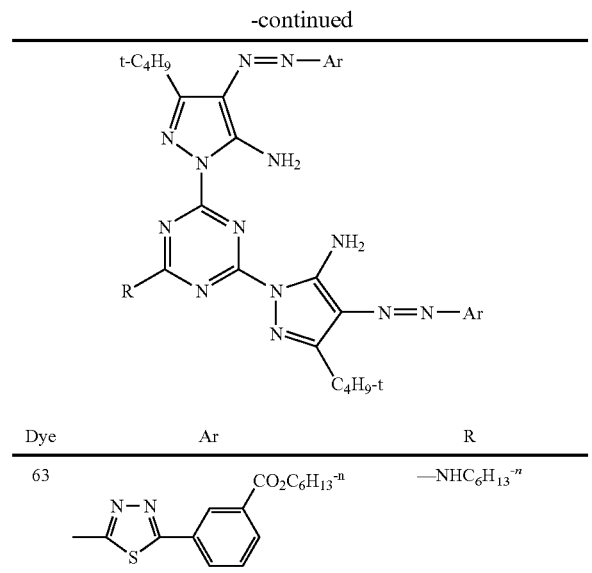

| Dye | Ar | R |
|---|---|---|
| 63 | 5-methyl-1,3,4-thiadiazol-2-yl substituted phenyl-CO$_2$C$_6$H$_{13}$-$^n$ | —NHC$_6$H$_{13}$-$^n$ |

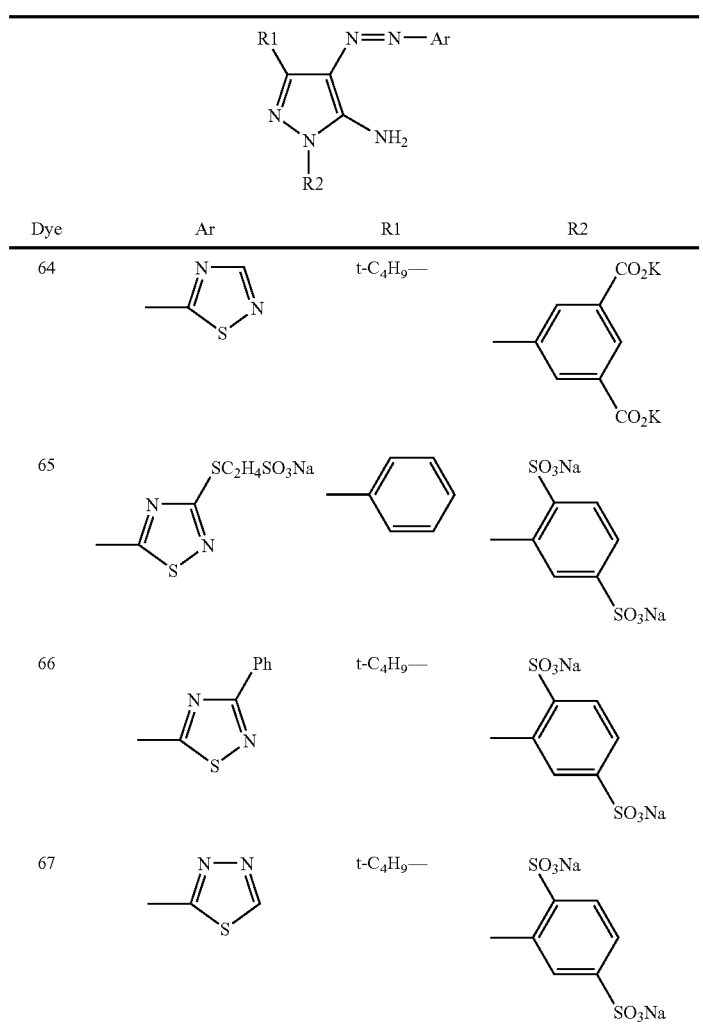

| Dye | Ar | R1 | R2 |
|---|---|---|---|
| 64 | 5-methyl-1,2,4-thiadiazol-3-yl | t-C$_4$H$_9$— | 3,5-bis(CO$_2$K)phenyl |
| 65 | 5-methyl-3-(SC$_2$H$_4$SO$_3$Na)-1,3,4-thiadiazol-2-yl | phenyl | 2,4-bis(SO$_3$Na)phenyl |
| 66 | 5-methyl-3-Ph-1,2,4-thiadiazol | t-C$_4$H$_9$— | 2,4-bis(SO$_3$Na)phenyl |
| 67 | 5-methyl-1,3,4-thiadiazol-2-yl | t-C$_4$H$_9$— | 2,4-bis(SO$_3$Na)phenyl |

-continued
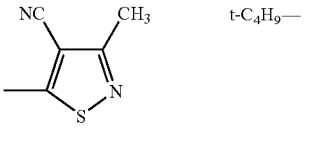
| Dye | Ar | R1 | R2 |
| --- | --- | --- | --- |
| 68 | 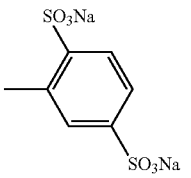 | t-C$_4$H$_9$— | 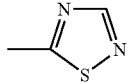 |
| 69 | 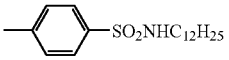 | t-C$_4$H$_9$— | 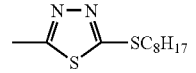 |
| 70 | 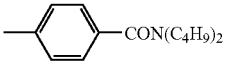 | t-C$_4$H$_9$— | 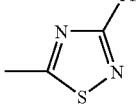 |
| 71 | 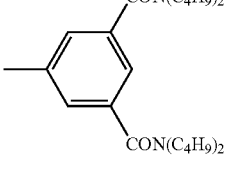 | t-C$_4$H$_9$— | 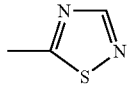 |
| 72 | 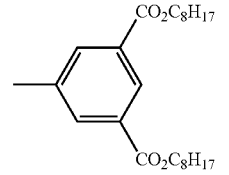 | t-C$_4$H$_9$— | 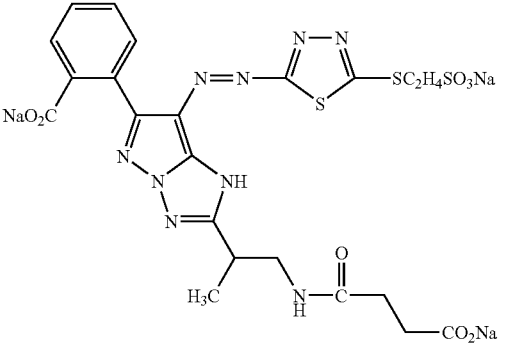 |
73

-continued
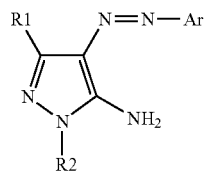
| Dye | Ar | R1 | R2 |
|---|---|---|---|
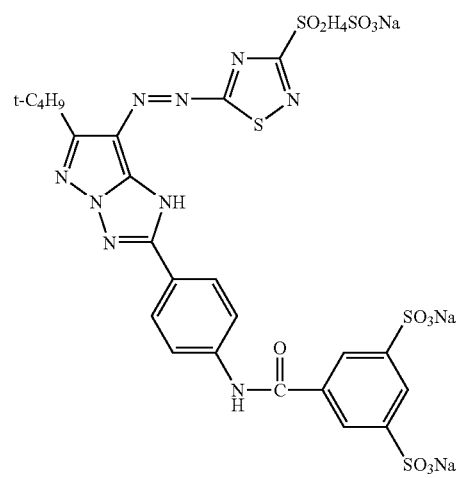

-continued
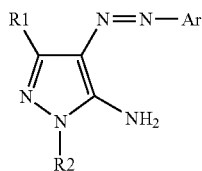
| Dye | Ar | R1 | R2 |
|---|---|---|---|
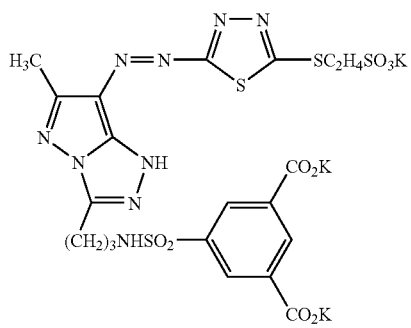
76
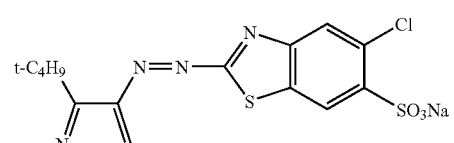
77
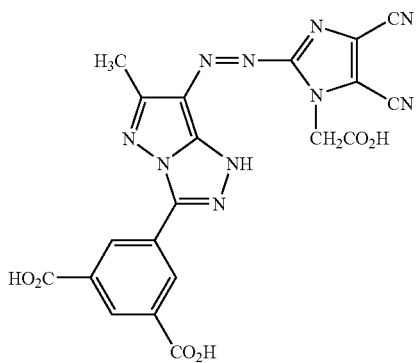
78

-continued
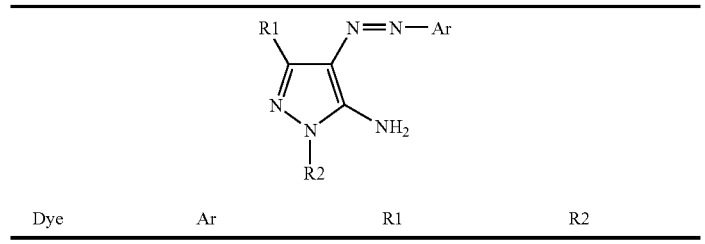
| Dye | Ar | R1 | R2 |
| --- | --- | --- | --- |
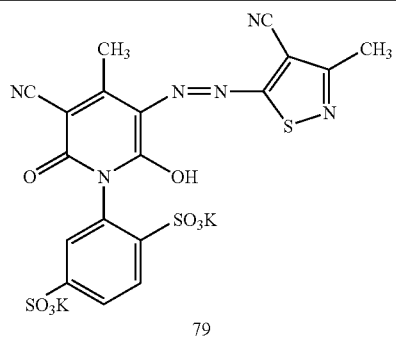
79
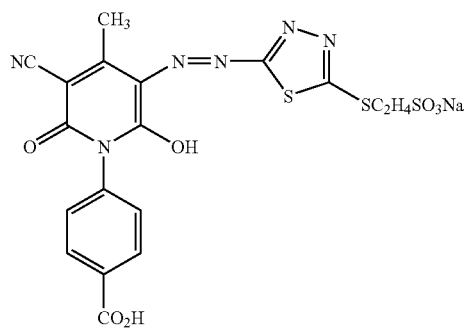
80
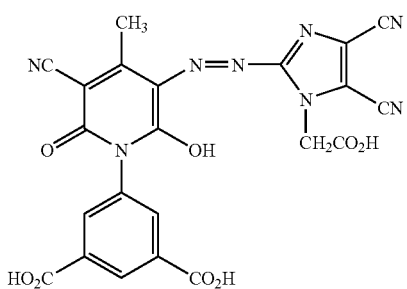
81
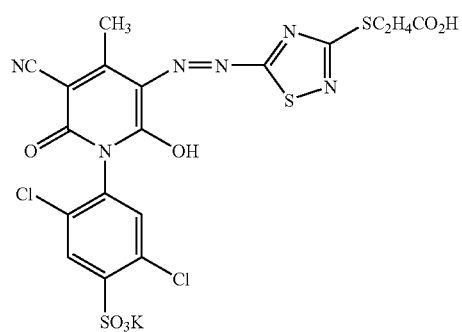
82

-continued

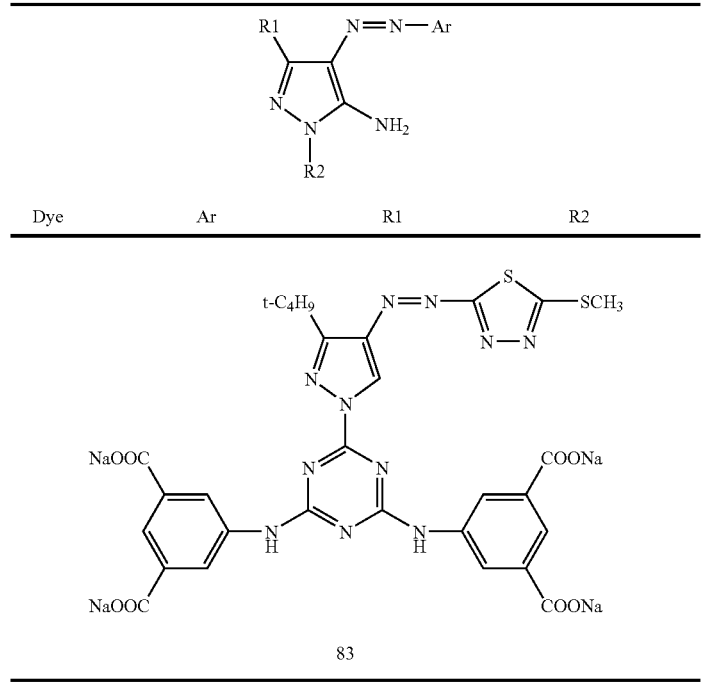

| Dye | Ar | R1 | R2 |
| --- | --- | --- | --- |

83

Preferably, the yellow ink of the invention contains, in addition to the dye mentioned above, another yellow ink represented by formula (Y2) or (Y3) and having an oxidation potential over 1.0 V (vs SCE).

$$P-N=N-Q \quad (Y2)$$

wherein P represents an optionally-substituted aryl group; and Q represents an optionally-substituted heterocyclic group, $$X-N=N-Y \quad (Y3)$$

wherein X and Y each represent an optionally-substituted aryl group.

In formula (Y2), Q is an optionally-substituted heterocyclic group, and its details are the same as those mentioned hereinabove for formula (Y1). P in formula (Y2), and X and Y in formula (Y3) each are an optionally-substituted aryl group. In formula (Y2), the group that is not a heterocyclic group is preferably an aryl group. Preferred examples of the aryl group are a phenyl group, a substituted phenyl group, a naphthyl group, and a substituted naphthyl group.

Various types of substituents may be introduced into the compounds for use herein. Examples of the substitutable substituents are an alkyl group (preferably having from 1 to 20, more preferably from 1 to 12, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20, more preferably from 2 to 12, even more preferably from 2 to 8 carbon atoms, e.g., vinyl, allyl, 2-butenyl, 3-pentenyl), an alkynyl group (preferably having from 2 to 20, more preferably from 2 to 12, even more preferably from 2 to 8 carbon atoms, e.g., propargyl, 3-pentynyl), an aryl group (preferably having from 6 to 30, more preferably from 6 to 20, even more preferably from 6 to 12 carbon atoms, e.g., phenyl, p-methylphenyl, naphthyl), an amino group (preferably having from 0 to 20, more preferably from 0 to 12, even more preferably from 0 to 6 carbon atoms, e.g., amino, methylamino, dimethylamino, diethylamino, diphenylamino, dibenzylamino), an alkoxy group (preferably having from 1 to 20, more preferably from 1 to 12, even more preferably from 1 to 8 carbon atoms, e.g., methoxy, ethoxy, butoxy), an aryloxy group (preferably having from 6 to 20, more preferably from 6 to 16, even more preferably from 6 to 12 carbon atoms, e.g., phenyloxy, 2-naphthyloxy), an acyl group (preferably having from 1 to 20, more preferably from 1 to 16, even more preferably from 1 to 12 carbon atoms, e.g., acetyl, benzoyl, formyl, pivaloyl), an alkoxycarbonyl group (preferably having from 2 to 20, more preferably from 2 to 16, even more preferably from 2 to 12 carbon atoms, e.g., methoxycarbonyl, ethoxycarbonyl), an aryloxycarbonyl group (preferably having from 7 to 20, more preferably from 7 to 16, even more preferably from 7 to 10 carbon atoms, e.g., phenyloxycarbonyl), an acyloxy group (preferably having from 2 to 20, more preferably from 2 to 16, even more preferably from 2 to 10 carbon atoms, e.g., acetoxy, benzoyloxy), an acylamino group (preferably having from 2 to 20, more preferably from 2 to 16, even more preferably from 2 to 10 carbon atoms, e.g., acetylamino, benzoylamino), an alkoxycarbonylamino group (preferably having from 2 to 20, more preferably from 2 to 16, even more preferably from 2 to 12 carbon atoms, e.g., methoxycarbonylamino), an aryloxycarbonylamino group (preferably having from 7 to 20, more preferably from 7 to 16, even more preferably from 7 to 12 carbon atoms, e.g., phenyloxycarbonylamino), a sulfonylamino group (preferably having from 1 to 20, more preferably from 1 to 16, even more preferably from 1 to 12 carbon atoms, e.g., methanesulfonylamino, benzenesulfonylamino), a sulfamoyl group (preferably having from 0 to 20, more preferably from 0 to 16, even more preferably from 0 to 12 carbon atoms, e.g., sulfamoyl, methylsulfamoyl, dimethylsulfamoyl, phenylsulfamoyl), a carbamoyl group (preferably having from 1 to 20, more preferably from 1 to 16, even more preferably from 1 to 12 carbon atoms, e.g., carbamoyl, methylcarbamoyl, diethylcarbamoyl, phenylcarbamoyl), an alkylthio group (preferably having from 1 to 20, more preferably from 1 to 16, even more preferably from 1 to 12 carbon atoms, e.g., methylthio, ethylthio), an arylthio group (preferably having from 6 to 20, more preferably from 6 to 16, even more preferably from 6 to 12 carbon atoms, e.g., phenylthio), a sulfonyl group (preferably having from 1 to 20, more preferably from 1 to 16, even more preferably from 1 to 12 carbon atoms, e.g., mesyl, tosyl), a sulfinyl group (preferably having from 1 to 20, more preferably from 1 to 16, even more preferably from 1 to 12 carbon atoms, e.g., methanesulfinyl, benzenesulfinyl), an ureido group (preferably having from 1 to 20, more preferably from 1 to 16, even more preferably from 1 to 12 carbon atoms, e.g., ureido, methylureido, phenylureido), a phosphoramido group (preferably having from 1 to 20, more preferably from 1 to 16, even more preferably from 1 to 12 carbon atoms, e.g., diethylphosphoramido, phenylphosphoramido), a hydroxyl group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably having from 1 to 30, more preferably from 1 to 12 carbon atoms, in which the heteroatom is selected from nitrogen, oxygen and sulfur atoms, concretely such as imidazolyl, pyridyl, quinolyl, furyl, thienyl, piperidyl, morpholino, benzoxazolyl, benzimidazolyl, benzothiazolyl, carbazolyl, azepinyl), a silyl group (preferably having from 3 to 40, more preferably from 3 to 30, even more preferably from 3 to 24 carbon atoms, e.g., trimethylsilyl, triphenylsilyl). These substituents may be further substituted. Two or more substituents, if any, may be the same or different. If possible, the substituents may bond to each other to form a ring.

Preferred examples of the dyes of formulae (Y2) and (Y3) for use in the invention are mentioned below, to which, however, the invention should not be limited.

YJ-1 C.I.Direct Yellow 86

YJ-2 C.I.Direct Yellow 120

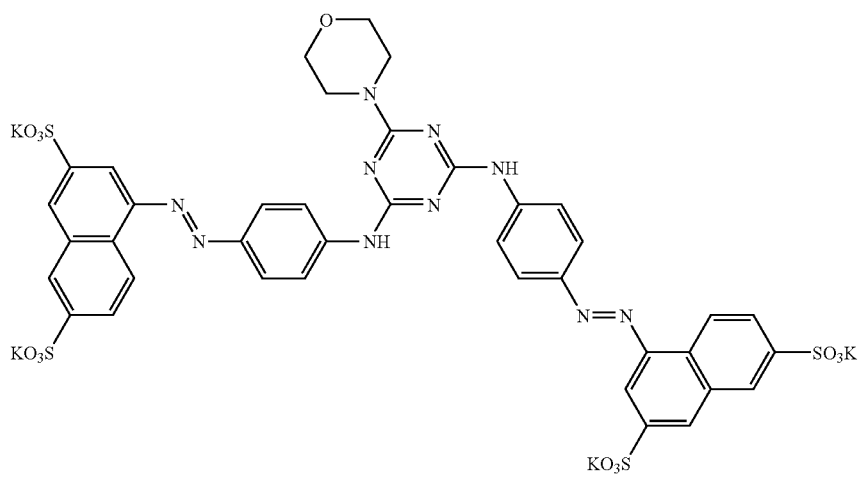

YJ-3

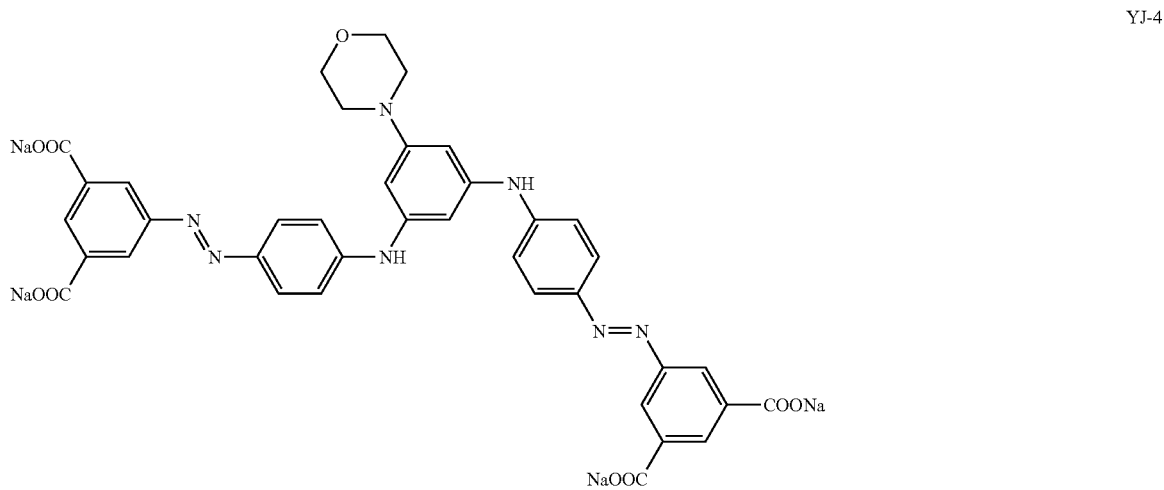

YJ-4

-continued
YJ-5
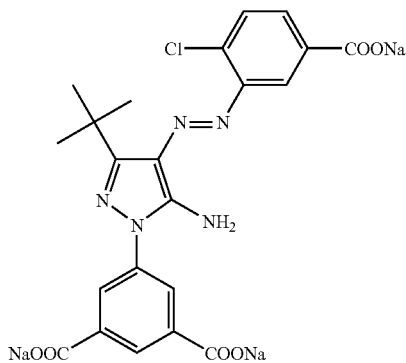
YJ-6
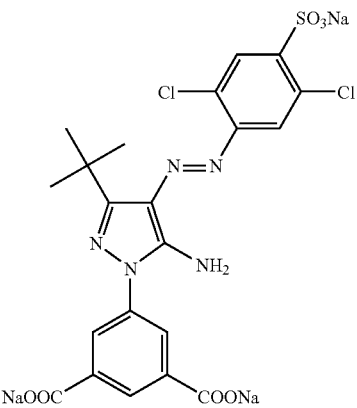
YJ-7
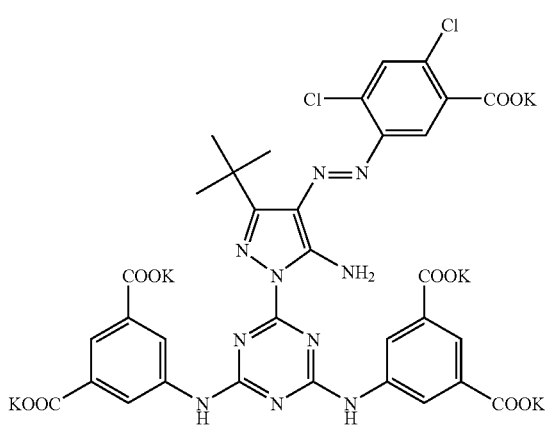
YJ-8
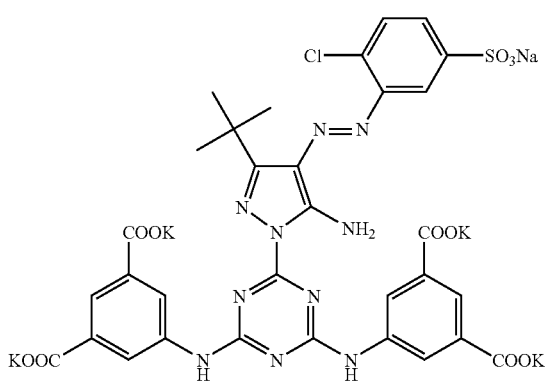
YJ-9
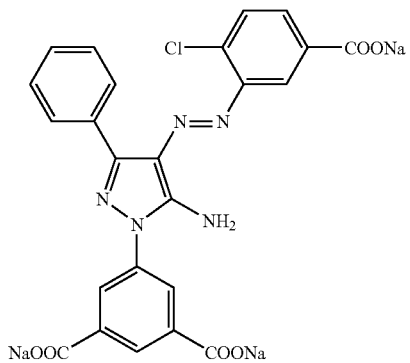
YJ-10
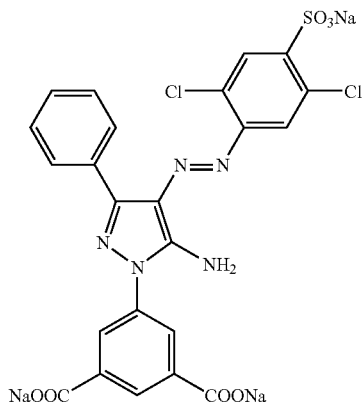

YJ-11

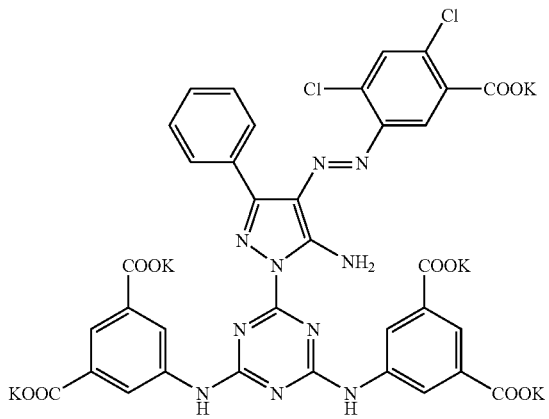

YJ-12

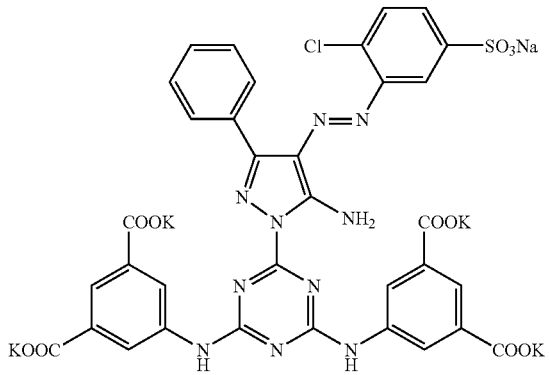

Preferably, the yellow ink for inkjet recording of the invention contains the above-mentioned azo dyes in an amount of from 0.2 to 20% by weight in total, more preferably from 0.5 to 15% by weight. Even more preferably, the dye of formula (Y1) accounts for at least 50 weight % of the dyes in the yellow ink.

Preferably, the black ink of the invention contains at least two dyes (L) each having a λmax from 500 nm to 700 nm, and having a half-value width ($W_{\lambda,1/2}$) of at 100 nm or more (preferably from 120 nm to 500 nm, more preferably from 120 nm to 350 nm) in the absorption spectrum of the diluted solution thereof standardized to have an absorbance of 1.0 at the λmax.

Preferably, at least one of the dyes (L) for use in the black ink has an oxidation potential over 1.0 V (vs SCE), more preferably over 1.1 V (vs SCE), even more preferably over 1.2 V (vs SCE), most preferably over 1.25 V (vs SCE).

The oxidation potential (Eox) of dyes may be readily measured by anyone skilled in the art. For measuring it, herein employable are various methods of, for example, cyclic voltammetry (CV) in an aqueous solution or a water-mixed solvent system with a dye dissolved therein, rotary ring-disc electrode method or combed electrode method.

In the invention, the dyes (L) are mixed and dissolved or dispersed in an aqueous medium to prepare a black ink. Preferably, the black ink contains the dyes mentioned below.

The dye (L) may be used alone for black ink, so far as it may realize a "tight" black image of high quality (in which none of B, G and R color tones are highlighted irrespective of the viewing light source) by itself. In general, however, the dye is combined with any other dye capable of covering the region that is poorly absorbed by the dye (L). Concretely, it is desirable that the dye (L) is combined with a dye (S) having a main absorption in an yellow region (and having λmax of from 350 to 500 mm). As the case may be, the dye (L) may also be combined with any other dye to form black ink.

Preferably, the black ink of the invention contains the azo dye of formula (B1). The azo dye of formula (B1) includes the dye (L) having a λmax of from 500 nm to 700 nm, and having a half-value width of at least 100 nm in the absorption spectrum of the diluted solution thereof standardized to have an absorbance of 1.0. Apart from it, the azo dye of formula (B1) further includes the dye (S) having a λmax of from 350 nm to 500 nm. Preferably, at least one dyes (L) in the black ink of the invention is the dye of formula (B1), more preferably, both at least one dye (L) and at least one dye (S) are the dye of formula (B1). Even more preferably, the dye of formula (B1) accounts for at least 50% by weight of all the dyes in the ink.

Preferably, the black ink of the invention contains an additional azo dye of formula (B2) in addition to the dye mentioned above. Preferably, the dye of formula (B2) corresponds to the dye (L) having a λmax of from 500 nm to 700 nm, and having a half-value width of at least 100 nm in the absorption spectrum of the diluted solution thereof standardized to have an absorbance of 1.0. Like the dye of formula (B1), the dye of formula (B2) may also be the dye (S) having a λmax of from 350 nm to 500 nm.

The dye of formula (B2) is a dye classified in a group of aromatic bisazo dyes, and different from the dye of formula (B1), this is a compound in which the chromophoric site is entirely formed of hydrocarbon rings. Examples of the dye are described in Japanese Patents 3,428,178 and 2,428,263, and in CN136830-A.

Of the dyes of formulae (B1) and (B2), those having a high oxidation potential and having a high degree of associability are especially preferred for use in the invention. For the purpose, it is desirable that the dyes are so designed that a larger number of electron-attractive groups could be in the molecule and the 1-electron density existing in the main aromatic rings could be lowered, or are so designed that the molecule could have a plain structure capable of promoting association and could have multiple, strongly-interactive groups as the intermolecular substituents therein so as to induce molecular association.

The strongly-interactive groups are, for example, hydrogen-bonding groups, and they are preferably —COOH, —OH, $SO_2NH$—, —CONH—, more preferably having-CONH—. It is desirable that the dye molecule has a plurality of such hydrogen-bonding groups therein. Also preferably, the dye molecule has a number of plain-structured groups via which the molecules could readily overlap with each other. The groups are, for example, a biphenyl group and a naphthyl group.

Regarding the dyes of high associability, when the spectrum of the dye is measured as an aqueous solution thereof having a concentration of 0.025 mmol/liter, in a cell having a light guide length of 1 cm, and when the spectrum of the dye is measured as an aqueous solution thereof having a concentration of 50 mmol/liter in a cell having a light guide length of 5 μm, then the position of λmax in the spectra and the absorbance differ from each other. In particular, the absorbance drastically changes. In general, when the absorbance of the high-concentration solution is divided by that of the low-concentration solution, then it preferably gives at least 1.0, more preferably at least 1.2, even more preferably at least 1.3.

In the invention, the black ink is prepared by mixing the black dyes and dissolving or dispersing the resulting mixture in an aqueous medium. The preferred properties of the black ink for inkjet recording are that 1) its weather resistance is good and/or 2) the image does not lose the black balance even after faded. In order that the black ink of the invention could have the preferred properties, it is desirable that the black ink satisfies the following conditions.

Using the black ink, 48-point size, black square symbols of JIS code 2223 are printed, and their reflection density ($D_{vis}$) is measured via a status A filter (visual filter). This is an initial density of the sample. One example of the reflection densitometer equipped with a status A filter is an X-Rite densitometer. To measure the density of "black" herein, the measured data $D_{vis}$ are referred to as the standard observation reflection density. The printed matter is forcedly faded by the use of an ozone fading tester where 5 ppm ozone is generated all the time. The period of time (t) in which the reflection density ($D_{vis}$) of the faded sample is reduced to 80% of the initial density of the original sample is counted, and a forced fading rate constant ($k_{vis}$) is derived from a relational formula, $0.8 = \exp(k_{vis} \cdot t)$.

Preferably, the rate constant ($k_{vis}$) of the black ink in the invention is at most $5.0 \times 10^{-2}$ [hour$^{-1}$], more preferably at most $3.0 \times 10^{-2}$ [hour$^{-1}$], even more preferably at most $1.0 \times 10^{-2}$ [hour$^{-1}$].

Using the black ink of the invention, 48-point size, black square symbols of JIS code 2223 are printed, and the reflection density of three colors C (cyan), M (magenta) and Y (yellow), except $D_{vis}$, is measured via a status A filter. Thus measured, the data are initial density $D_R$, $D_G$ and $D_B$. These data $D_R$, $D_G$ and $D_B$ indicate the C reflection density through red filter, the M reflection density through green filter, and the Y reflection density through blue filter, respectively. The printed matter is forcedly faded by the use of an ozone fading tester where 5 ppm ozone is generated all the time, in the same manner as above. From the period of time in which the reflection density $D_R$, $D_G$ and $D_B$ of the faded sample is reduced to 80% of the initial density of the original sample, the forced fading rate constant ($k_R$, $k_G$, $k_B$) is derived in the same manner as above. The ratio (R) of the maximum value to the minimum value of the three rate constants (for example, when $k_R$ is the maximum value and the $k_G$ is the minimum value, $R = k_R/k_G$) is preferably at most 1.2, more preferably at most 1.1, even more preferably at most 1.05.

In the "printed matter with 48-point size, black square symbols of JIS code 2223 thereon" used in the above, the image is printed to a size that fully covers the aperture of the tester in order that it may be enough for the density measurement.

In order that the black dyes for use in the black ink of the invention could have good color hue, fastness, and storage stability, it is desirable that the dyes satisfy the following physical properties:

Property 1: When the maximum absorption wavelength in the absorption spectrum in DMF is referred to as λmax (DMF), then 680 nm ≧ λmax(DMF) ≧ 570 nm.

Property 2: The oxidation potential is positive over 1.0 V (vs SCE).

Property 3: When the maximum absorption wavelength of the absorption spectrum in water is referred to as λmax (water), then |λmax(DMF) − λmax(water)| ≧ 30 nm.

Property 4: When the molar absorption coefficient in DMF is referred to as ε(DMF) and when the molar absorption coefficient in water is referred to as ε(water), then ε(water)/ε(DMF) ≦ 0.9.

Property 5: In the absorption spectrum measured in water, when the absorbance at the maximum absorption wavelength of the associated dye is referred to as Abs (associated) and when the absorbance at the maximum absorption wavelength of the monomer absorption spectrum measured in DMF is referred to as Abs (monomer), then Abs (monomer)/Abs (associated) ≦ 0.75.

In addition, when a dye is not dissoloved in 100% DMF, the dye is dissolved in water (10% or less by weight of DMF solvent) to prepare a solution and the solution is diluted with DMF to prepare a diluted solution. The measurement value in the diluted solution is defined as the value in DMF.

Satisfying the above-mentioned physical properties, the black dyes may have good black color and have good light fastness and ozone fastness, and, in addition, their storage stability in ink is good. Therefore, the black dyes of the type are preferred for use in the invention.

Preferably, the ink for the ink set of the invention is characterized by the following:

Concretely, at least two inks are used, and 15-stage gradation print samples are formed to a degree of at most up to 30 ml/m$^2$. The maximum value of the reflection density of the pattern (this is a value of density measured at a site where the reflection density is saturated and could no more increase even when the printing ink amount is increased) is higher on the side of the high-concentration ink.

The ink set of the invention satisfies any one or more of these conditions. Preferably, it satisfies all these conditions.

The dyes of formula (B1) are described below.

$$A_{41}\text{-}N\!=\!N\text{-}A_{42}\text{-}N\!=\!N\text{-}A_{43} \quad (B1)$$

wherein $A_{41}$, $A_{42}$ and $A_{43}$ each independently represent an aromatic group or a heterocyclic group that may be further substituted; $A_{41}$ and $A_{43}$ are monovalent groups, and $A_{42}$ is a divalent group.

The azo dyes of formula (B1) are more preferably those of the following formula (B1-A):

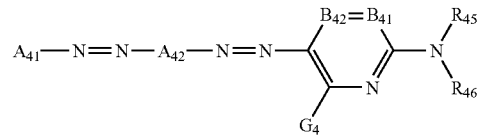

In formula (B1-A), $B_{41}$ and $B_{42}$ each represent =CR$_{41}$— or —CR$_{42}$=, or any one of them is a nitrogen atom and the other is =CR$_{41}$— or —CR$_{42}$=.

$G_4$, $R_{41}$ and $R_{42}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic-amino group), an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, a heterocyclic-thio group, an alkyl or arylsulfonyl group, a heterocyclic sulfonyl group, an alkyl or arylsulfinyl group, a heterocyclic sulfinyl group, a sulfamoyl group, or a sulfo group. These groups may be substituted.

$R_{45}$ and $R_{46}$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group. These groups may be further substituted.

$R_{41}$ and $R_{45}$, or $R_{45}$ and $R_{46}$ may bond to each other to form a 5- or 6-membered ring. $A_{41}$ and $A_{42}$ have the same meanings as in formula (B1).

Of the azo dyes of formula (B1-A), more preferred are those of the following formula (B1-B1) or (B1-B2):

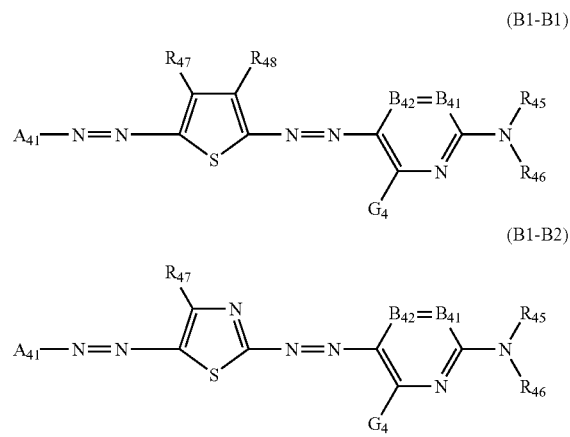

In formulae (B1-B1) and (B1-B2), $R_{47}$ and $R_{48}$ have the same meaning as that of $R_{41}$ in formula (B1-A). $A_{41}$, $R_{45}$, $R_{46}$, $B_{41}$, $B_{42}$ and $G_4$ have the same meanings as in formula (B1-A).

The terms (substituents) used in describing formula (B1) and its more specific concepts, formulae (B1-A) and (B1-B) (hereinafter (B1-B) includes both formulae (B1-B1) and (B1-B2)) are described below. These are common to the description of formulae (B1-C) and (B1-D) given hereinafter.

The halogen atom includes fluorine, chlorine and bromine atoms.

The aliphatic group means to include an alkyl group, a substituted alkyl group, an alkenyl group, a substituted alkenyl group, an alkynyl group, a substituted alkynyl group, an aralkyl group and a substituted aralkyl group. The aliphatic group may be branched or may be cyclic. Preferably, the aliphatic group has from 1 to 20 carbon atoms, more preferably from 1 to 16 carbon atoms. The aryl moiety of the aralkyl group and the substituted aralkyl group is preferably a phenyl or naphthyl group, more preferably a phenyl group. Examples of the aliphatic group are methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl groups.

The monovalent aromatic group means to include an aryl group and a substitute aryl group. The aryl group is preferably a phenyl or naphthyl group, more preferably a phenyl group. The monovalent aromatic group preferably has from 6 to 20 carbon atoms, more preferably from 6 to 16 carbon atoms. Examples of the monovalent aromatic group are phenyl, p-tolyl, p-methoxyphenyl, o-chlorophenyl and m-(3-sulfopropylamino)phenyl groups. The divalent aromatic group corresponds to but differs from the monovalent aromatic group in that it is a divalent group. Its examples are phenylene, p-tolylene, p-methoxyphenylene, o-chlorophenylene, m-(3-sulfopropylamino)phenylene and naphthylene groups.

The heterocyclic group means to include a substituted heterocyclic group and an unsubstituted heterocyclic group. The hetero ring may be condensed with an aliphatic ring, an aromatic or any other hetero ring. The heterocyclic group is preferably a 5- or 6-membered heterocyclic group. The hetero atom to form the hetero ring includes N, O and S. Examples of the substituent of the substituted heterocyclic group are an aliphatic group, a halogen atom, an alkylsulfonyl group, an arylsulfonyl group, an acyl group, an acylamino group, a sulfamoyl group, a carbamoyl group, and an ionic hydrophilic group. Examples of the monovalent heterocyclic group are 2-pyridyl, 2-thienyl, 2-thiazolyl, 2-benzothiazolyl, 2-benzoxazolyl and 2-furyl groups. The divalent heterocyclic group is derived from the monovalent hetero ring by removing one hydrogen atom from it to have a free bond.

The carbamoyl group means to include a substituted carbamoyl group and an unsubstituted carbamoyl group. One example of the substituent of the substituted carbamoyl group is an alkyl group. Examples of the carbamoyl group are methylcarbamoyl and dimethylcarbamoyl groups.

The alkoxycarbonyl group means to include a substituted alkoxycarbonyl group and an unsubstituted alkoxycarbonyl group. The alkoxycarbonyl group preferably has from 2 to 20 carbon atoms. One example of the substituent of the substituted group is an ionic hydrophilic group. Examples of the alkoxycarbonyl group are methoxycarbonyl and ethoxycarbonyl groups.

The aryloxycarbonyl group means to include a substituted aryloxycarbonyl group and an unsubstituted aryloxycarbonyl group. The aryloxycarbonyl group preferably has from 7 to 20 carbon atoms. One example of the substituent of the substituted group is an ionic hydrophilic group. One example of the alkoxycarbonyl group is a phenoxycarbonyl group.

The heterocyclic-oxycarbonyl group means to include a substituted heterocyclic-oxycarbonyl group and an unsubstituted heterocyclic-oxycarbonyl group. The heterocyclic-oxycarbonyl group preferably has from 2 to 20 carbon atoms. One example of the substituent of the substituted group is an ionic hydrophilic group. One example of the heterocyclic-oxycarbonyl group is a 2-pyridyloxycarbonyl group.

The acyl group means to include a substituted acyl group and an unsubstituted acyl group. The acyl group preferably has from 1 to 20 carbon atoms. One example of the substituent of the substituted acyl group is an ionic hydrophilic group. Examples of the acyl group are acetyl and benzoyl groups.

The alkoxy group means to include a substituted alkoxy group and an unsubstituted alkoxy group. The alkoxy group preferably has from 1 to 20 carbon atoms. Examples of the substituent of the substituted alkoxy group are an alkoxy group, a hydroxyl group, and a ionic hydrophilic group. Examples of the alkoxy group are methoxy, ethoxy, isopropoxy, methoxyethoxy, hydroxyethoxy and 3-carboxypropoxy groups.

The aryloxy group means to include a substituted aryloxy group and an unsubstituted aryloxy group. The aryloxy group preferably has from 6 to 20 carbon atoms. Examples of the substituent for the substituted aryloxy group are an alkoxy group and an ionic hydrophilic group. Examples of the aryloxy group are phenoxy, p-methoxyphenoxy and o-methoxyphenoxy groups.

The heterocyclic-oxy group means to include a substituted heterocyclic-oxy group and an unsubstituted heterocyclic-oxy group. The heterocyclic-oxy group preferably has from 2 to 20 carbon atoms. Examples of the substituent of the substituted group are an alkyl group, an alkoxy group, and an ionic hydrophilic group. Examples of the heterocyclic-oxy group are 3-pyridyloxy and 3-thienyloxy groups.

The silyloxy group is preferably substituted with an aliphatic and/or aromatic group having from 1 to 20 carbon atoms. Examples of the silyloxy group are trimethylsilyloxy and diphenylmethylsilyloxy groups.

The acyloxy group means to include a substituted acyloxy group and an unsubstituted acyloxy group. The acyloxy group preferably has from 1 to 20 carbon atoms. One example of the substituent of the substituted acyloxy group is an ionic hydrophilic group. Examples of the acyloxy group are acetoxy and benzoyloxy groups.

The carbamoyloxy group means to include a substituted carbamoyloxy group and an unsubstituted carbamoyloxy group. One example of the substituent of the substituted carbamoyloxy group is an alkyl group. One example of the carbamoyloxy group is an N-methylcarbamoyloxy group.

The alkoxycarbonyloxy group means to include a substituted alkoxycarbonyloxy group and an unsubstituted alkoxycarbonyloxy group. The alkoxycarbonyloxy group preferably has from 2 to 20 carbon atoms. Examples of the alkoxycarbonyloxy group are methoxycarbonyloxy and isopropoxycarbonyloxy groups.

The aryloxycarbonyloxy group means to include a substituted aryloxycarbonyloxy group and an unsubstituted aryloxycarbonyloxy group. The aryloxycarbonyloxy group preferably has from 7 to 20 carbon atoms. One example of the aryloxycarbonyloxy group is a phenoxycarbonyloxy group.

The amino group means to include an unsubstituted amino group and an amino group substituted with any of an alkyl group, an aryl group or a heterocyclic group. The substituents, alkyl group, aryl group and heterocyclic group may be further substituted. The alkylamino group preferably has from 1 to 20 carbon atoms. One example of the substituent of the substituted groups is an ionic hydrophilic group. Examples of the alkylamino group are methylamino and diethylamino groups.

The arylamino group means to include a substituted arylamino group and an unsubstituted arylamino group. The arylamino group preferably has from 6 to 20 carbon atoms. Examples of the substituent of the substituted arylamino group are a halogen atom and an ionic hydrophilic group. Examples of the arylamino group are anilino and 2-chlorophenylamino groups.

The heterocyclic amino group means to include a substituted heterocyclic amino group and an unsubstituted heterocyclic amino group. The heterocyclic amino group preferably has from 2 to 20 carbon atoms. Examples of the substituent of the substituted group are an alkyl group, a halogen atom and an ionic hydrophilic group.

The acylamino group means to include a substituted acylamino group and an unsubstituted acylamino group. The acylamino group preferably has from 2 to 20 carbon atoms. One example of the substituent of the substituted acylamino group is an ionic hydrophilic group. Examples of the acylamino group are acetylamino, propionylamino, benzoylamino, N-phenylacetylamino and 3,5-disulfobenzoylamino groups.

The ureido group means to include a substituted ureido group and an unsubstituted ureido group. The ureido group preferably has from 1 to 20 carbon atoms. Examples of the substituent of the substituted ureido group are an alkyl group and an aryl group. Examples of the ureido group are 3-methylureido, 3,3-dimethylureido and 3-phenylureido groups.

The sulfamoylamino group means to include a substituted sulfamoylamino group and an unsubstituted sulfamoylamino group. One example of the substituent of the substituted sulfamoylamino group is an alkyl group. One example of the sulfamoylamino group is an N,N-dipropylsulfamoylamino group.

The alkoxycarbonylamino group means to include a substituted alkoxycarbonylamino group and an unsubstituted alkoxycarbonylamino group. The alkoxycarbonylamino group preferably has from 2 to 20 carbon atoms. One example of the substituent of the substituted alkoxycarbonylamino group is an ionic hydrophilic group. One example of the alkoxycarbonylamino group is an ethoxycarbonylamino group.

The aryloxycarbonylamino group means to include a substituted aryloxycarbonylamino group and an unsubstituted aryloxycarbonylamino group. The aryloxycarbonylamino group preferably has from 7 to 20 carbon atoms. One example of the substituent of the substituted group is an ionic hydrophilic group. One example of the aryloxycarbonylamino group is a phenoxycarbonylamino group.

The alkylsulfonylamino group and the arylsulfonylamino group mean to include substituted alkylsulfonylamino and arylsulfonylamino groups and unsubstituted alkylsulfonylamino and arylsulfonylamino groups. The sulfonylamino group preferably has from 1 to 20 carbon atoms. One example of the substituent of the substituted group is an ionic hydrophilic group. Examples of the sulfonylamino groups are methylsulfonylamino, N-phenyl-methylsulfonylamino, phenylsulfonylamino and 3-carboxyphenylsulfonylamino groups.

The heterocyclic sulfonylamino group means to include a substituted heterocyclic sulfonylamino group and an unsubstituted heterocyclic sulfonylamino group. The heterocyclic sulfonylamino group preferably has from 1 to 12 carbon atoms. One example of the substituent of the substituted group is an ionic hydrophilic group. Examples of the heterocyclic sulfonylamino group are 2-thiophenesulfonylamino and 3-pyridinesulfonylamino groups.

The heterocyclic sulfonyl group means to include a substituted heterocyclic sulfonyl group and an unsubstituted heterocyclic sulfonyl group. The heterocyclic sulfonyl group preferably has from 1 to 20 carbon atoms. One example of the substituent of the substituted group is an ionic hydrophilic group. Examples of the heterocyclic sulfonyl group are 2-thiophenesulfonyl and 3-pyridinesulfonyl groups.

The heterocyclic sulfinyl group means to include a substituted heterocyclic sulfinyl group and an unsubstituted heterocyclic sulfinyl group. The heterocyclic sulfinyl group preferably has from 1 to 20 carbon atoms. One example of the substituent of the substituted group is an ionic hydrophilic group. One example of the heterocyclic sulfinyl group is a 4-pyridinesulfinyl group.

The alkylthio group, the arylthio group and the heterocyclic-thio group mean to include substituted alkylthio, arylthio and heterocyclic-thio groups and unsubstituted alkylthio, arylthio and heterocyclic-thio groups. The alkylthio, arylthio and heterocyclic-thio group preferably has from 1 to 20 carbon atoms. One example of the substituent of the substituted group is an ionic hydrophilic group. Examples of the alkylthio, arylthio and heterocyclic-thio groups are methylthio, phenylthio and 2-pyridylthio groups.

The alkylsulfonyl group and the arylsulfonyl group mean to include substituted alkylsulfonyl and arylsulfonyl groups, and unsubstituted alkylsulfonyl and arylsulfonyl groups. Examples of the alkylsulfonyl and arylsulfonyl groups are methylsulfonyl and phenylsulfonyl groups.

The alkylsulfinyl group and the arylsulfinyl group mean to include substituted alkylsulfinyl and arylsulfinyl groups, and unsubstituted alkylsulfinyl and arylsulfinyl groups. Examples of the alkylsulfinyl and arylsulfinyl groups are methylsulfinyl and phenylsulfinyl groups.

The sulfamoyl group means to include a substituted sulfamoyl group and an unsubstituted sulfamoyl group. One example of the substituent of the substituted sulfamoyl group is an alkyl group. Examples of the sulfamoyl group are dimethylsulfamoyl and di(2-hydroxyethyl)sulfamoyl groups.

Formulae (B1), (B1-A) and (B1-B) are further described.

In the following description, those described hereinabove shall apply to the groups and the substituents.

In formula (B1), $A_{41}$, $A_{42}$ and $A_{43}$ each independently represent an optionally-substituted aromatic group ($A_{41}$ and $A_{43}$ each are a monovalent aromatic group such as an aryl group; $A_{42}$ is a divalent aromatic group such as an arylene group), or an optionally-substituted heterocyclic group ($A_{41}$ and $A_{43}$ each are a monovalent heterocyclic group; $A_{42}$ is a divalent heterocyclic group). Examples of the aromatic ring are benzene and naphthalene rings; and the hetero atom to form the hetero ring includes N, O and S. The hetero ring may be condensed with an aliphatic ring, an aromatic ring or any other hetero ring.

The substituent may be an arylazo group or a heterocyclic azo group. Accordingly, the dyes of formula (B1) include trisazo dyes and tetrakisazo dyes.

Preferably, at least two of $A_{41}$, $A_{42}$ and $A_{43}$ are heterocyclic groups.

Preferably, the heterocyclic group for $A_{43}$ is an aromatic, nitrogen-containing 6-membered heterocyclic group. More preferably, $A_{43}$ is an aromatic, nitrogen-containing 6-membered heterocyclic group of the following formula (B1-C). In this case, formula (B1) corresponds to formula (B1-A).

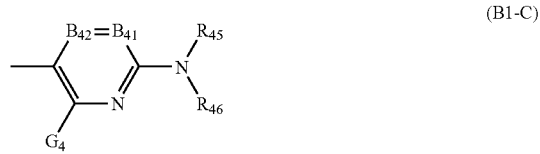

(B1-C)

In formula (B1-C), $B_{41}$ and $B_{42}$ each represents $=CR_{41}—$ and $—CR_{42}=$, or any one of them represents a nitrogen atom and the other represents $=CR_{41}—$ or $—CR_{42}=$. Preferably, they represent $=CR_{41}—$ and $—CR_{42}=$.

$R_{45}$ and $R_{46}$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group. These groups may be further substituted. Preferably, $R_{45}$ and $R_{46}$ each are a hydrogen atom, an aliphatic group, an aromatic group, a heterocyclic group, an acyl group, or an alkyl or arylsulfonyl group. More preferably, they are any of a hydrogen atom, an aromatic group, a heterocyclic group, an acyl group, or an alkyl or arylsulfonyl group; most preferably, any of a hydrogen atom, an aryl group or a heterocyclic group. The groups may be further substituted.

$G_4$, $R_{41}$ and $R_{42}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group (including alkylamino, arylamino, heterocyclic amino), an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, a heterocyclic-thio group, an alkyl or arylsulfonyl group, a heterocyclic sulfonyl group, an alkyl or arylsulfinyl group, a heterocyclic sulfinyl group, a sulfamoyl group, or a sulfo group, and each group may further be substituted.

The substituent for $G_4$ is preferably a hydrogen atom, a halogen atom, an aliphatic group, an aromatic group, a hydroxyl group, an alkoxy group, an aryloxy group, an acyloxy group, a heterocyclic-oxy group, an amino group (including an alkylamino group, an arylamino group, a heterocyclic amino group), an acylamino group, an ureido group, a sulfamoylamino group, an alkoxycarbonylamino group, an aryloxycarbonylamino group, an alkyl or arylthio group, or a heterocyclic-thio group; more preferably a hydrogen atom, a halogen atom, an alkyl group, a hydroxyl group, an alkoxy group, an aryloxy group, an acyloxy group, an amino group (including an alkylamino group, an arylamino group, a heterocyclic amino group), or an acylamino group; most preferably a hydrogen atom, an arylamino group, or an acylamino group. These groups may be further substituted.

The substituent for $R_{41}$ and $R_{42}$ is preferably a hydrogen atom, an alkyl group, an aryl group, a heterocyclic group, a halogen atom, an alkoxycarbonyl group, a carboxyl group, a carbamoyl group, a hydroxyl group, an alkoxy group, or a cyano group. These groups may be further substituted. $R_{41}$ and $R_{45}$, or $R_{45}$ and $R_{46}$ may bond to each other to form a 5- or 6-membered ring. For the substituents for the substituted groups for $A_{41}$, $R_{41}$, $R_{42}$, $R_{45}$, $R_{46}$ and $G_4$, referred to are those mentioned hereinabove for the groups for $G_4$, $R_{41}$ and $R_{42}$. Preferably, the dyes have an ionic hydrophilic group at any position of $A_{41}$, $R_{41}$, $R_{42}$, $R_{45}$, $R_{46}$ and $G_4$ therein.

The substituent, ionic hydrophilic group includes, for example, a sulfo group, a carboxyl group, a phosphono group and a quaternary ammonium group. Preferably, the ionic hydrophilic group is a carboxyl group, a phosphono group or a sulfo group, more preferably a carboxyl group or a sulfo group. The carboxyl group, phosphono group and sulfo group may form salts. Examples of the counter ion to form the salts are ammonium ions, alkalimetal ions (e.g., lithiumion, sodiumion, potassium ion), and organic cations (e.g., tetramethylammonium ion, tetramethylguanidium ion, tetramethylphosphonium ion).

Preferred hetero rings for $A_{42}$ are thiophene, thiazole, imidazole, benzimidazole and thienothiazole rings. These heterocyclic groups may be further substituted. Above all, especially preferred are thiophene, thiazole, imidazole, benzimidazole and thienothiazole rings of the following formulae (h) to (l). When $A_{42}$ is a thiophene ring (h) and when $A_{43}$ has the structure of formula (B1-C), then formula (B1) corresponds to formula (B1-B1). When $A_{42}$ is a thiazole ring (i) and when $A_{43}$ has the structure of formula (B1-C), then formula (B1) corresponds to formula (B1-B2).

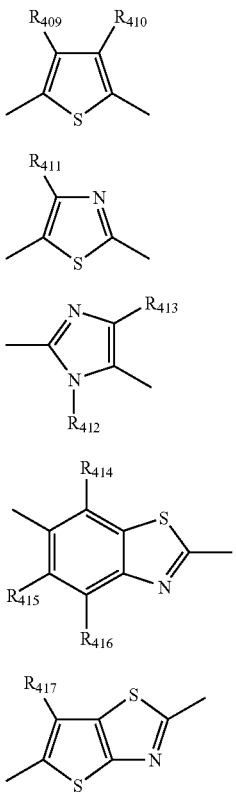

(h)

(i)

(j)

(k)

(l)

In formulae (h) to (l), $R_{409}$ to $R_{417}$ have the same meanings as those of the substituents of $G_4$, $R_{42}$ and $R_{43}$ in formula (B1-C)

For use in the invention, more preferred are the dyes having a structure of the following formula (B1-D1) or (4-D2). (Formula (B1-D) generically indicates both formulae (B1-D1) and (4-D2).)

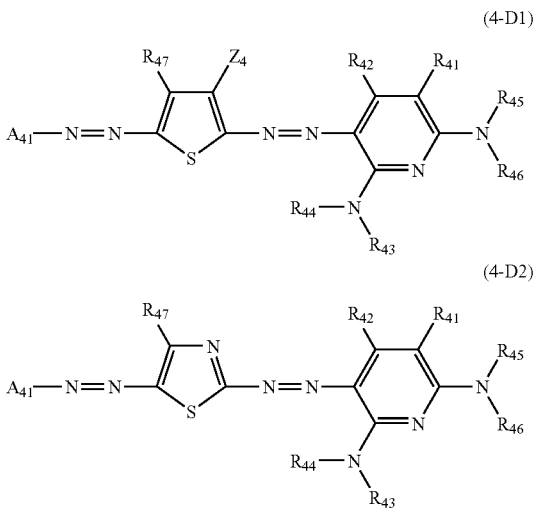

In formula (B1-D1), $Z_4$ represents an electron-attractive group having a Hammett's substituent constant σp of at least 0.20. Preferably, $Z_4$ is an electron-attractive group having σp of at least 0.30, more preferably at least 0.45, even more preferably at least 0.60, but not exceeding 1.0.

Concretely, examples of the electron-attractive group having a Hammett's substituent constant σp of at least 0.60 are a cyano group, a nitro group, and an alkylsulfonyl group (e.g., methanesulfonyl, arylsulfonyl such as benzenesulfonyl).

Examples of the electron-attractive group having a Hammett's substituent constant σp of at least 0.45 are, in addition to the groups mentioned above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl), and a halogenoalkyl group (e.g., trifluoromethyl).

Examples of the electron-attractive group having a Hammett's substituent constant σp of at least 0.30 are, in addition to the groups mentioned above, an acyloxy group (e.g., acetoxy), a carbamoyl group (e.g., N-ethylcarbamoyl, N,N-diethylcarbamoyl), a halogenoalkoxy group (e.g., trifluoromethoxy), a halogenoaryloxy group (e.g., pentafluorophenyloxy), a sulfonyloxy group (e.g., methylsulfonyloxy), a halogenoalkylthio group (e.g., difluoromethylthio), an aryl group substituted with at least two electron-attractive groups each having σp of at least 0.15 (e.g., 2,4-dinitrophenyl, pentachlorophenyl), and a heterocyclic group (e.g., 2-benzoxazolyl, 2-benzothiazolyl, 1-phenyl-2-benzimidazolyl).

Examples of the electron-attractive group having σp of at least 0.20 are, in addition to the groups mentioned above, a halogen atom.

Above all, $Z_4$ is preferably any of an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, or a halogenoalkyl group having from 1 to 20 carbon atoms; more preferably any of a cyano group, an alkylsulfonyl group having from 1 to 20 carbon atoms, or an arylsulfonyl group having from 6 to 20 carbon atoms; most preferably a cyano group.

The details of the Hammett's substituent constant σp as referred to herein are described in, for example, JP-A 2003-306623, paragraphs (0059) to (0060).

$R_{41}$, $R_{42}$, $R_{45}$, $R_{46}$ and $R_{47}$ have the same meanings as in formula (B1-B). $R_{43}$ and $R_{44}$ each independently represent a hydrogen atom, an aliphatic group, an aromatic group, a heterocyclic group, an acyl group, an alkoxycarbonyl group, an aryloxycarbonyl group, a carbamoyl group, an alkyl or arylsulfonyl group, or a sulfamoyl group; preferably a hydrogen atom, an aromatic group, a heterocyclic group, an acyl group, or an alkyl or arylsulfonyl group; more preferably a hydrogen atom, an aromatic group or a heterocyclic group.

The groups in formula (B1-D) may be further substituted. For the substituents, referred to are those mentioned hereinabove for the groups $G_4$, $R_{45}$ and $R_{46}$ in formula (B1-A), and ionic hydrophilic groups.

$A_{41}$ may be any of an aromatic group or a heterocyclic group, but is preferably a benzene ring, a naphthalene ring, a pyridine ring, an imidazole ring, a pyrazole ring, a thiazole ring, an isothiazole ring, a thiadiazole ring, a benzothiazole ring, or a benzisothiazole ring, more preferably a benzene ring, a naphthalene ring, a pyridine ring, a pyrazine ring, an imidazole ring, an isothiazole ring or a benzothiazole ring, most preferably a benzene ring or a naphthalene ring.

For the black dye for use in the invention, preferred are azo dyes having, as a substituent, an aromatic group or an aromatic heterocyclic group that is so designed that the number of the conjugated π-electrons of the aromatic ring not directly bonding to the azo group therein is over 12 as a whole, in order to ensure the storage stability of the dyes in aqueous solution or ink. The aromatic ring directly bonding to the azo group is meant to indicate the entire aromatic group bonding to the azo group, while the aromatic ring not directly bonding to the azo group is meant to indicate the aromatic ring that does not directly bond to the azo group but exists as the substituent on the chromophoric group to constitute the azo dye. For example, when a naphthalene ring directly bonds to the azo group, then not one benzene ring bonding: to the azo group of the naphthalene ring but the entire naphthalene ring bonding thereto is the aromatic ring that directly bonds to the azo group. When a biphenyl group bonds to the azo group, then the phenyl group bonding to the azo group is an aromatic ring directly bonding to the azo group, while the other phenyl group is an aromatic ring not directly bonding to the azo group. The aromatic ring includes not only aryl groups but also hetero-aromatic rings. Preferably, the azo dyes for use in the invention are so designed that the number of the conjugated π-electrons of the aromatic ring not directly bonding to the azo group therein is over 12. The number of the conjugated π-electrons may be counted, for example, as follows: In an azo dye having one benzene ring and one naphthalene ring as the aromatic rings not directly bonding to the azo group therein, the number of the conjugated π-electrons is 6+10=16. The conjugated 1-electrons of an aromatic ring are the conjugated π-electrons that the aromatic ring contains (the aromatic ring includes hetero-rings, and is not limited to 6-membered rings). Having the aromatic ring of the type as the substituent, the dyes could be more associable and their storage stability could be improved. The substituting position of the aromatic ring is preferably any of $R_{41}$, $R_{42}$, $R_{43}/R_{44}$, $R_{45}$, $R_{46}$ and $R_{47}$, more preferably, any of $R_{43}$, $R_{44}$, $R_{45}$, $R_{46}$ and $R_{47}$.

Especially preferred combinations of the substituents in the azo-dyes for the black ink of the invention are mentioned below. $R_{45}$ and $R_{46}$ are preferably any of a hydrogen atom, an alkyl group, an aryl group, a heterocyclic group, a sulfonyl group or an acyl group; more preferably any of a hydrogen atom, an aryl group, a heterocyclic group or a sulfonyl group; most preferably any of a hydrogen atom, an aryl group or a heterocyclic group. However, $R_{45}$ and $R_{46}$ must not be hydrogen atoms at the same time.

$G_4$ is preferably a hydrogen atom, a halogen atom, an alkyl group, a hydroxyl group, an amino group or an acylamino group, more preferably a hydrogen atom, a halogen atom, an amino group or an acylamino group, most preferably a hydrogen atom, an amino group or an acylamino group.

$A_{41}$ is preferably a benzene ring, a naphthalene ring, a pyridine ring, an imidazole ring, or a pyrazole ring; most preferably a benzene ring or a naphthalene ring.

Also preferably, $B_{41}$ and $B_{42}$ are =CR$_{41}$— and —CR$_{42}$=, respectively; and $R_{41}$ and $R_{42}$ are preferably any of a hydrogen atom, an alkyl group, a halogen atom, a cyano group, a carbamoyl group, a carboxyl group, a hydroxyl group, an alkoxy group or an alkoxycarbonyl group, more preferably any of a hydrogen atom, an alkyl group, a carboxyl group, a cyano group or a carbamoyl group.

Regarding the preferred combinations of the substituents of the compounds of formula (B1), it is desirable that at least one of the substituents is the above-mentioned preferred group. More preferably, a larger number of the substituents are the preferred groups. Most preferably, all the substituents are the preferred groups.

Specific examples of the azo dyes of formula (B1) are mentioned below, to which, however, the invention should not be limited. In the following examples, the carboxyl group, the phosphono group and the sulfo group may form salts. Examples of the counter ion to form the salts are ammonium ions, alkali metal ions (e.g., lithium ion, sodium ion, potassium ion), and organic cations (e.g., tetramethylammonium ion, tetramethylguanidium ion, tetramethylphosphonium ion). Of those, preferred are ammonium ions, organic cations and lithium ion; and most preferred is lithium ion.

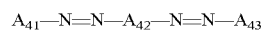

| | $A_{41}$ | $A_{42}$ | $A_{43}$ |
|---|---|---|---|
| (a-1) | 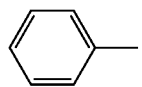 | 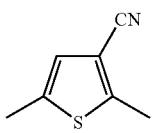 | 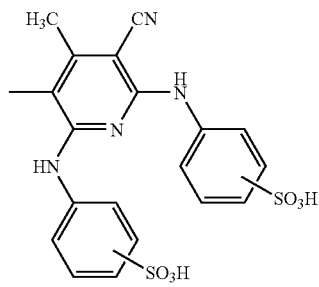 |

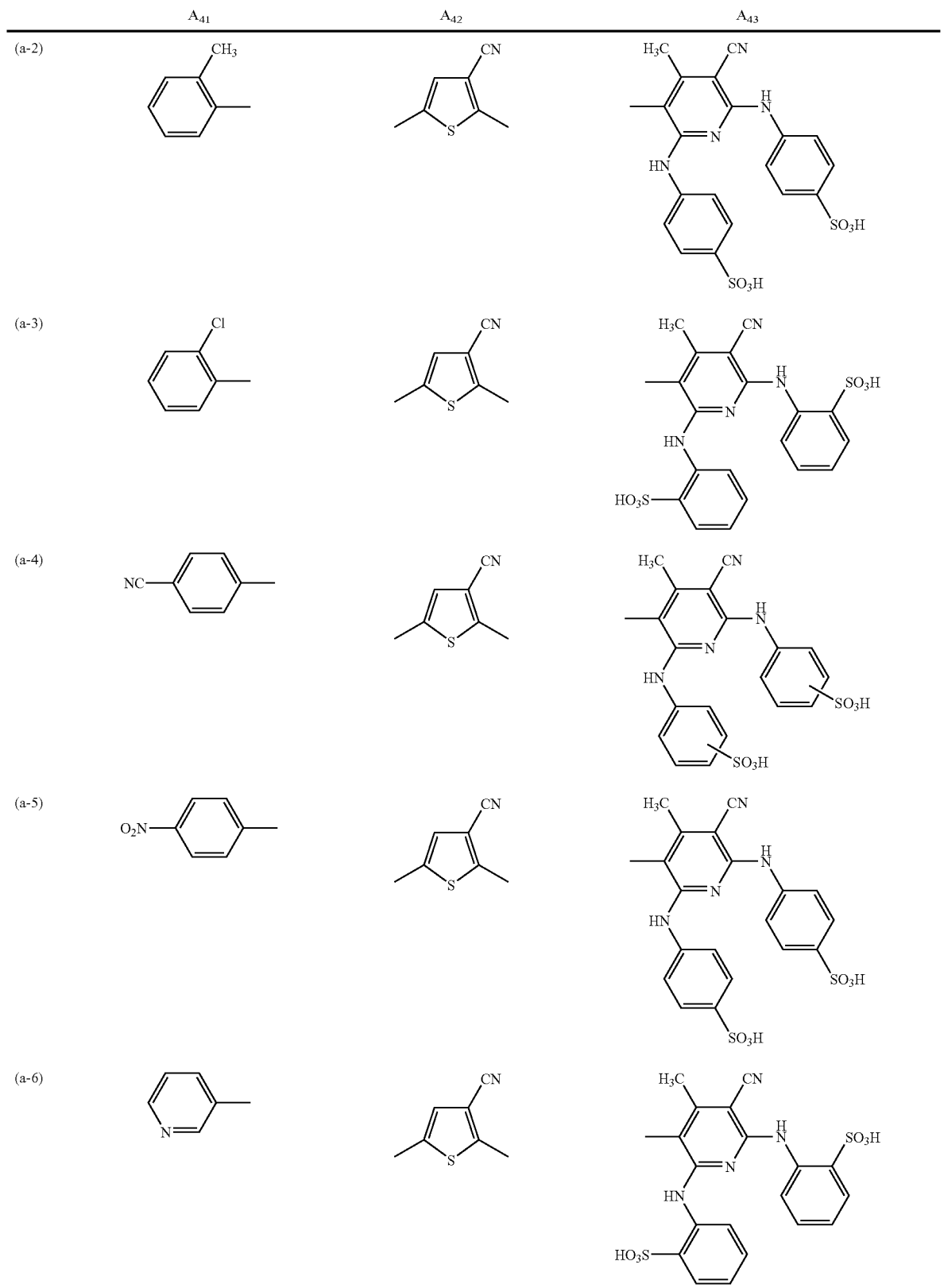

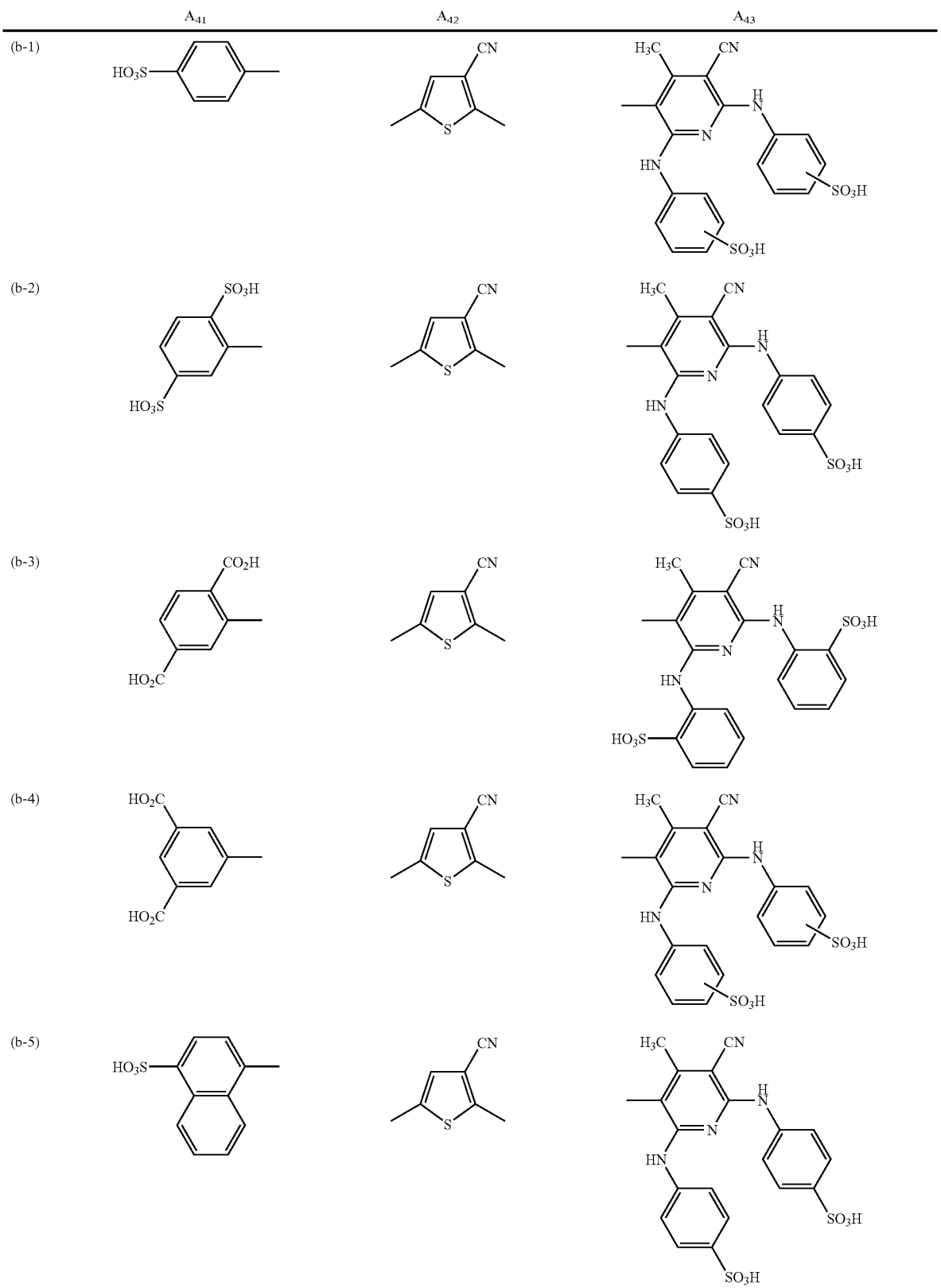

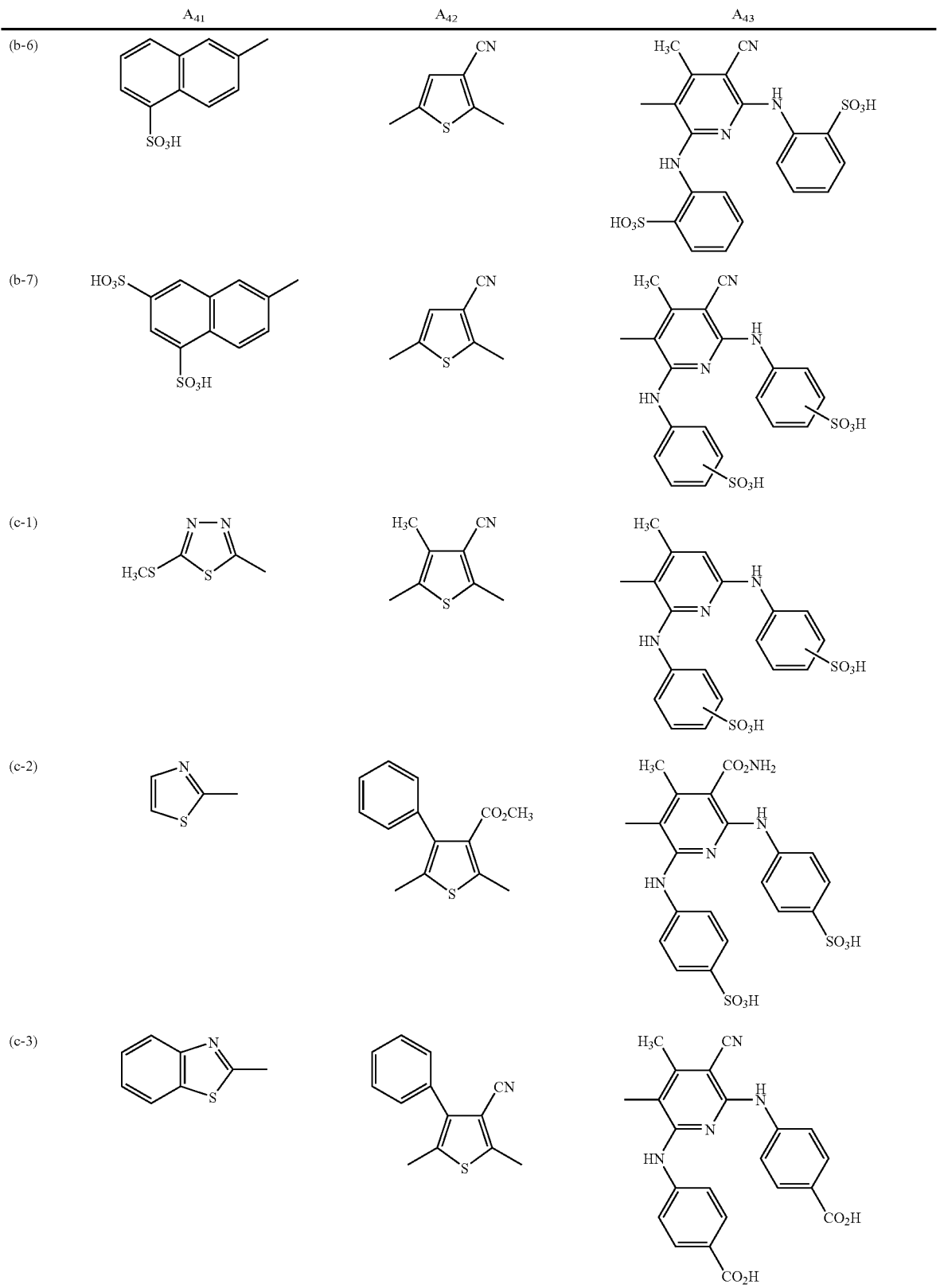

-continued
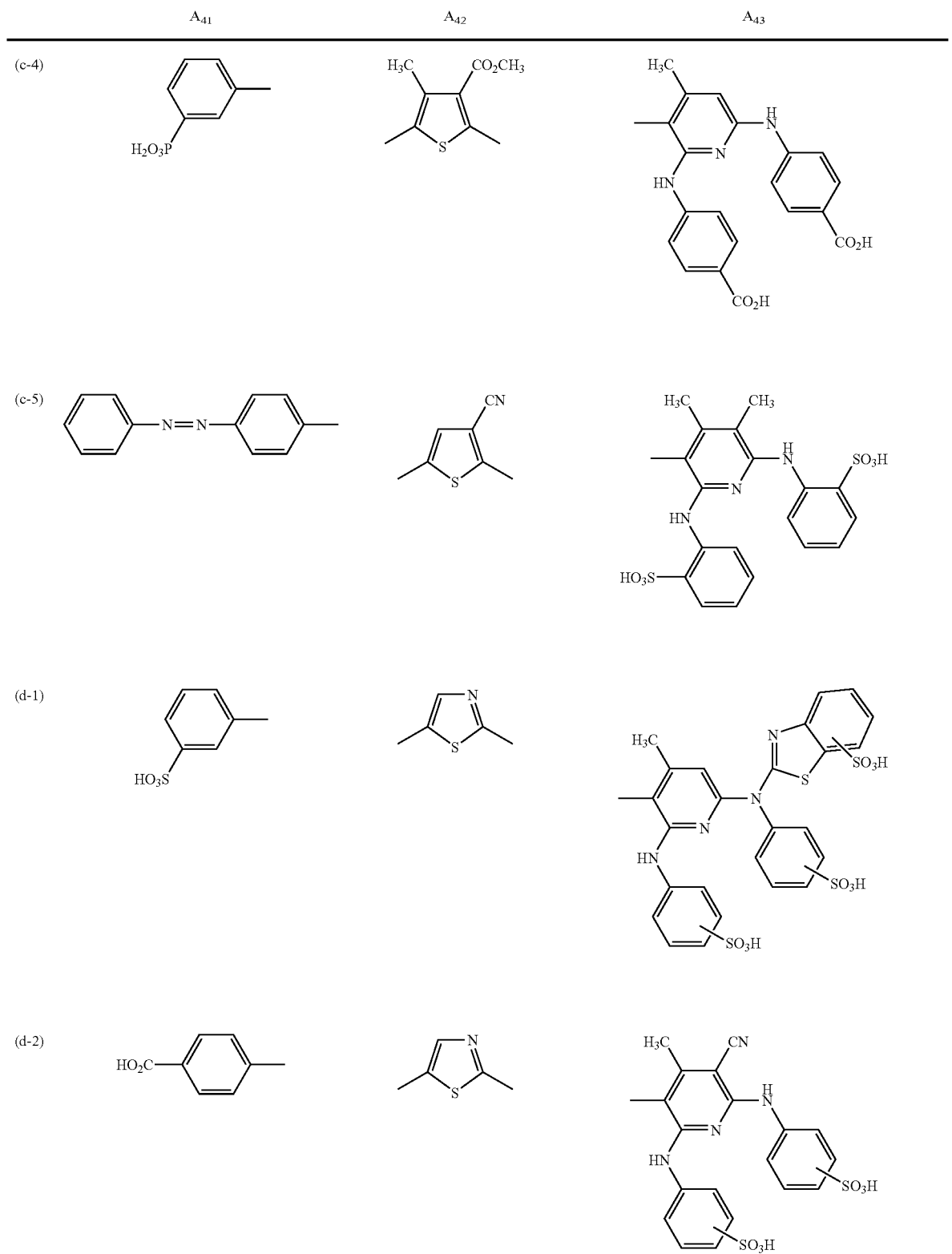

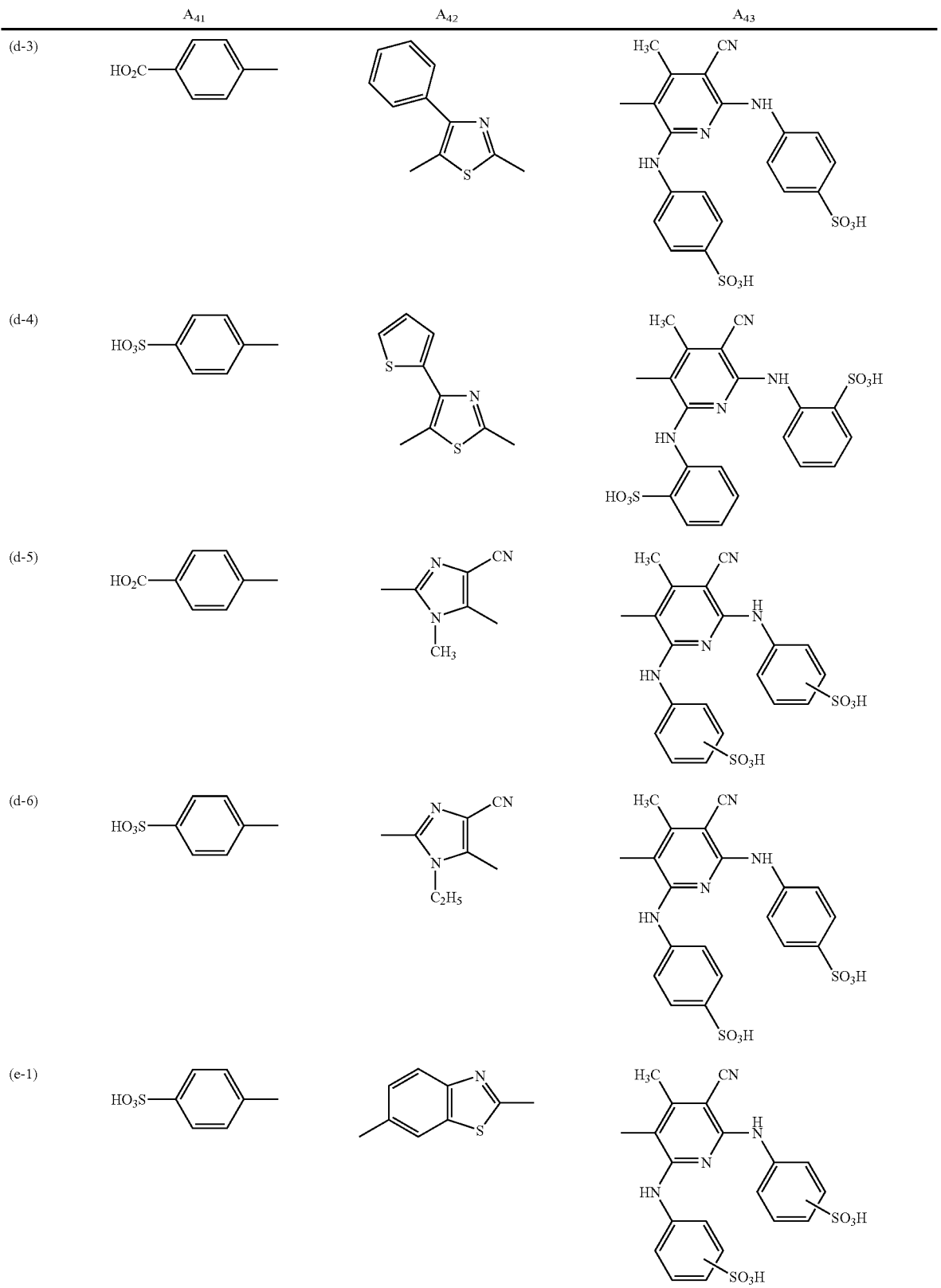

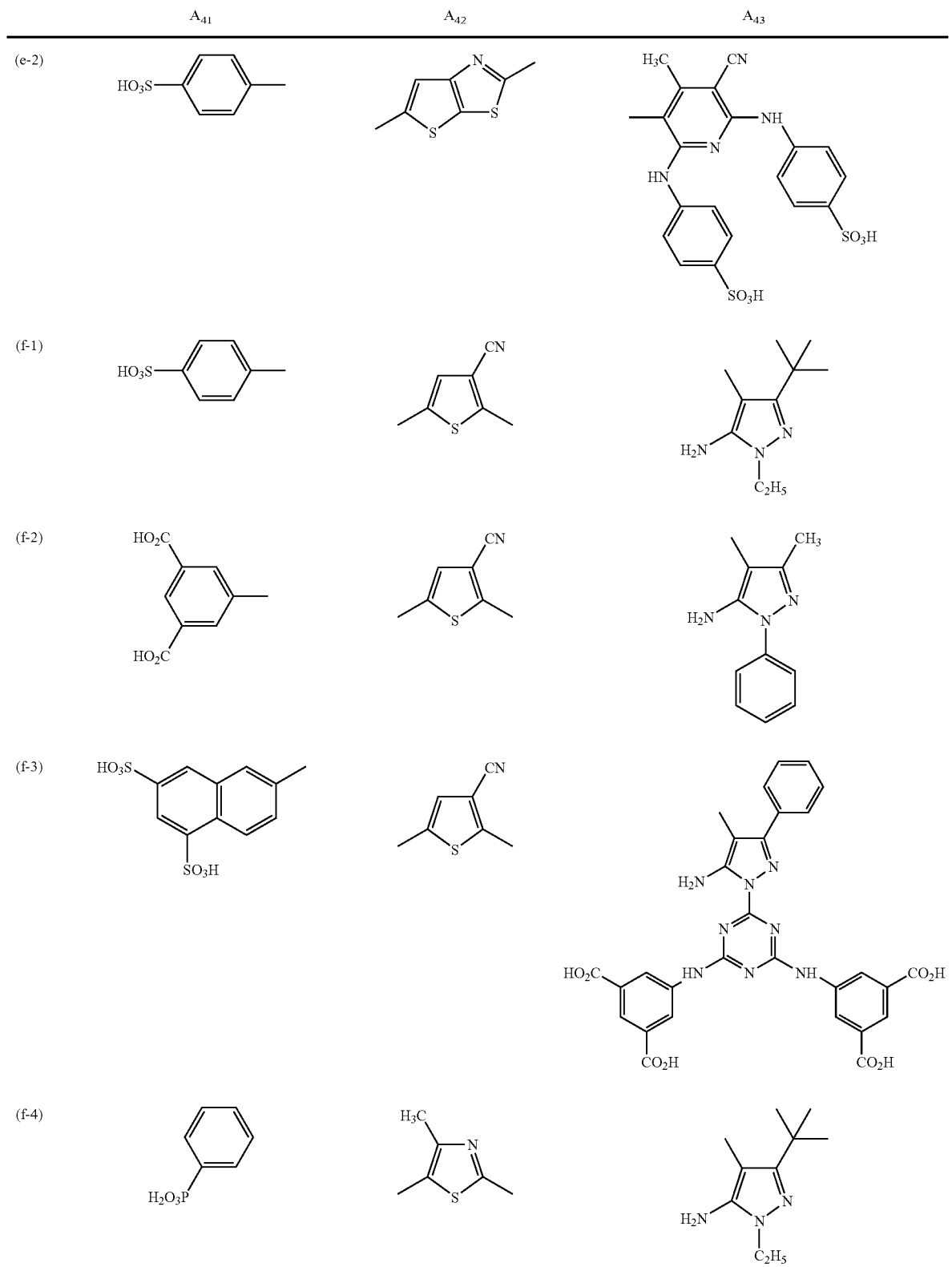

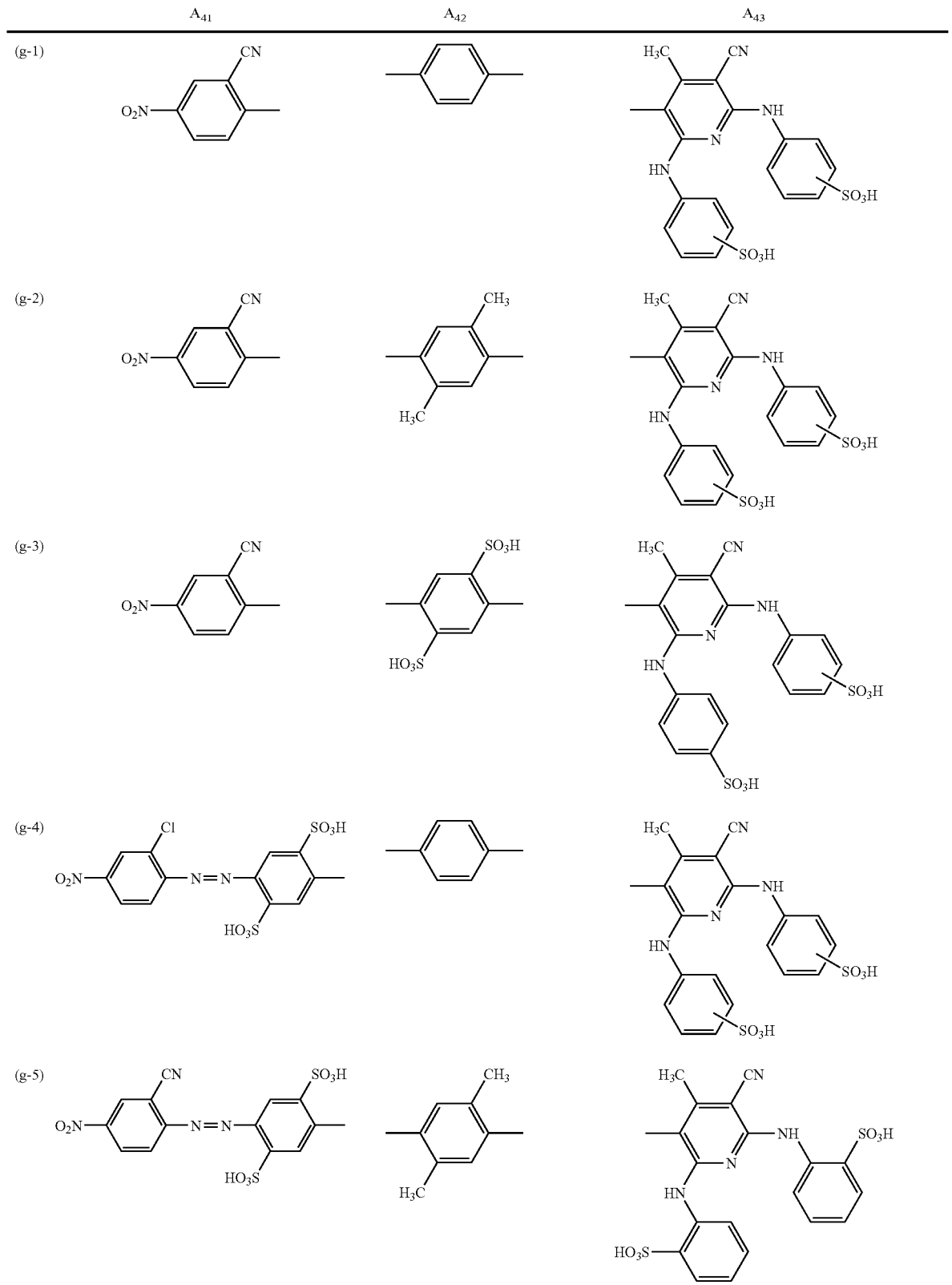

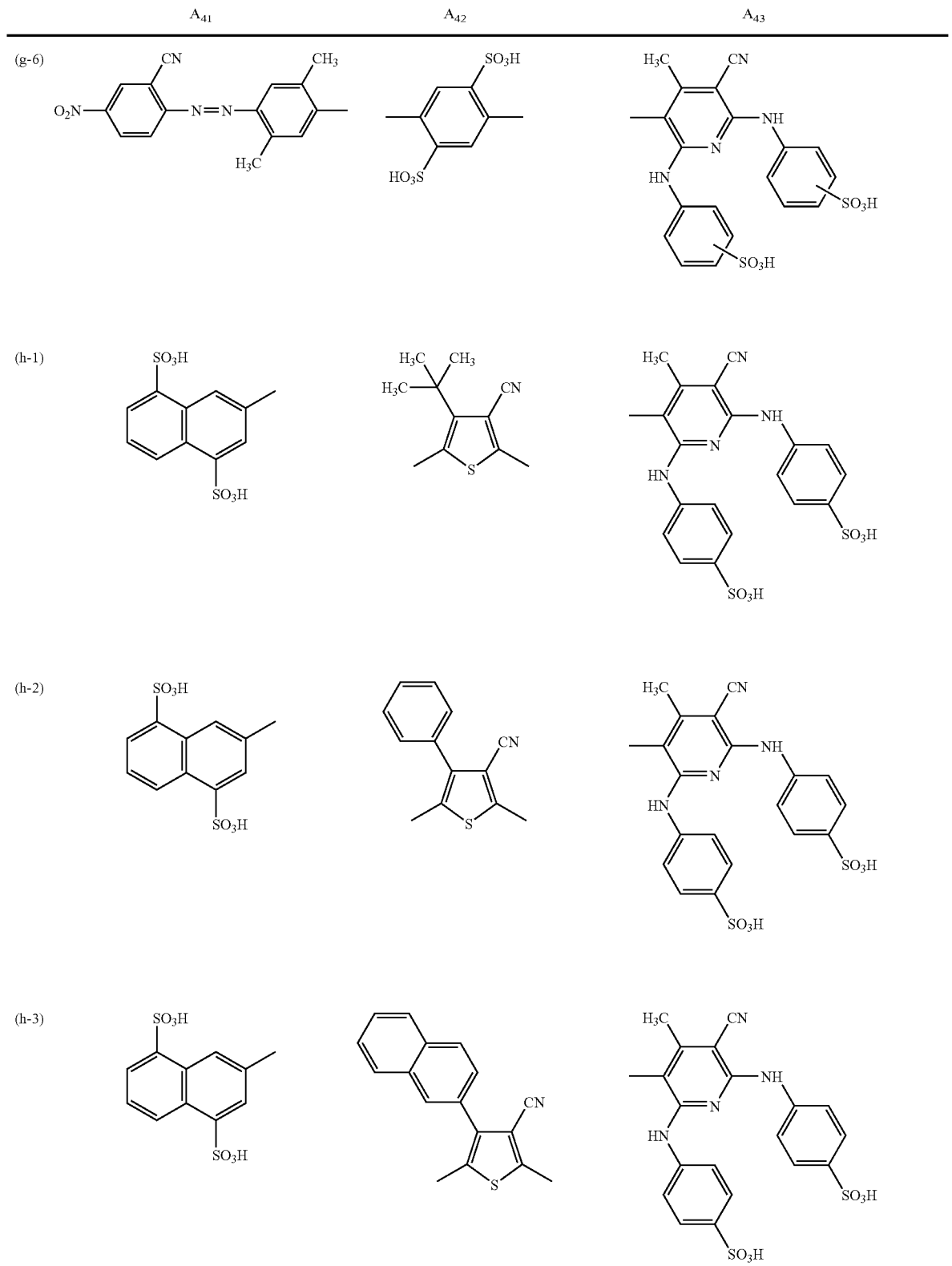

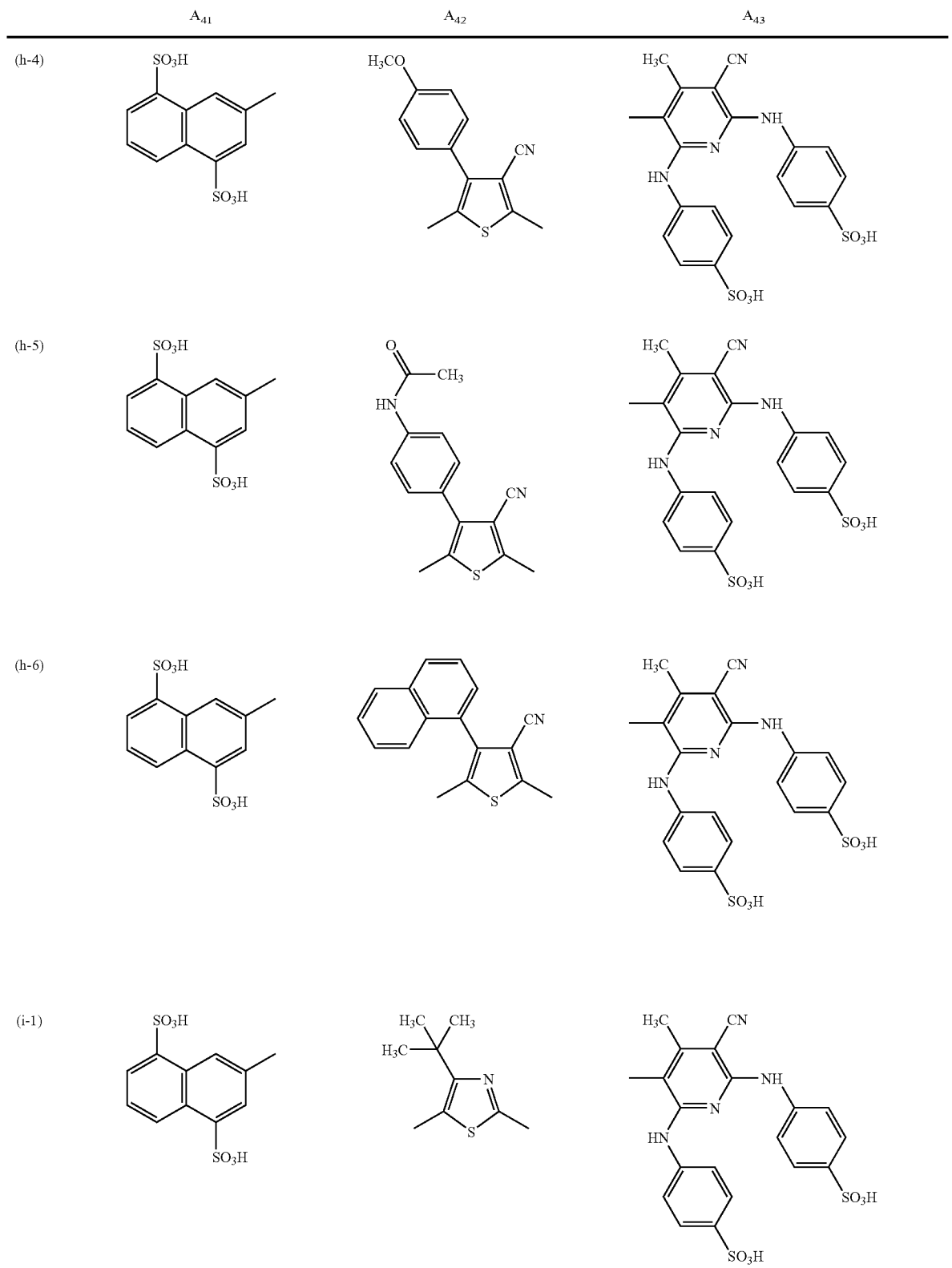

-continued
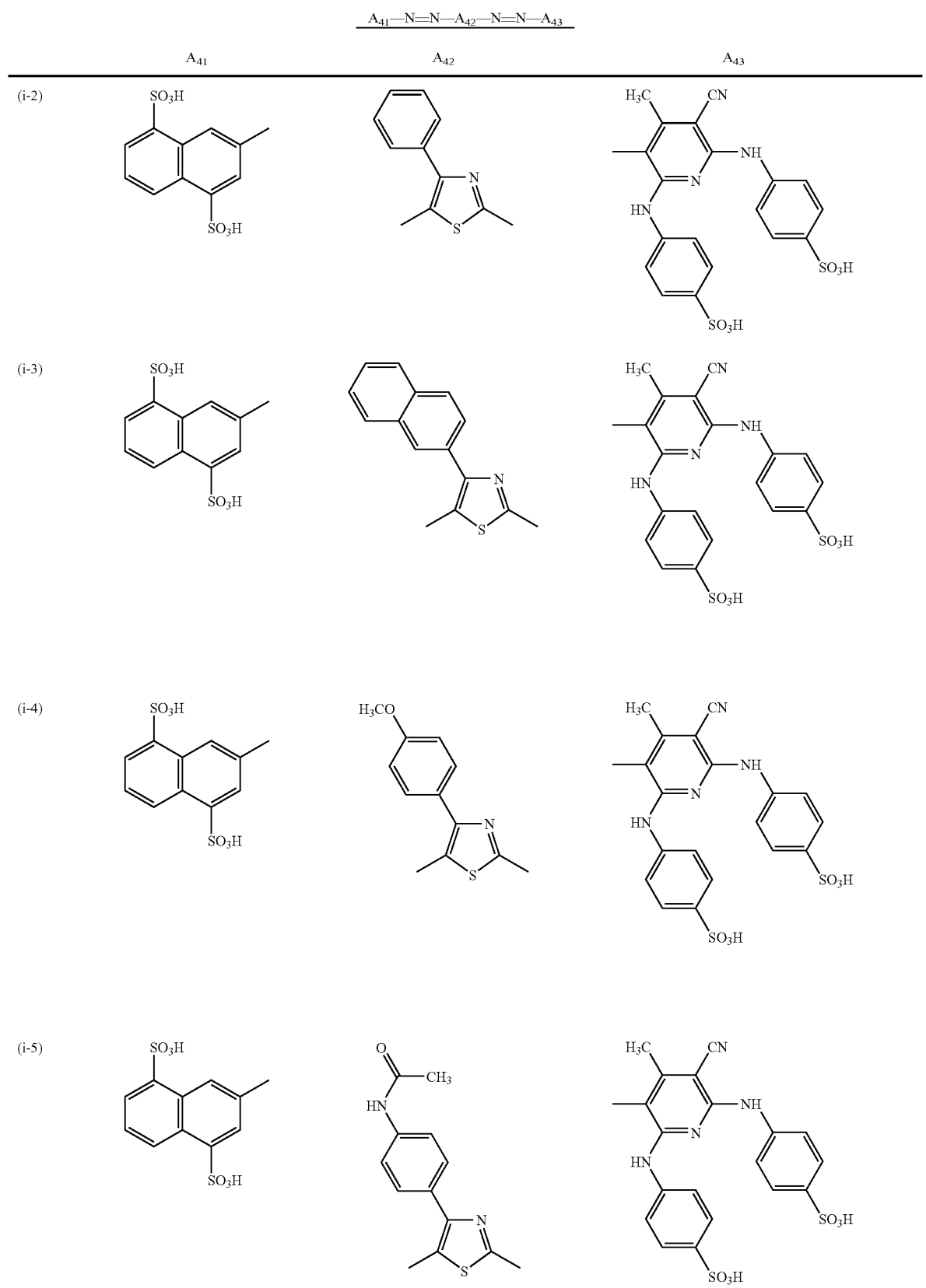

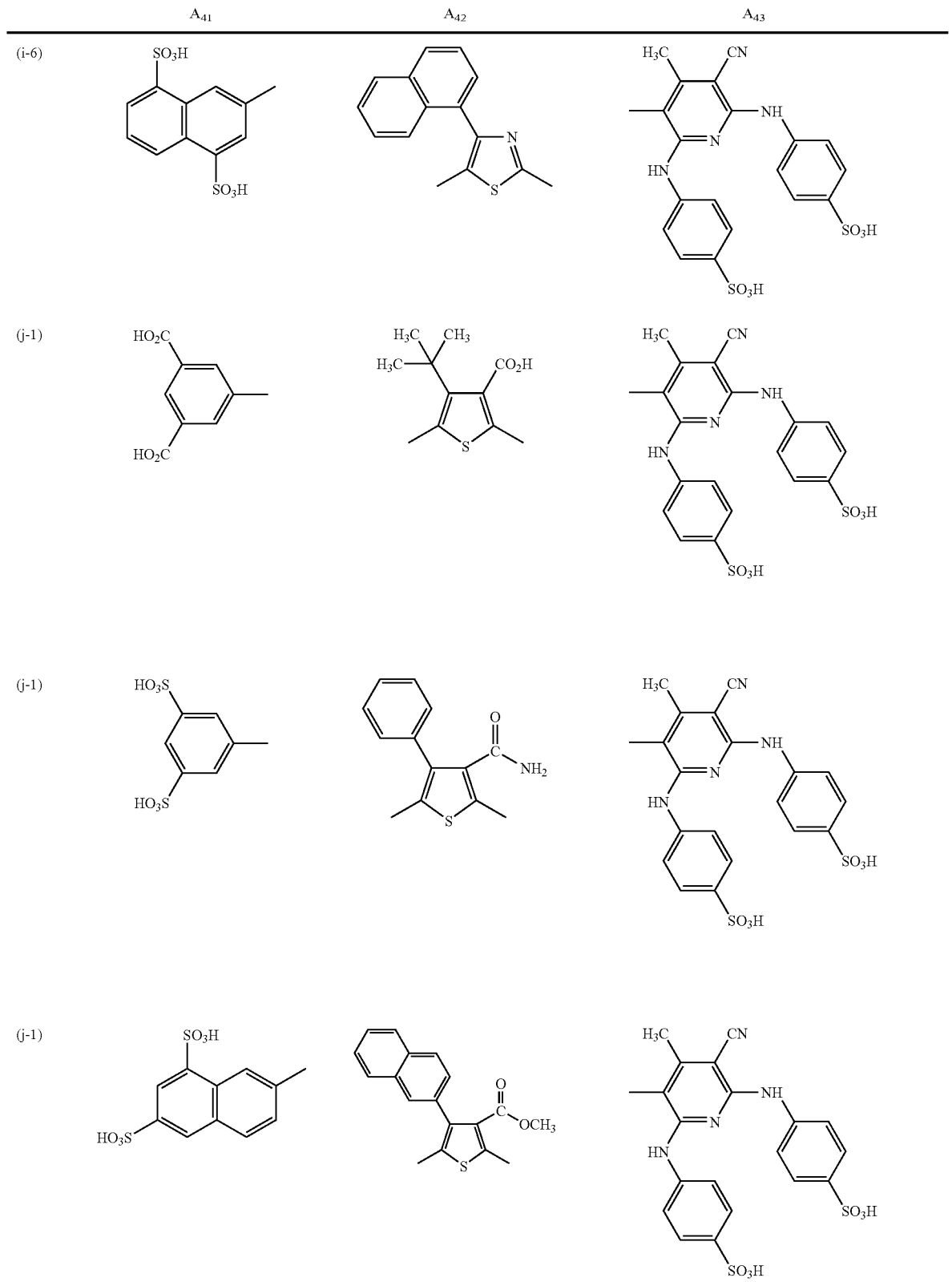

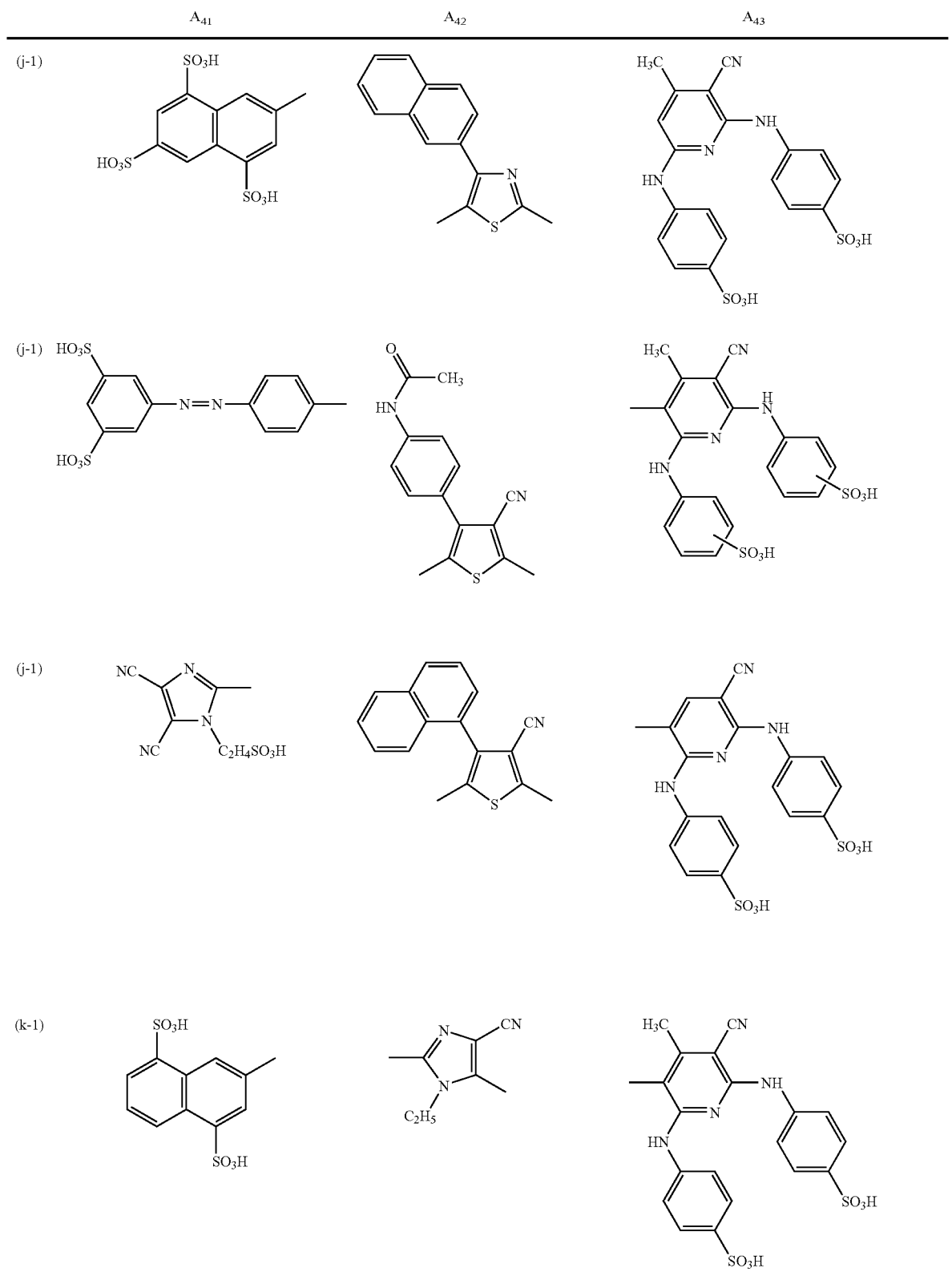

-continued
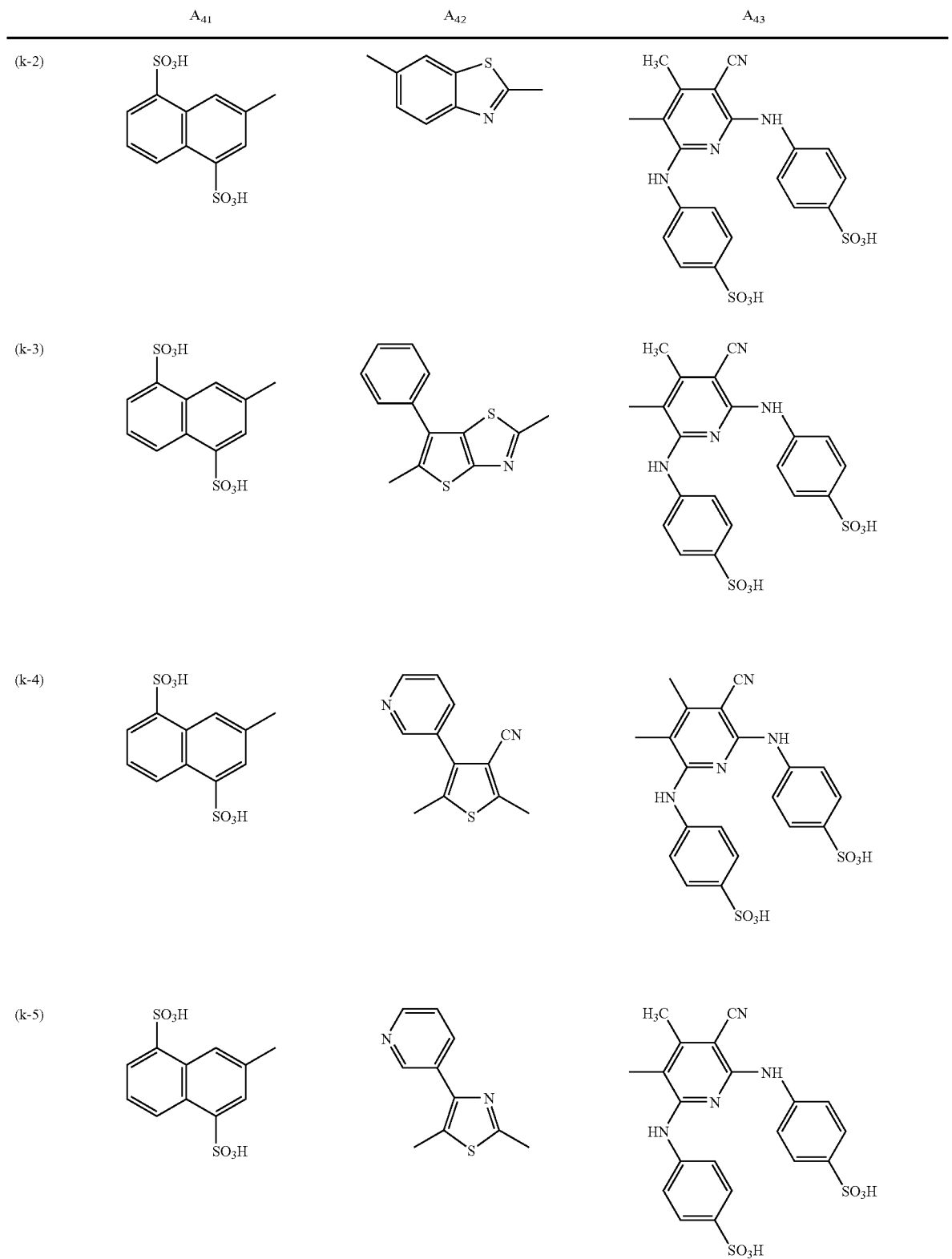

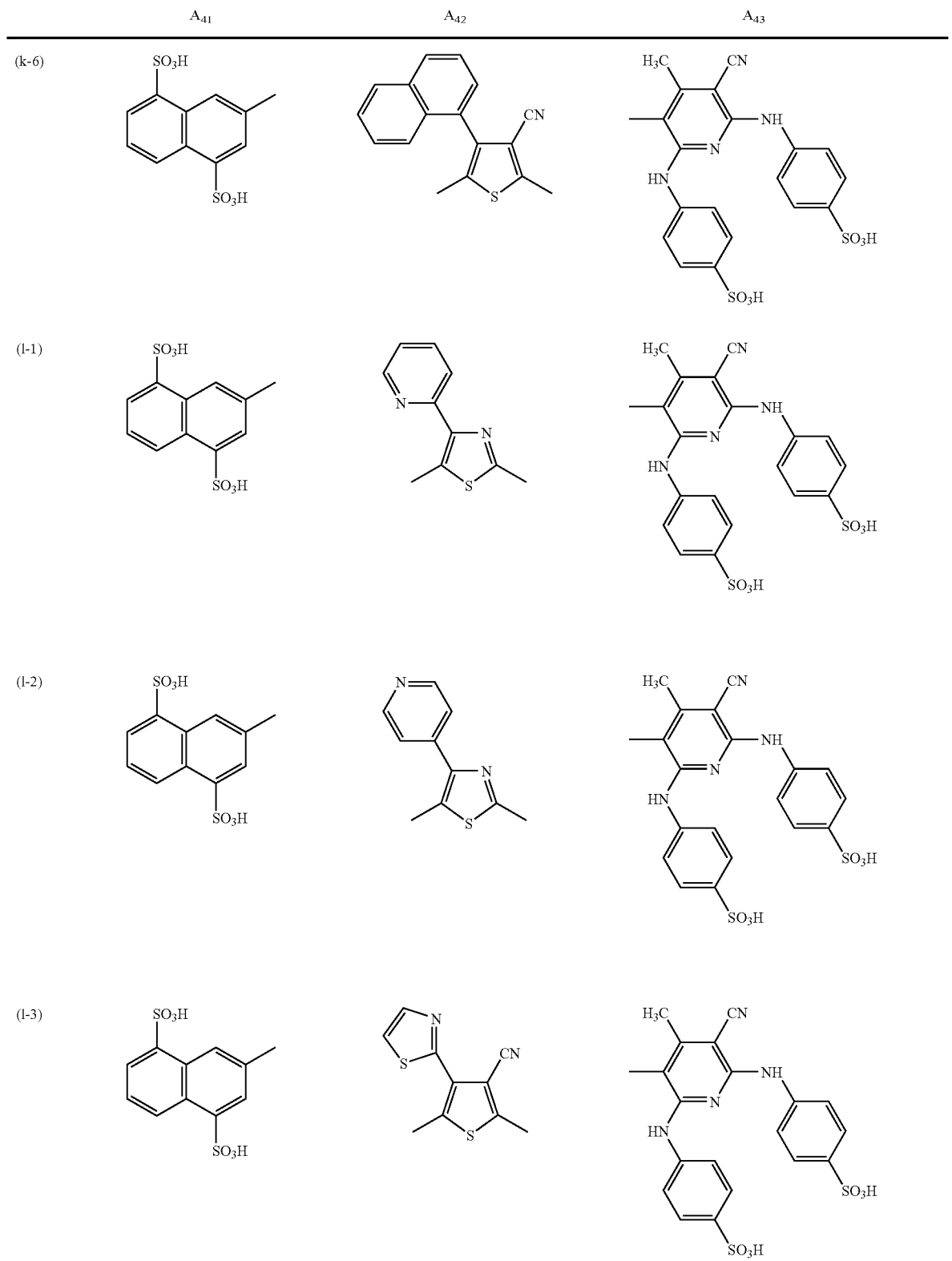

-continued

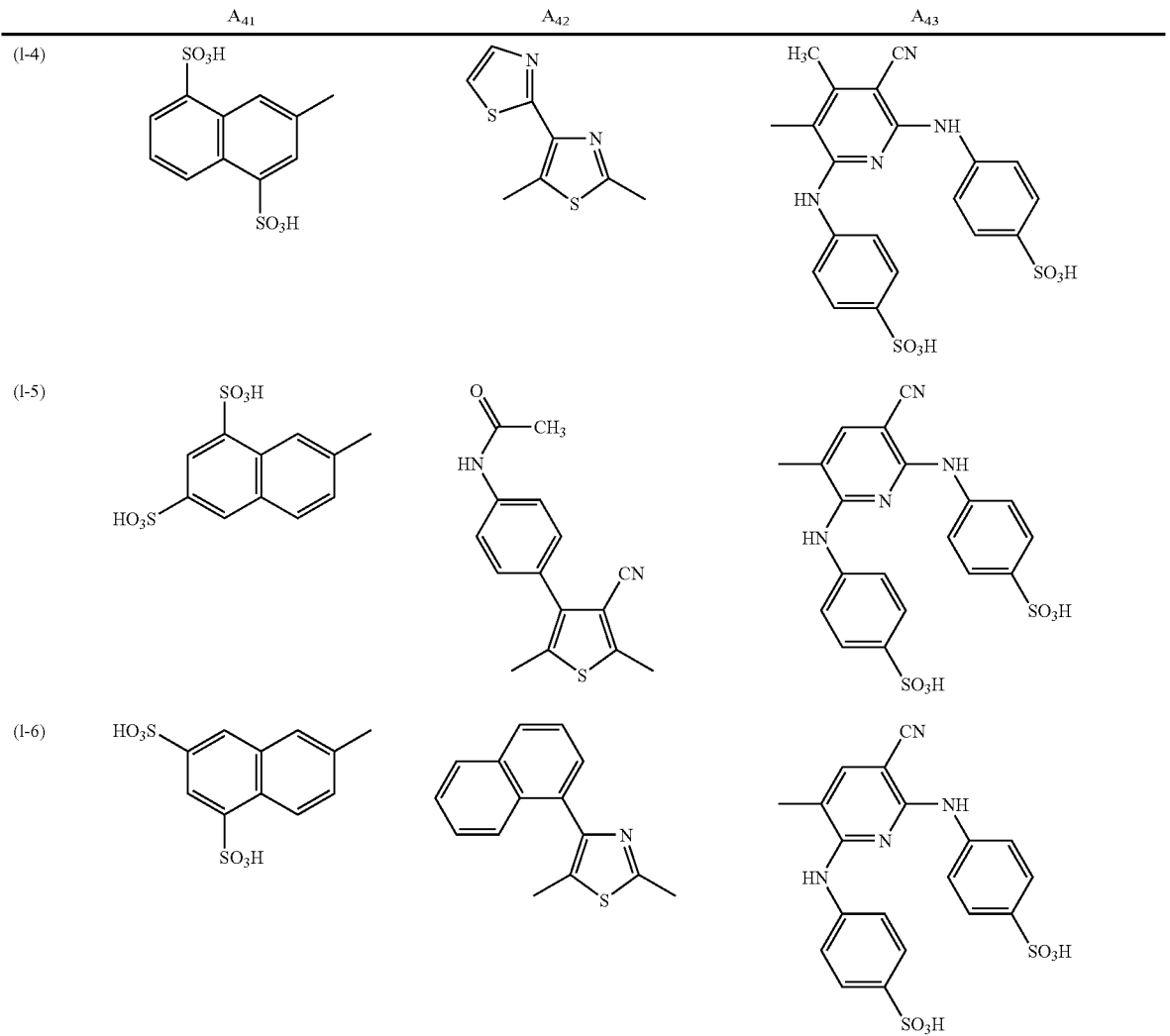

The black dyes of formula (B1) may be produced through coupling reaction of a diazo component with a coupling component. For it, for example, the methods described in JP-A 2003-306623 and Japanese Patent Application No. 2003-353498 may be referred to.

For the dyes (S) having λmax of from 350 nm to 500 nm, preferred are the above-mentioned yellow dyes and yellow pigments. Dyes of formulae (B1) and (B2) in which n is 0 or y is 0 are usable for the dyes (S).

Preferably, the content of the azo dye of formula (B1) in the ink is from 0.2 to 20% by weight, more preferably from 0.5 to 15% by weight.

Compounds of formula (B2) are described in detail hereinafter.

wherein P, Q and R each represent an optionally-substituted aromatic group (P and R each are a monovalent aromatic group such as an aryl group, Q is a divalent aromatic group such as an arylene group). In particular, Q is preferably a polycyclic aromatic ring such as a naphthalene ring.

x is an integer of 1 or more, y is an integer of 0 or more. Preferably, x=y=1.

The substituents that may be in formula (B2) are a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group (including an alkylamino group, an arylamino group, a heterocyclic amino group), an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, a heterocyclic-thio group, an alkyl or arylsulfonyl group, a heterocyclic sulfonyl group, an alkyl or arylsulfinyl group, a heterocyclic sulfinyl group, a sulfamoyl group, and a sulfo group. These groups may be further substituted. Preferred examples of these substituents may be the same as those corresponding to the groups in formula (B1). The substituent may also be an arylazo group.

Examples of the black dyes of formula (B2) usable in the invention are mentioned below, to which, however, the invention should not be limited. In the following Examples, the sulfo group may form salts. Examples of the counter ion to form the salts are ammonium ions, alkali metal ions (e.g., lithium ion, sodium ion, potassium ion), and organic cations (e.g., tetramethylammonium ion, tetramethylguanidium ion, tetramethylphosphonium ion). For the counter ion, preferred is lithium ion.

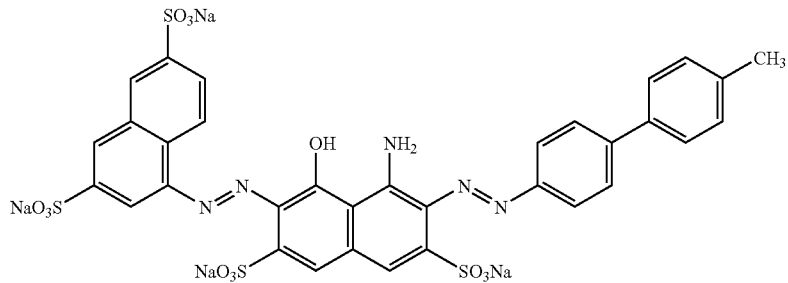

TS-1

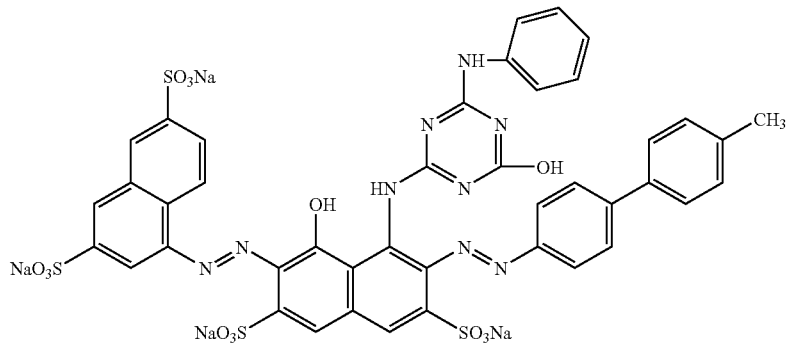

TS-2

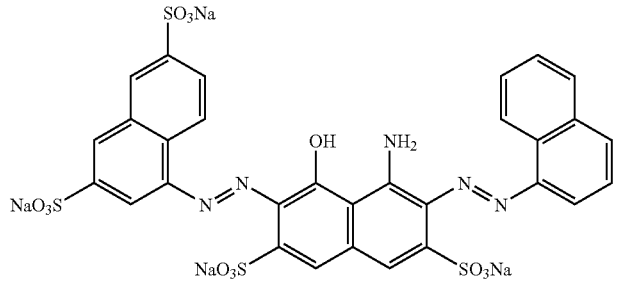

TS-3

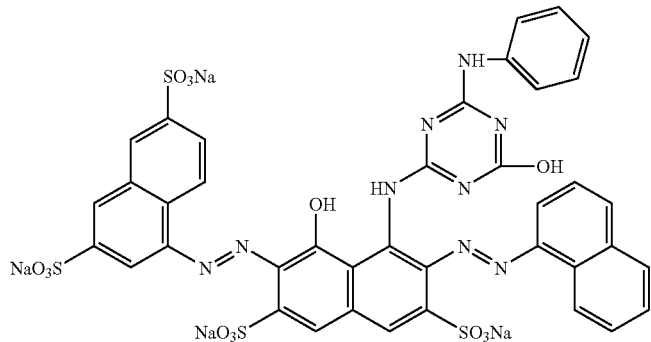

TS-4

-continued

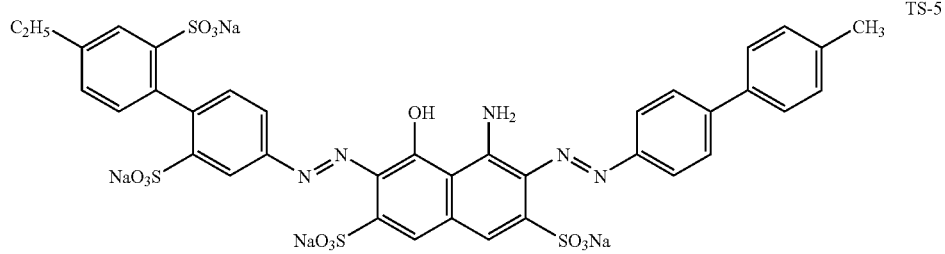
TS-5

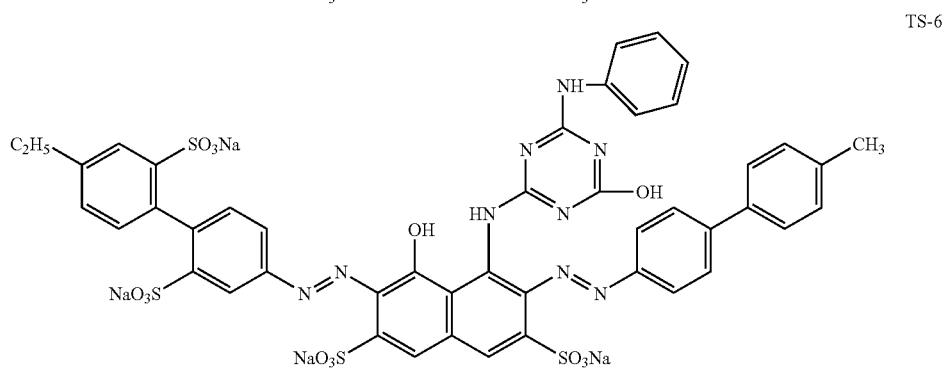
TS-6

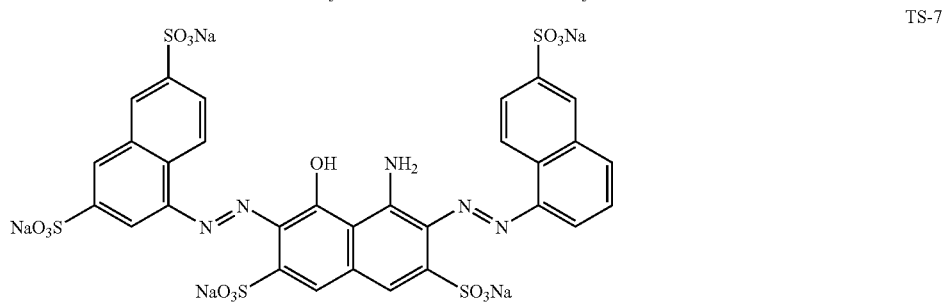
TS-7

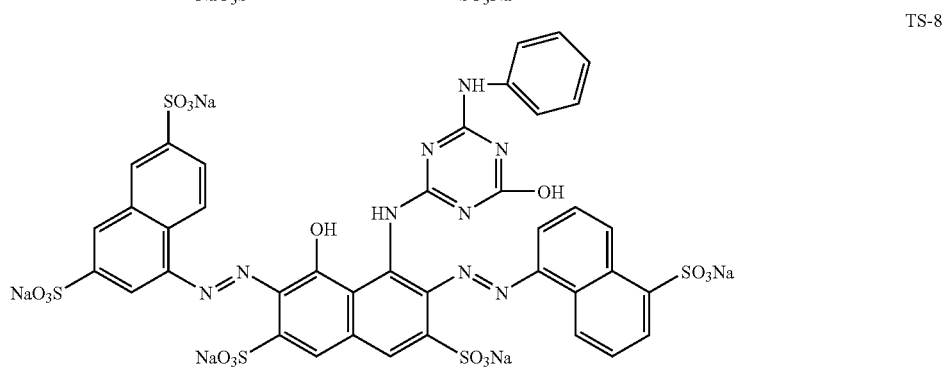
TS-8

The magenta ink of the invention contains a dye having an oxidation potential over 1.0 V, preferably over 1.1 V, more preferably over 1.2 V. Containing the dye of the type having an oxidation potential over 1.0 V, the ink gives images of good durability, especially those of good ozone resistance.

Preferably, the content of the dye having an oxidation potential over 1.0 V (vs SCE) is at least 40% by weight of all the dyes in the ink.

For the dyes having an oxidation potential over 1.0 V, at least two dyes of an azo dye with hetero rings bonding thereto and a magenta dye having any other structure are combined for use in the invention. The dye having any other structure is a dye that differs from the azo dye having an azo group, each end of the azo group has a hetero ring, in point of the skeleton. Concretely, it is an azo dye with no hetero ring bonding to the azo group, or with a hetero ring bonding to only one end of the azo group, or any other dye than azo dyes. The other dye than azo dyes is, for example, an anthrapyridone dye.

The azo dye having an azo group, each end of the azo group has a hetero ring, is preferably a dye of formula (M1), and the dye having any other structure is preferably an anthrapyridone dye, more preferably an anthrapyridone dye of formula (2).

(Magenta Dye)

The dyes of formula (M1) are described below.

The magenta dyes for use in the invention are preferably azo dyes having, in an aqueous medium, an absorption peak in a spectral range of from 500 to 580 nm having an oxidation potential over 1.0 V (vs SCE).

The first characteristic feature of the preferred structure of the azo dyes that serve as magenta dyes in the invention is that they have a chromophore of a formula, (hetero ring A) —N═N— (hetero ring B). In this case, the hetero ring A and the hetero ring B may have the same structure. Concretely, the hetero ring A and the hetero ring B are 5-membered or 6-membered heterocyclic rings, and are selected, for example, from pyrazole, imidazole, triazole, oxazole, thiazole, selenazole, pyridone, pyrazine, pyrimidine and pyridine. Concretely, the hetero rings are described in JP-A-2001-279145, 2002-309116 and 2003-12650.

The second characteristic feature of the preferred structure of the azo dyes is that the azo group in them has, on at least one side thereof, a coupling component of an aromatic, nitrogen-containing 6-membered hetero ring directly bonding thereto. Concrete examples of the azo dyes of the type are described in JP-A-2002-371214.

The third characteristic feature of the preferred structure of the azo dyes is that the auxochrome therein has a structure of an aromatic cyclic amino group or a heterocyclic amino group. Concretely, the auxochrome is an anilino group or a heterylamino group.

The fourth characteristic feature of the preferred structure of the azo dyes is that they have a stereostructure. Specific examples of the dyes of the type are described in JP-A-2002-371214.

Having the above-mentioned specific structure, the azo dyes may have an increased oxidation potential and enhanced ozone resistance. For increasing the oxidation potential of the azo dyes, for example, α-hydrogen atom is removed from them. From the viewpoint of the increased oxidation potential thereof, the azo dyes of formula (M1) are preferred for use in the invention. Regarding the method of increasing the oxidation potential of azo dyes, concretely referred to is the description of JP-A-2003-64275.

The magenta ink of the invention that comprises the azo dye having any of the above-mentioned structural features preferably has λmax (absorption maximum wavelength) of from 500 to 580 nm as its hue is good. More preferably, the half-value width of the maximum absorption wavelength on the long wavelength side and on the short wavelength side is smaller than 100 nm, or that is, the absorption peak is sharp. This is concretely described in JP-A-2002-309133. α-methyl introduction into the azo dyes of formula (M1) realizes a sharp absorption peak of the resulting dyes.

The forced fading rate constant to ozone gas of the magenta ink that contains the azo dye is preferably at most $5.0 \times 10^{-2}$ [hour$^{-1}$], more preferably at most $3.0 \times 10^{-2}$ [hour$^{-1}$], even more preferably at most $1.5 \times 10^{-2}$ [hour$^{-1}$].

The forced fading rate constant to ozone gas of the magenta ink is determined as follows: The magenta ink alone is printed on a reflection-type image-receiving medium, and a part of the colored area of the thus-formed image having a color of the main spectral absorption region of the ink and having a reflection density, measured through a status A filter, of from 0.90 to 1.10 is specifically selected as an initial density point. The initial density is the start density (=100%). The image is faded in a ozone fading tester in which the ozone concentration is all the time 5 mg/liter. The period of time in which the density of the faded sample is reduced to 80% of the initial density of the original sample is counted, and its reciprocal [hour$^{-1}$] is obtained. On the presumption, that the faded density and the fading time will follow the rate formula of primary reaction, the value is defined as the fading reaction rate constant.

The print patch for the test may be any of JIS code 2223 black square symbol-printed patch, Macbeth chart stepwise color patch, or any other gradation density patch that enables area measurement.

The reflection density of the reflection image (stepwise color patch) printed for the test is measured by the use of a densitometer that satisfies the International Standard ISO5-4 (geometric condition for reflection density), via a status A filter.

The test chamber for the forced fading rate constant test to ozone gas is equipped with an ozone generator capable of all the time maintaining the internal ozone density at 5 mg/liter (e.g., high-pressure discharging system for applying AC voltage to dry air), and the temperature to which the samples are exposed in the generator is controlled at 25° C.

The forced fading rate constant is an index of the oxidizability of the samples in an oxidizing atmosphere, for example, in an environment with photochemical smog, vehicle exhaust gas, organic vapor from painted furniture or carpets, or gas generated from frames in light rooms. Concretely, the ozone gas is the representative of these oxidizing atmospheres.

The dyes of formula (M1) are typical azo dyes having the above-mentioned characteristics for use in the invention, and these are described hereinafter.

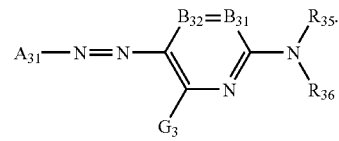

In formula (M1), $A_{31}$ represents a 5-membered hetero ring.

$B_{31}$ and $B_{32}$ each represent ═CR$_{31}$— or —CR$_{32}$═, or either one of them is a nitrogen atom and the other is ═CR$_{31}$— or —CR$_{32}$═.

$R_{35}$ and $R_{36}$ each independently represent a hydrogen atom, or a substituent. The substituent includes an aliphatic group, an aromatic group, a heterocyclic group, an acyl group, an alkoxycarbonyl group, an aryloxycarbonyl group, a carbamoyl group, an alkylsulfonyl group, an arylsulfonyl group, and a sulfamoyl group; and the hydrogen atom in each group may be substituted.

$G_3$, $R_{31}$ and $R_{32}$ each independently represent a hydrogen atom, or a substituent. The substituent includes a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, analkylsulfonylamino group, an arylsulfonylamino group, a heterocyclic sulfonylamino group, a nitro group, an alkylthio group, an arylthio group, a heterocyclic-thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, and a sulfo group; and the hydrogen atom in each group may be substituted.

$R_{31}$ and $R_{35}$, or $R_{35}$ and $R_{36}$ may bond to each other to form a 5- or 6-membered ring.

In formula (M1), $A_{31}$ represents a 5-membered heterocyclic group. Examples of the hetero atom of the hetero ring are N, O and S. Preferably, the hetero ring is a nitrogen-containing 5-membered hetero ring. The hetero ring may be condensed with an aliphatic ring, an aromatic ring or any other hetero ring. Preferred examples of the hetero ring for $A_{31}$ are pyrazole, imidazole, thiazole, isothiazole, thiadiazole, benzothiazole, benzoxazole and benzisothiazole rings. These hetero rings may be further substituted. Above all, pyrazole, imidazole, isothiazole, thiadiazole and benzothiazole rings of the following formula (a) to (g) are preferred.

In formulae (a) to (g), $R_{307}$ to $R_{322}$ represent the same substituents as those described for $G_3$, $R_{31}$ and $R_{32}$ in formula (M1).

Of formulae (a) to (g), preferred are pyrazole and isothiazole rings of formulae (a) and (b); and most preferred is the pyrazole ring of formula (a).

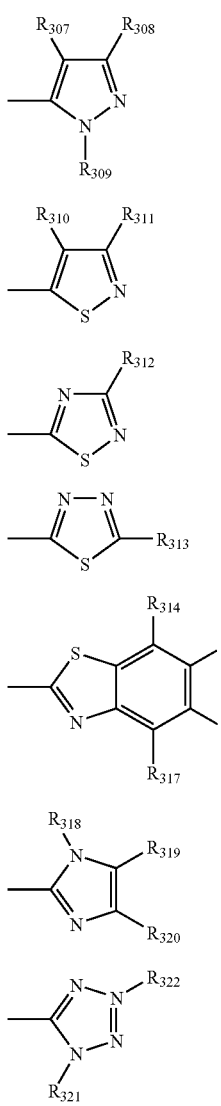

In formula (M1) $B_{31}$ and $B_{32}$ represent $=CR_{31}-$ and $-CR_{32}=$, respectively, or any one of them represents a nitrogen atom and the other represents $=CR_{31}-$ or $-CR_{32}=$. Preferably, they represent $=CR_{31}-$ and $-CR_{32}=$.

Preferably, $R_{35}$ and $R_{36}$ each are any of a hydrogen atom, an aliphatic group, an aromatic group, a heterocyclic group, an acyl group, or an alkyl or arylsulfonyl group; more preferably, any of a hydrogen atom, an aromatic group, a heterocyclic group, an acyl group, or an alkyl or arylsulfonyl group; most preferably, any of a hydrogen atom, an aryl group or a heterocyclic group. The hydrogen atom in the groups may be substituted. However, $R_{35}$ and $R_{36}$ are not hydrogen atoms at the same time.

$G_3$, $R_{31}$ and $R_{32}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic-oxycarbonyl group, an acyl group, a hydroxyl group, an alkoxy group, an aryloxy group, a heterocyclic-oxy group, a silyloxy group, an acyloxy group, a carbamoyloxy group, an alkoxycarbonyloxy group, an aryloxycarbonyloxy group, an amino group (including an anilino group, a heterocyclic amino group), an acylamino group, an ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, a heterocyclic-thio group, an alkyl or arylsulfonyl group, a heterocyclic sulfonyl group, an alkyl or arylsulfinyl group, a heterocyclic sulfinyl group, a sulfamoyl group, or a sulfo group; and these groups may be further substituted.

Preferably, $G_3$ is any of a hydrogen atom, a halogen atom, an aliphatic group, an aromatic group, a hydroxyl group, an alkoxy group, an aryloxy group, an acyloxy group, a heterocyclic-oxy group, an amino group (including an anilino group, a heterocyclic amino group), an acylamino group, an ureido group, a sulfamoylamino group, an alkoxycarbonylamino group, an aryloxycarbonylamino group, an alkyl or arylthio group or a heterocyclic-thio group; more preferably any of a hydrogen atom, a halogen atom, an alkyl group, a hydroxyl group, an alkoxy group, an aryloxy group, an acyloxy group, an amino group (including an anilino group, a heterocyclic amino group), or an acylamino group; most preferably any of a hydrogen atom, an anilino group, or an acylamino group. The hydrogen atom in the groups may be substituted.

Also preferably, $R_{31}$ and $R_{32}$ each are any of a hydrogen atom, an alkyl group, a halogen atom, an alkoxycarbonyl group, a carboxyl group, a carbamoyl group, a hydroxyl group, an alkoxy group or a cyano group. The hydrogen atom in these groups may be substituted.

$R_{31}$ and $R_{35}$, or $R_{35}$ and $R_{36}$ may bond to each other to form a 5- or 6-membered ring.

In case where $A_{31}$ is substituted, or the substituents of $R_{31}$, $R_{32}$, $R_{35}$, $R_{36}$ and $G_3$ are further substituted, then the substituents mentioned hereinabove for $G_3$, $R_{31}$ and $R_{32}$ are referred to for the substituents of the substituted groups.

In case where the dyes of formula (M1) are soluble in water, it is desirable that any of $A_{31}$, $R_{31}$, $R_{32}$, $R_{35}$, $R_{36}$ and $G_3$ has an additional substituent of an ionic hydrophilic group. The ionic hydrophilic group for the substituent includes a sulfo group, a carboxyl group, a phosphono group and a quaternary ammonium group. For the ionic hydrophilic group, preferred are a carboxyl group, a phosphono group and a sulfo group; and more preferred are a carboxyl group and a sulfo group. The carboxyl, phosphono and sulfo groups may be in the form of salts. Examples of the counter ion to form the salts are ammonium ions, alkali metal ions (e.g., lithium, sodium and potassium ions), and organic cations (e.g., tetramethylammonium, tetramethylguanidium and tetramethylphosphonium ions).

The terms to indicate the substituents in formula (M1) are described below. These terms are common to both formula (M1) and to formula (M1-A) to be mentioned hereinafter.

The halogen atom includes fluorine, chlorine and bromine atoms.

The aliphatic group means to include an alkyl group, a substituted alkyl group, an alkenyl group, a substituted alkenyl group, an alkynyl group, a substituted alkynyl group, an aralkyl group and a substituted aralkyl group. The wording "substituted" for the "substituted alkyl group" and others means that the hydrogen atom existing in the "alkyl group" and others is substituted with any of the substituents mentioned hereinabove for $G_3$, $R_{31}$ and $R_{32}$.

The aliphatic group may be branched or may be cyclic. Preferably, the aliphatic group has from 1 to 20 carbon atoms, more preferably from 1 to 16 carbon atoms. The aryl moiety of the aralkyl group and the substituted aralkyl group is preferably a phenyl or naphthyl group, more preferably a phenyl group. Examples of the aliphatic group are methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl groups.

The aromatic group means to include an aryl group and a substitute aryl group. The aryl group is preferably a phenyl or naphthyl group, more preferably a phenyl group. The aromatic group preferably has from 6 to 20 carbon atoms, more preferably from 6 to 16 carbon atoms.

Examples of the aromatic group are phenyl, p-tolyl, p-methoxyphenyl, o-chlorophenyl and m-(3-sulfopropylamino)phenyl groups.

The heterocyclic group means to include a substituted heterocyclic group and an unsubstituted heterocyclic group. The hetero ring may be condensed with an aliphatic ring, an aromatic or any other hetero ring. The heterocyclic group is preferably a 5- or 6-membered heterocyclic group. Examples of the substituent of the substituted heterocyclic group are an aliphatic group, a halogen atom, an alkylsulfonyl group, an arylsulfonyl group, an acyl group, an acylamino group, a sulfamoyl group, a carbamoyl group, and an ionic hydrophilic group. Examples of the heterocyclic group are 2-pyridyl, 2-thienyl, 2-thiazolyl, 2-benzothiazolyl, 2-benzoxazolyl and 2-furyl groups.

The carbamoyl group means to include a substituted carbamoyl group and an unsubstituted carbamoyl group. One example of the substituent of the substituted carbamoyl group is an alkyl group. Examples of the carbamoyl group are methylcarbamoyl and dimethylcarbamoyl groups.

The alkoxycarbonyl group means to include a substituted alkoxycarbonyl group and an unsubstituted alkoxycarbonyl group. The alkoxycarbonyl group preferably has from 2 to 20 carbon atoms. One example of the substituent of the substituted group is an ionic hydrophilic group. Examples of the alkoxycarbonyl group are methoxycarbonyl and ethoxycarbonyl groups.

The aryloxycarbonyl group means to include a substituted aryloxycarbonyl group and an unsubstituted aryloxycarbonyl group. The aryloxycarbonyl group preferably has from 7 to 20 carbon atoms. One example of the substituent of the substituted group is an ionic hydrophilic group. One example of the alkoxycarbonyl group is a phenoxycarbonyl group.

The heterocyclic-oxycarbonyl group means to include a substituted heterocyclic-oxycarbonyl group and an unsubstituted heterocyclic-oxycarbonyl group. For the hetero ring moiety of the group, referred to are those mentioned hereinabove for the hetero ring of the above-mentioned heterocyclic group. The heterocyclic-oxycarbonyl group preferably has from 2 to 20 carbon atoms. One example of the substituent of the substituted group is an ionic hydrophilic group. One example of the heterocyclic-oxycarbonyl group is a 2-pyridyloxycarbonyl group.

The acyl group means to include a substituted acyl group and an unsubstituted acyl group. The acyl group preferably has from 1 to 20 carbon atoms. One example of the substituent of the substituted acyl group is an ionic hydrophilic group. Examples of the acyl group are acetyl and benzoyl groups.

The alkoxy group means to include a substituted alkoxy group and an unsubstituted alkoxy group. The alkoxy group preferably has from 1 to 20 carbon atoms. Examples of the substituent of the substituted alkoxy group are an alkoxy group, a hydroxyl group, and a ionic hydrophilic group. Examples of the alkoxy group are methoxy, ethoxy, isopropoxy, methoxyethoxy, hydroxyethoxy and 3-carboxypropoxy groups.

The aryloxy group means to include a substituted aryloxy group and an unsubstituted aryloxy group. The aryloxy group preferably has from 6 to 20 carbon atoms. Examples of the substituent for the substituted aryloxy group are an alkoxy group and an ionic hydrophilic group. Examples of the aryloxy group are phenoxy, p-methoxyphenoxy and o-methoxyphenoxy groups.

The heterocyclic-oxy group means to include a substituted heterocyclic-oxy group and an unsubstituted heterocyclic-oxy group. For the hetero ring moiety of the group, referred to are those mentioned hereinabove for the hetero ring of the above-mentioned heterocyclic group. The heterocyclic-oxy group preferably has from 2 to 20 carbon atoms. Examples of the substituent of the substituted group are an alkyl group, an alkoxy group, and an ionic hydrophilic group. Examples of the heterocyclic-oxy group are 3-pyridyloxy and 3-thienyloxy groups.

The silyloxy group is preferably substituted with an aliphatic and/or aromatic group having from 1 to 20 carbon atoms. Examples of the silyloxy group are trimethylsilyloxy and diphenylmethylsilyloxy groups.

The acyloxy group means to include a substituted acyloxy group and an unsubstituted acyloxy group. The acyloxy group preferably has from 1 to 20 carbon atoms. One example of the substituent of the substituted acyloxy group is an ionic hydrophilic group. Examples of the acyloxy group are acetoxy and benzoyloxy groups.

The carbamoyloxy group means to include a substituted carbamoyloxy group and an unsubstituted carbamoyloxy group. One example of the substituent of the substituted carbamoyloxy group is an alkyl group. One example of the carbamoyloxy group is an N-methylcarbamoyloxy group.

The alkoxycarbonyloxy group means to include a substituted alkoxycarbonyloxy group and an unsubstituted alkoxycarbonyloxy group. The alkoxycarbonyloxy group preferably has from 2 to 20 carbon atoms. Examples of the alkoxycarbonyloxy group are methoxycarbonyloxy and isopropoxycarbonyloxy groups.

The aryloxycarbonyloxy group means to include a substituted aryloxycarbonyloxy group and an unsubstituted aryloxycarbonyloxy group. The aryloxycarbonyloxy group preferably has from 7 to 20 carbon atoms. One example of the aryloxycarbonyloxy group is a phenoxycarbonyloxy group.

The amino group means to include a substituted amino group and an unsubstituted amino group. Examples of the substituent of the substituted amino group are an alkyl group, an aryl group, and a heterocyclic group. The alkyl, aryl and heterocyclic groups may be further substituted. The alkylamino group includes a substituted alkylamino group and an unsubstituted alkylamino group. The alkylamino group preferably has from 1 to 20 carbon atoms. One example of the substituent of the substituted groups is an ionic hydrophilic group. Examples of the alkylamino group are methylamino and diethylamino groups.

The arylamino group means to include a substituted arylamino group and an unsubstituted arylamino group. The arylamino group preferably has from 6 to 20 carbon atoms. Examples of the substituent of the substituted arylamino group are a halogen atom and an ionic hydrophilic group. Examples of the arylamino group are phenylamino and 2-chlorophenylamino groups.

The heterocyclic amino group means to include a substituted heterocyclic amino group and an unsubstituted heterocyclic amino group. For the hetero ring moiety of the group, referred to are those mentioned hereinabove for the hetero ring of the above-mentioned heterocyclic group. The heterocyclic amino group preferably has from 2 to 20 carbon atoms. Examples of the substituent of the substituted group are an alkyl group, a halogen atom and an ionic hydrophilic group.

The acylamino group means to include a substituted acylamino group and an unsubstituted acylamino group. The acylamino group preferably has from 2 to 20 carbon atoms. One example of the substituent of the substituted acylamino group is an ionic hydrophilic group. Examples of the acylamino group are acetylamino, propionylamino, benzoylamino, N-phenylacetylamino and 3,5-disulfobenzoylamino groups.

The ureido group means to include a substituted ureido group and an unsubstituted ureido group. The ureido group preferably has from 1 to 20 carbon atoms. Examples of the substituent of the substituted ureido group are an alkyl group and an aryl group. Examples of the ureido group are 3-methylureido, 3,3-dimethylureido and 3-phenylureido groups.

The sulfamoylamino group means to include a substituted sulfamoylamino group and an unsubstituted sulfamoylamino group. One example of the substituent of the substituted sulfamoylamino group is an alkyl group. One example of the sulfamoylamino group is an N,N-dipropylsulfamoylamino group.

The alkoxycarbonylamino group means to include a substituted alkoxycarbonylamino group and an unsubstituted alkoxycarbonylamino group. The alkoxycarbonylamino group preferably has from 2 to 20 carbon atoms. One example of the substituent of the substituted alkoxycarbonylamino group is an ionic hydrophilic group. One example of the alkoxycarbonylamino group is an ethoxycarbonylamino group.

The aryloxycarbonylamino group means to include a substituted aryloxycarbonylamino group and an unsubstituted aryloxycarbonylamino group. The aryloxycarbonylamino group preferably has from 7 to 20 carbon atoms. One example of the substituent of the substituted group is an ionic hydrophilic group. One example of the aryloxycarbonylamino group is a phenoxycarbonylamino group.

The alkylsulfonylamino group and the arylsulfonylamino group mean to include substituted alkylsulfonylamino and arylsulfonylamino groups and unsubstituted alkylsulfonylamino and arylsulfonylamino groups. The alkylsulfonylamino and arylsulfonylamino group preferably has from 1 to 20 carbon atoms. One example of the substituent of the substituted group is an ionic hydrophilic group. Examples of the alkylsulfonylamino and arylsulfonylamino groups are methylsulfonylamino, N-phenyl-methylsulfonylamino, phenylsulfonylamino and 3-carboxyphenylsulfonylamino groups.

The heterocyclic sulfonylamino group means to include a substituted heterocyclic sulfonylamino group and an unsubstituted heterocyclic sulfonylamino group. For the hetero ring moiety of the group, referred to are those mentioned hereinabove for the hetero ring of the above-mentioned heterocyclic group. The heterocyclic sulfonylamino group preferably has from 1 to 12 carbon atoms. One example of the substituent of the substituted group is an ionic hydrophilic group. Examples of the heterocyclic sulfonylamino group are 2-thienylsulfonylamino and 3-pyridylsulfonylamino groups.

The alkylthio group, the arylthio group and the heterocyclic-thio group mean to include substituted alkylthio, arylthio and heterocyclic-thio groups and unsubstituted alkylthio, arylthio and heterocyclic-thio groups. For the hetero ring moiety of the group, referred to are those mentioned hereinabove for the hetero ring of the above-mentioned heterocyclic group. The alkylthio, arylthio and heterocyclic-thio group preferably has from 1 to 20 carbon atoms. One example of the substituent of the substituted group is an ionic hydrophilic group. Examples of the alkylthio, arylthio and heterocyclic-thio groups are methylthio, phenylthio and 2-pyridylthio groups.

The alkylsulfonyl group and the arylsulfonyl group mean to include substituted alkylsulfonyl and arylsulfonyl groups, and unsubstituted alkylsulfonyl and arylsulfonyl groups. Examples of the alkylsulfonyl and arylsulfonyl groups are methylsulfonyl and phenylsulfonyl groups.

The heterocyclic sulfonyl group means to include a substituted heterocyclic sulfonyl group and an unsubstituted heterocyclic sulfonyl group. For the hetero ring moiety of the group, referred to are those mentioned hereinabove for the hetero ring of the above-mentioned heterocyclic group. The heterocyclic sulfonyl group preferably has from 1 to 20 carbon atoms. One example of the substituent of the substituted group is an ionic hydrophilic group. Examples of the heterocyclic sulfonyl group are 2-thienylsulfonyl and 3-pyridylsulfonyl groups.

The alkylsulfinyl group and the arylsulfinyl group mean to include substituted alkylsulfinyl and arylsulfinyl groups, and unsubstituted alkylsulfinyl and arylsulfinyl groups. Examples of the alkylsulfinyl and arylsulfinyl groups are methylsulfinyl and phenylsulfinyl groups.

The heterocyclic sulfinyl group means to include a substituted heterocyclic sulfinyl group and an unsubstituted heterocyclic sulfinyl group. For the hetero ring moiety of the group, referred to are those mentioned hereinabove for the hetero ring of the above-mentioned heterocyclic group. The heterocyclic sulfinyl group preferably has from 1 to 20 carbon atoms. One example of the substituent of the substituted group is an ionic hydrophilic group. One example of the heterocyclic sulfinyl group is a 4-pyridylsulfinyl group.

The sulfamoyl group means to include a substituted sulfamoyl group and an unsubstituted sulfamoyl group. One example of the substituent of the substituted sulfamoyl group is an alkyl group. Examples of the sulfamoyl group are dimethylsulfamoyl and di(2-hydroxyethyl)sulfamoyl groups.

Of the dyes of formula (M1), more preferred are those of the following formula (M1-A):

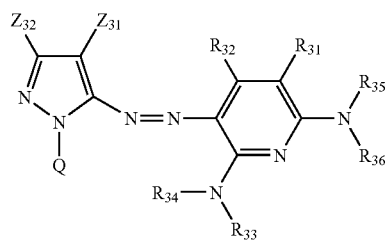

In the formula, $R_{31}$, $R_{32}$, $R_{35}$ and $R_{36}$ have the same meanings as in formula (M1).

$R_{33}$ and $R_{34}$ each independently represent a hydrogen atom or a substituent. The substituent includes an aliphatic group, an aromatic group, a heterocyclic group, an acyl group, an alkoxycarbonyl group, an aryloxycarbonyl group, a carbamoyl group, an alkylsulfonyl group, an arylsulfonyl group and a sulfamoyl group. Of those, preferred are a hydrogen atom, an aromatic group, a heterocyclic group, an acyl group, an alkylsulfonyl group and an arylsulfonyl group; and more preferred are a hydrogen atom, an aromatic group and a heterocyclic group.

$Z_{31}$ represents an electron-attractive group having a Hammett's substituent constant σp of at least 0.20. Preferably, $Z_{31}$ is an electron-attractive group having σp of at least 0.30, more preferably at least 0.45, even more preferably at least 0.60, but not exceeding 1.0.

Concretely, the electron-attractive group of which the Hammett's substituent constant σp is at least 0.60 includes a cyano group, a nitro group, an alkylsulfonyl group (e.g., methylsulfonyl), and an arylsulfonyl group (e.g., phenylsulfonyl).

Examples of the electron-attractive group having a Hammett's substituent constant σp of at least 0.45 are, in addition to the groups mentioned above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl), and a halogenoalkyl group (e.g., trifluoromethyl).

Examples of the electron-attractive group having a Hammett's substituent constant σp of at least 0.30 are, in addition to the groups mentioned above, an acyloxy group (e.g., acetoxy), a carbamoyl group (e.g., N-ethylcarbamoyl, N,N-diethylcarbamoyl), a halogenoalkoxy group (e.g., trifluoromethoxy), a halogenoaryloxy group (e.g., pentafluorophenyloxy), a sulfonyloxy group (e.g., methylsulfonyloxy), a halogenoalkylthio group (e.g., difluoromethylthio), an aryl group substituted with at least two electron-attractive groups each having σp of at least 0.15 (e.g., 2,4-dinitrophenyl, pentachlorophenyl), and a heterocyclic group (e.g., 2-benzoxazolyl, 2-benzothiazolyl, 1-phenyl-2-benzimidazolyl).

Examples of the electron-attractive group having σp of at least 0.20 are, in addition to the groups mentioned above, a halogen atom.

Above all, $Z_{31}$ is preferably any of an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, or a halogenoalkyl group having from 1 to 20 carbon atoms; more preferably any of a cyano group, an alkylsulfonyl group having from 1 to 20 carbon atoms, or an arylsulfonyl group having from 6 to 20 carbon atoms; most preferably a cyano group.

$Z_{32}$ represents a hydrogen atom, or a substituent. The substituent includes an aliphatic group, an aromatic group and a heterocyclic group. Preferably, $Z_{32}$ is an aliphatic group, more preferably an alkyl group having from 1 to 6 carbon atoms.

Q represents a hydrogen atom, or a substituent. The substituent includes an aliphatic group, an aromatic group or a heterocyclic group. Above all, Q is preferably a group that comprises non-metallic atoms necessary for forming a 5- to 8-membered ring. The 5- to 8-membered ring may be substituted, and may be a saturated ring or may have an unsaturated bond. Above all, it is more preferably an aromatic group or a heterocyclic group. Preferred non-metallic atoms for it are nitrogen, oxygen, sulfur and carbon atoms. Examples of the cyclic structure are benzene, cyclopentane, cyclohexane, cycloheptane, cyclooctane, cyclohexene, pyridine, pyrimidine, pyrazine, pyridazine, triazine, imidazole, benzimidazole, oxazole, benzoxazole, thiazole, benzothiazole, oxane, sulforane and thian rings.

The hydrogen atom of each group in formula (M1-A) may be substituted. For the substituents, referred to are those mentioned hereinabove for the groups $G_3$, $R_{31}$ and $R_{32}$ in formula (M1), and ionic hydrophilic groups.

Especially preferred combinations of the substituents of the azo dyes of formula (M1) are mentioned below. $R_{35}$ and $R_{36}$ are preferably any of a hydrogen atom, an alkyl group, an aryl group, a heterocyclic group, a sulfonyl group or an acyl group; more preferably any of a hydrogen atom, an aryl group, a heterocyclic group or a sulfonyl group; most preferably any of a hydrogen atom, an aryl group or a heterocyclic group. However, $R_{35}$ and $R_{36}$ must not be hydrogen atoms at the same time.

$G_3$ is preferably a hydrogen atom, a halogen atom, an alkyl group, a hydroxyl group, an amino group or an acylamino group, more preferably a hydrogen atom, a halogen atom, an amino group or an acylamino group, most preferably a hydrogen atom, an amino group or an acylamino group.

$A_{31}$ is preferably a pyrazole ring, an imidazole ring, an isothiazole ring, a thiadiazole ring or a benzothiazole ring, more preferably a pyrazole ring or an isothiazole ring, most preferably a pyrazole ring.

Also preferably, $B_{31}$ and $B_{32}$ are =CR$_{31}$— and —CR$_{32}$=, respectively; and $R_{31}$ and $R_{32}$ are preferably any of a hydrogen atom, an alkyl group, a halogen atom, a cyano group, a carbamoyl group, a carboxyl group, a hydroxyl group, an alkoxy group or an alkoxycarbonyl group, more preferably any of a hydrogen atom, an alkyl group, a carboxyl group, a cyano group or a carbamoyl group.

Regarding the preferred combinations of the substituents of the compounds of formula (M1), it is desirable that at least one of the substituents is the above-mentioned preferred group. More preferably, a larger number of the substituents are the preferred groups. Most preferably, all the substituents are the preferred groups.

Specific examples of the azo dyes of formula (M1) are mentioned below, to which, however, the invention should not be limited.

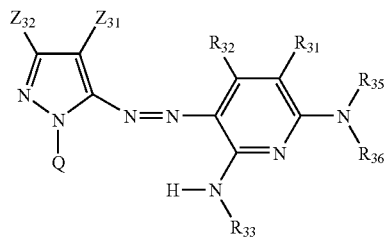

-continued

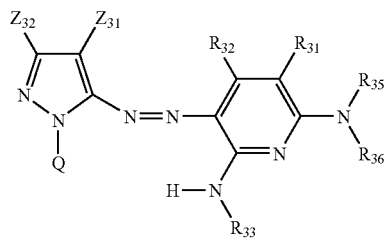

| Dye | Q | R33 | R36 |
|---|---|---|---|
| a-8 | (2-methylbenzothiazol-6-yl)NHCOCH(Et)-O-(2,4-di-tert-pentylphenyl) | 4-C8H17-phenyl | 4-C8H17-phenyl |
| a-9 | (2-methylbenzothiazol-6-yl)NHSO2-(2-(n)C8H17O-5-C8H17(t)-phenyl) | 2,4,6-tri-CH3-phenyl | C8H17(t) |
| a-10 | 2-methyl-5-chlorobenzothiazol-6-yl | 2-OC12H25-phenyl | 2-OC12H25-phenyl |

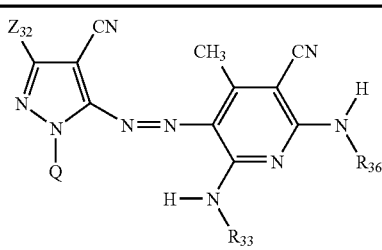

| Dye | Z32 | Q | R33 | R36 |
|---|---|---|---|---|
| a-11 | tert-butyl | 2-methyl-6-SO2Na-benzothiazolyl | 4-CH3-phenyl | 4-SO3Na-phenyl |
| a-12 | phenyl | 2-methyl-6-COOH-benzothiazolyl | 4-SO3K-phenyl | 3-COOH-phenyl |
| a-13 | 2-Cl-6-CH3-phenyl | 2-methyl-SO3K-benzothiazolyl (4,5-mix) | 4-SO3K-phenyl | 3-COOH-phenyl |

-continued

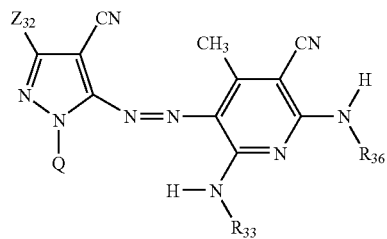

| Dye | $Z_{32}$ | Q | $R_{33}$ | $R_{36}$ |
|---|---|---|---|---|
| a-14 | t-Bu | 2-(6-SO₃Na-benzothiazolyl) | 2,4,5-trimethyl-6-SO₃Na-phenyl | 2,4,5-trimethyl-6-SO₃Na-phenyl |
| a-15 | t-Bu | 2-(6-SO₃K-benzothiazolyl) | 2,4,5-trimethyl-6-SO₃K-phenyl | 2,4,5-trimethyl-6-SO₃K-phenyl |
| a-16 | t-Bu | 2-(6-Cl-benzothiazolyl) | 3,4,5-trimethyl-4-CH₂N(CH₂CO₂H)₂-phenyl | 3,4,5-trimethyl-4-CH₂N(CH₂CO₂H)₂-phenyl |
| a-17 | t-Bu | 2-(6-SO₃Na-benzothiazolyl) | 3,4,5-trimethyl-SO₃Na-phenyl | 3,4,5-trimethyl-SO₃Na-phenyl |

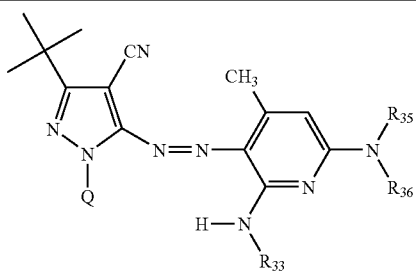

| Dye | Q | $R_{35}$ |
|---|---|---|
| a-18 | 2-benzothiazolyl | 2-benzothiazolyl |

-continued
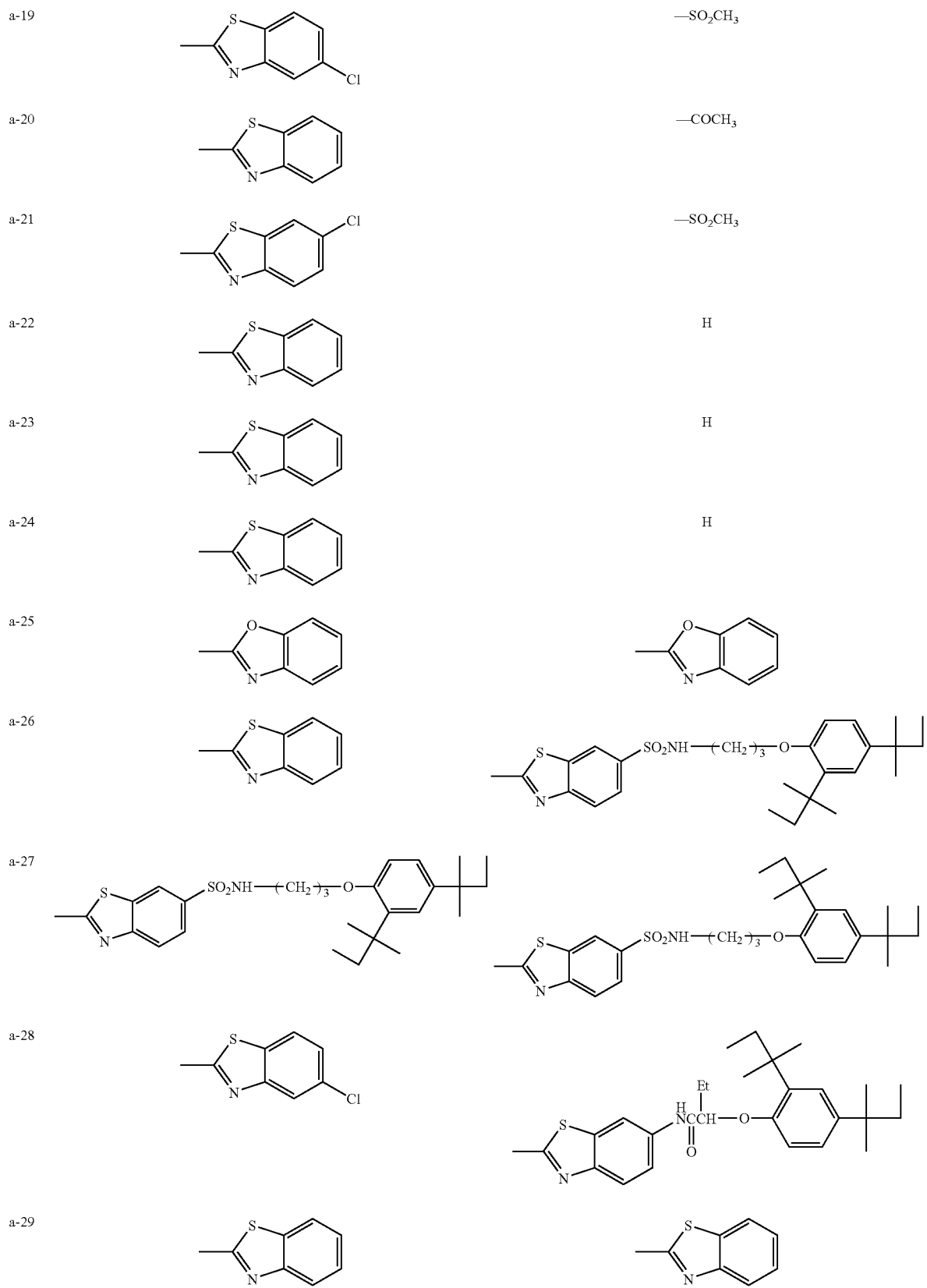

-continued

| | | |
|---|---|---|
| a-30 | 2-methylbenzothiazole-5-NO₂ | 2-methylbenzothiazole-6-NHSO₂-[2-(n)C₈H₁₇O, 5-OC₈H₁₇(t)]phenyl |
| a-31 | 2-methylbenzoxazole-6-SO₂NHCH₂CH(C₂H₅)(C₄H₉) | 2-methylbenzoxazole-6-SO₂NHCH₂CH(C₂H₅)(C₄H₉) |
| a-32 | 2-methylbenzothiazole-6-SO₃K | 2-methylbenzothiazole-6-SO₃K |
| a-33 | 2-methylbenzothiazole-6-SO₂NH-(3,5-dicarboxyphenyl) (COOH, COOH) | 2-methylbenzothiazole-6-SO₂NH-(3,5-dicarboxyphenyl) (COOH, COOH) |
| a-34 | 2-methylbenzothiazole-SO₂NH-(3,5-di-COOK-phenyl) (5,6-mix) | 2-methylbenzothiazole-SO₂NH-(3,5-di-COOK-phenyl) (5,6-mix) |
| a-35 | 2-methylbenzothiazole-SO₃Na (5,6-mix) | 2-methylbenzothiazole-SO₂NH-(3,5-di-COOH-phenyl) (5,6-mix) |
| a-36 | 2-methylbenzothiazole-6-SO₃Na | 2-methylbenzothiazole-6-SO₃Na |
| a-37 | 2-methylbenzothiazole-6-SO₂NH-(3,5-di-COOK-phenyl) | 2-methylbenzothiazole |
| a-38 | 2-methylbenzothiazole-6-SO₃Li | 2-methylbenzothiazole-6-SO₃Li |
| a-39 | 2-methylbenzothiazole-6-SO₃Na | 2-methylbenzothiazole-6-SO₃Na |

-continued
| | | |
|---|---|---|
| a-40 | 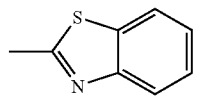 | 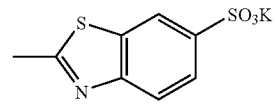 |
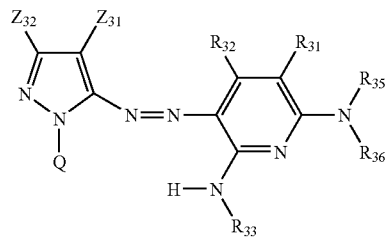
| Dye | $R_{36}$ | $R_{33}$ |
|---|---|---|
| a-18 | 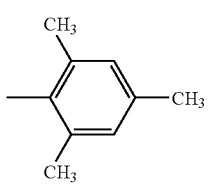 | 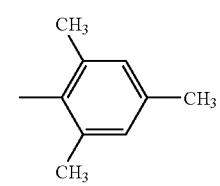 |
| a-19 | 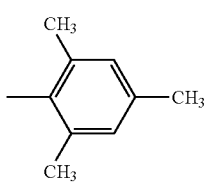 | 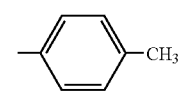 |
| a-20 | $C_8H_{17}(t)$ | $C_8H_{17}(t)$ |
| a-21 | 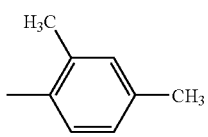 | $C_8H_{17}(t)$ |
| a-22 | 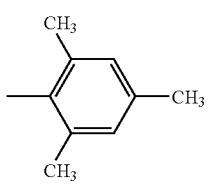 | 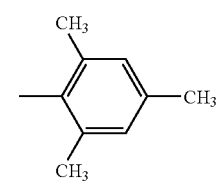 |
| a-23 | 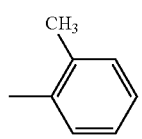 | 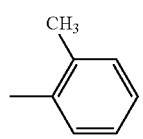 |
| a-24 | 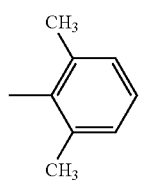 | 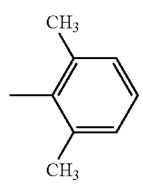 |

-continued
| | | | |
|---|---|---|---|
| a-25 | 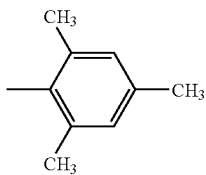 | | 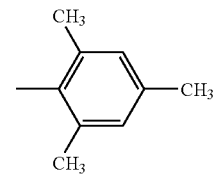 |
| a-26 | 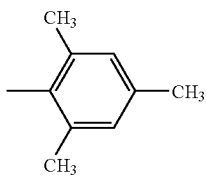 | | 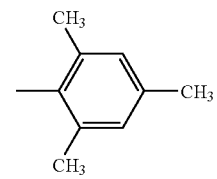 |
| a-27 | 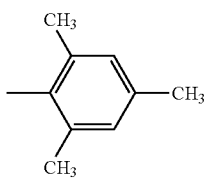 | | 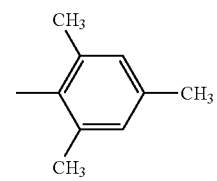 |
| a-28 | 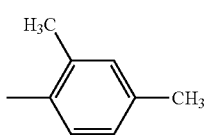 | | 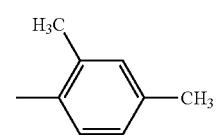 |
| a-29 | 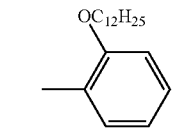 | | 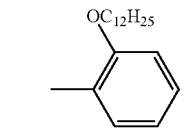 |
| a-30 | 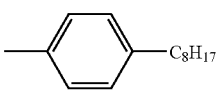 | | $C_8H_{17}(t)$ |
| a-31 | 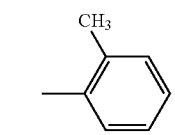 | | 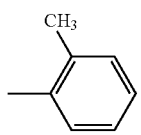 |
| a-32 | 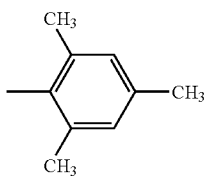 | | 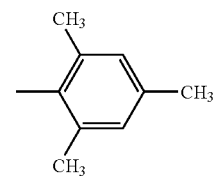 |
| a-33 | 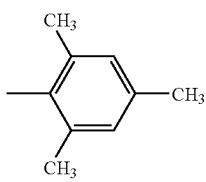 | | 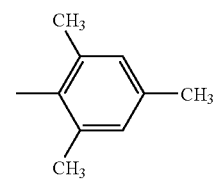 |

-continued
a-34 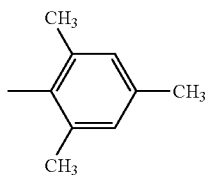 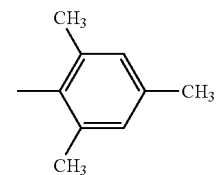
a-35 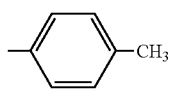 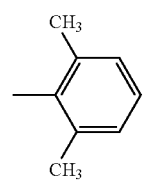
a-36 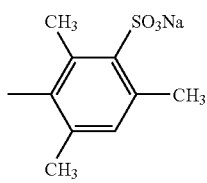 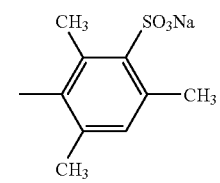
a-37 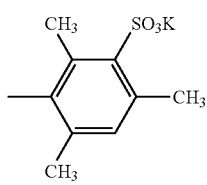 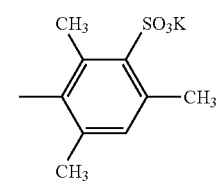
a-38 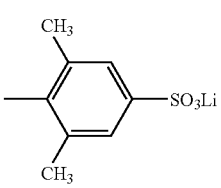 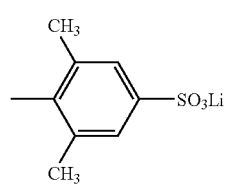
a-39 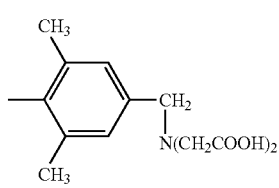 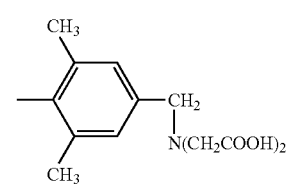
a-40 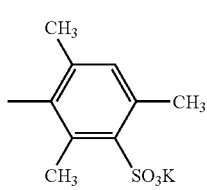 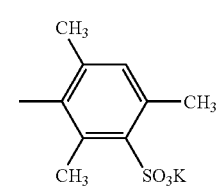

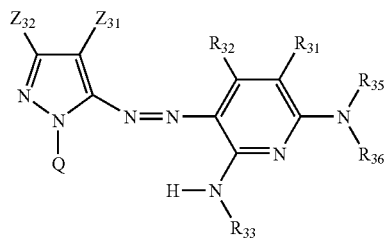

| Dye | $Z_{32}$ | $Z_{31}$ | Q | $R_{32}$ | $R_{31}$ | $R_{35}$ | $R_{36}$ | $R_{33}$ |
|---|---|---|---|---|---|---|---|---|
| a-41 | 2,3-dimethylphenyl (CH₃, CH₃) | CN | 2-pyridyl | H | $CONH_2$ | $SO_2CH_3$ | 2-(octyloxy)phenyl ($OC_8H_{17}$) | 2-methylphenyl ($CH_3$) |
| a-42 | t-Bu | Br | 2-pyrimidinyl | COOEt | H | 2-benzothiazolyl | $C_8H_{17}(t)$ | $COCH_3$ |
| a-43 | 2-pyridyl | $SO_2CH_3$ | 4,6-bis(methylamino)-1,3,5-triazin-2-yl (NHCH₃, NHCH₃) | $CONH_2$ | H | 6-chloro-2-benzothiazolyl | 4-methylphenyl ($CH_3$) | CO-t-Bu |
| a-44 | t-Bu | CN | 2,4,5-tricyanophenyl (CN, CN, NC) | H | H | 5-chloro-2-benzothiazolyl | 2-methylphenyl ($CH_3$) | $SO_2CH_3$ |
| a-45 | t-Bu | Br | 2,6-dichloro-4-nitrophenyl (Cl, Cl, $NO_2$) | H | $CONH_2$ | $COCH_3$ | 2,4,6-trimethylphenyl ($CH_3$, $CH_3$, $CH_3$) | 4-octylphenyl ($C_8H_{17}$) |
| a-46 | t-Bu | CN | 2-benzothiazolyl | $CH_3$ | H | 2-benzothiazolyl | 2,6-diethyl-4-methylphenyl ($C_2H_5$, $CH_3$, $C_2H_5$) | 2,6-diethyl-4-methylphenyl ($C_2H_5$, $CH_3$, $C_2H_5$) |

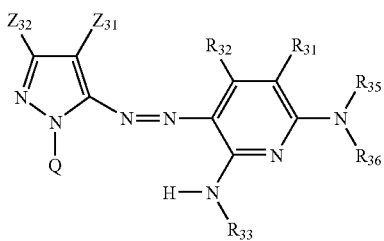

| Dye | $Z_{32}$ | $R_{32}$ | $R_{31}$ | $R_{35}$ | $R_{36}$ | $R_{33}$ |
|---|---|---|---|---|---|---|
| b-1 | $CH_3$ | $CH_3$ | CN | H | –C₆H₄–$C_8H_{17}$ | –C₆H₄–$C_8H_{17}$ |
| b-2 | $CH_3$ | $CH_3$ | CN | H | 2,3,4,5-tetramethylphenyl | 2,3,4,5-tetramethylphenyl |
| b-3 | $CH_3$ | $CH_3$ | $CONH_2$ | H | –C₆H₄–$C_8H_{17}$ | 2,3,4,5-tetramethylphenyl |
| b-4 | $CH_3$ | $CH_3$ | H | H | 2,3,4,6-tetramethyl-5-($SO_3Li$)phenyl | 2,3,4,6-tetramethyl-5-($SO_3Li$)phenyl |
| b-5 | $CH_3$ | H | CN | H | –C₆H₄–$SO_3Na$ | –C₆H₄–$SO_3Na$ |

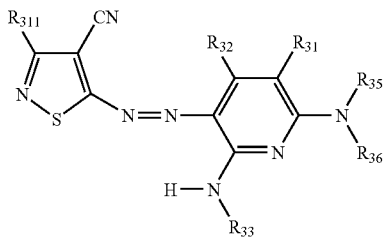

| Dye | $R_{311}$ | $R_{32}$ | $R_{31}$ | $R_{35}$ | $R_{36}$ | $R_{33}$ |
|---|---|---|---|---|---|---|
| b-6 | $CH_3$ | $CH_3$ | H | 2-benzothiazolyl | 2,3,5,6-tetramethyl-4-($CH_2N(CH_2CO_2K)_2$)phenyl | 2,3,5,6-tetramethyl-4-($CH_2N(CH_2CO_2K)_2$)phenyl |

-continued
| | | | | | | | |
|---|---|---|---|---|---|---|---|
| b-7 | CH₃ | CH₃ | H | 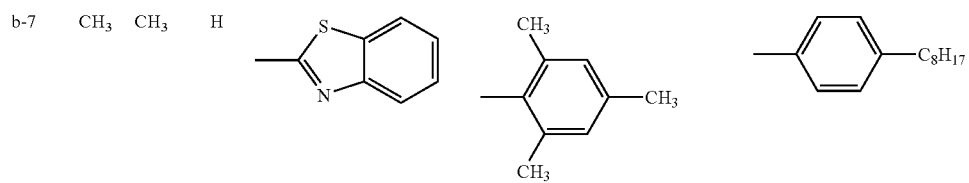 | | | |
| b-8 | CH₃ | H | H | SO₂CH₃ | | | |
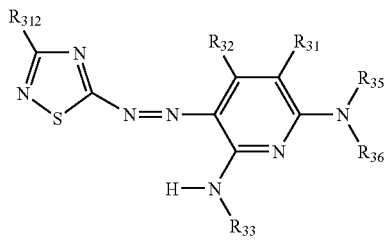
| Dye | R₃₁₂ | R₃₂ | R₃₁ | R₃₅ | R₃₆ | R₃₃ |
|---|---|---|---|---|---|---|
| c-1 | —SCH₃ | CH₃ | CN | H | C₈H₁₇(t) | |
| c-2 | | H | CONH₂ | H | | |
| c-3 | | CH₃ | H | | | |
| c-4 | —CH₃ | CH₃ | H | | | |
| c-5 | | H | H | | | C₈H₁₇(t) |
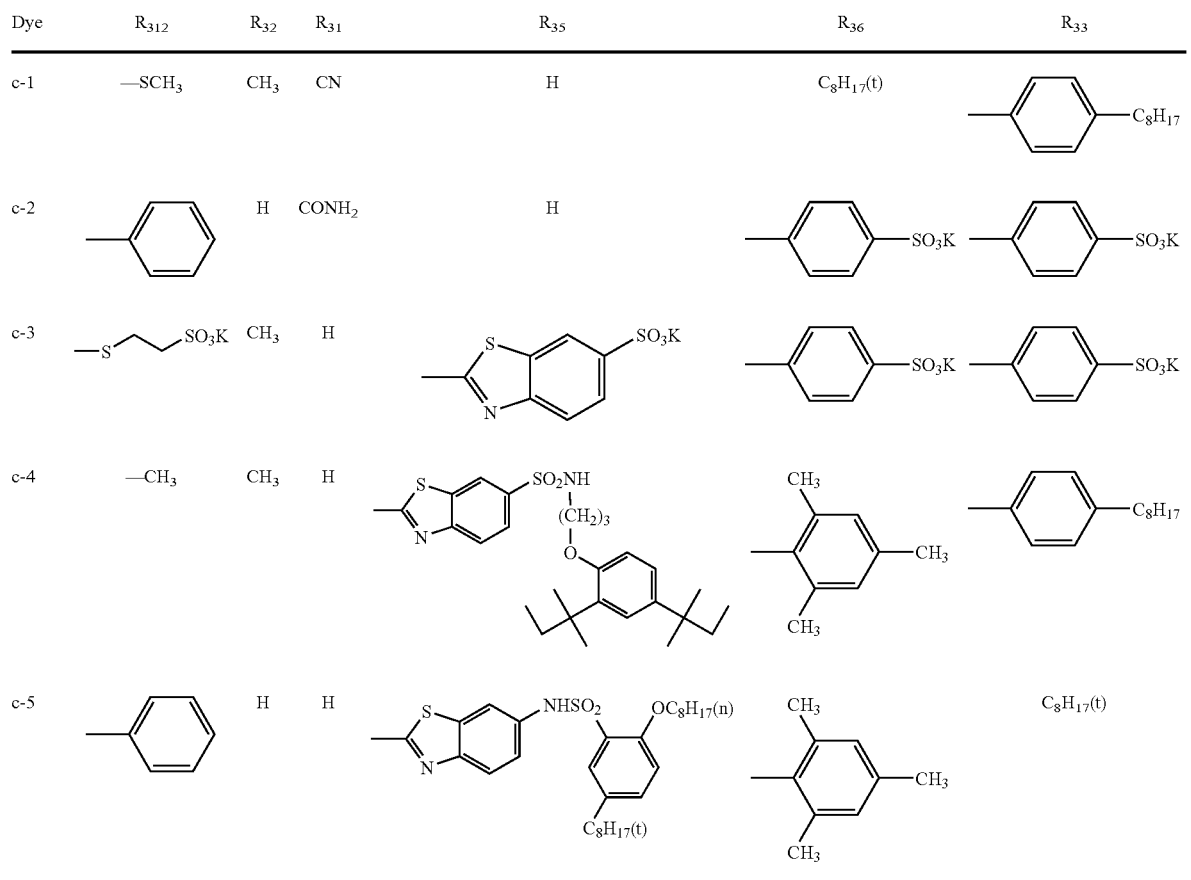

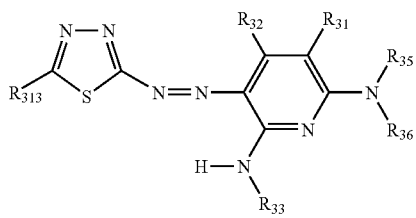
| Dye | R₃₁₃ | R₃₂ | R₃₁ | R₃₅ | R₃₆ | R₃₃ |
|---|---|---|---|---|---|---|
| d-1 | Me | CH₃ | CN | H | -C₆H₄-SO₃K | -C₆H₄-SO₃K |
| d-2 | Me | CH₃ | CN | H | 2,6-(C₂H₅)₂-4-CH₃-C₆H₂- | 2,6-(C₂H₅)₂-4-CH₃-C₆H₂- |
| d-3 | Me | H | H | 2-methylbenzothiazolyl | 2,4,6-(CH₃)₃-3-SO₃K-C₆H- | 2,4,6-(CH₃)₃-3-SO₃K-C₆H- |
| d-4 | Ph | CH₃ | CONH₂ | H | -C₆H₄-C₈H₁₇ | -C₆H₄-C₈H₁₇ |
| d-5 | Ph | CH₃ | H | 2-methylbenzothiazol-6-yl-SO₂NH-(CH₂)₃-O-(2,4-di-tert-pentylphenyl) | -C₆H₄-OC₄H₉(n) | 2,6-(C₂H₅)₂-4-CH₃-C₆H₂- |
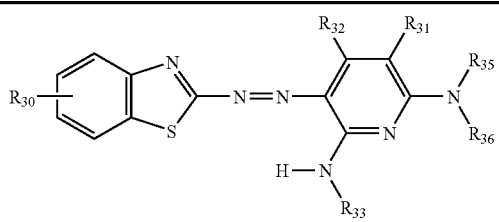
| Dye | R₃₀ | R₃₂ | R₃₁ | R₃₅ | R₃₆ | R₃₃ |
|---|---|---|---|---|---|---|
| e-1 | 5-Cl | CH₃ | CONH₂ | H | C₈H₁₇(t) | C₈H₁₇(t) |

-continued
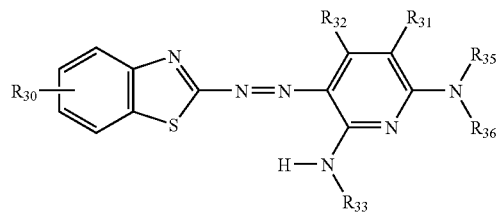
| Dye | $R_{30}$ | $R_{32}$ | $R_{31}$ | $R_{35}$ | $R_{36}$ | $R_{33}$ |
|---|---|---|---|---|---|---|
| e-2 | 5,6-diCl | H | H | 2-methylbenzothiazolyl | 4-$C_8H_{17}$-phenyl | 4-$C_8H_{17}$-phenyl |
| e-3 | 5,6-diCl | $CH_3$ | H | 2-methylbenzothiazolyl | 2,3,5-tri$CH_3$-phenyl | $COCH_3$ |
| e-4 | 5-$CH_3$ | H | CN | H | 4-$SO_3K$-phenyl | 4-$SO_3K$-phenyl |
| e-5 | 5-$NO_2$ | $CH_3$ | H | $SO_2CH_3$ | 2,3-di$CH_3$-phenyl | 2,3,5-tri$CH_3$-phenyl |
f-1
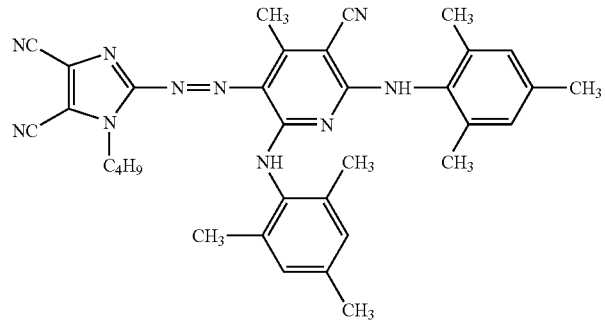
f-2
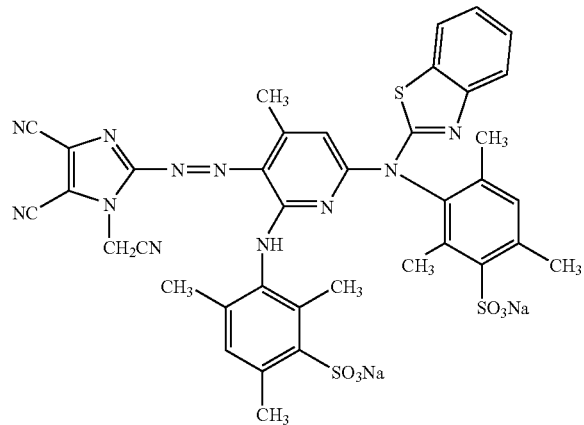

The content of the azo dye of formula (M1) in the ink is preferably from 0.2 to 20% by weight, more preferably from 0.5 to 15% by weight. Also preferably, the solubility of the dye in water at 20° C. (or the dispersibility thereof in a stable condition) is at least 5% by weight, more preferably at least 10% by weight.

Dyes of formula (M2) are described below.

In the invention, an anthrapyridone dye of formula (M2) is preferably used. In the formula, Z is preferably an alkali metal element, an alkaline earth metal element, an alkylamino group, an alkanolamino group, or an ammonium group, more preferably an alkali metal element such as sodium, potassium or lithium, an alkanolamino group such as monoethanola-

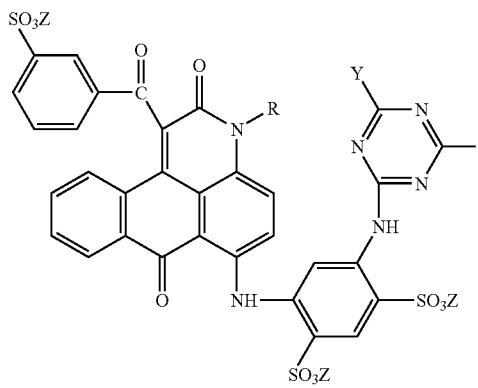

wherein R represents a hydrogen atom, an alkyl group, a hydroxy-lower alkyl group, a cyclohexyl group, a mono or dialkylaminoalkyl group, or a cyano-lower alkyl group; Y represents a chlorine atom, a hydroxyl group, an amino group, a mono or dialkylamino group (optionally having, on the alkyl moiety thereof, a substituent selected from a sulfonic acid group, a carboxyl group and a hydroxyl group), an aralkylamino group, a cycloalkylamino group, an alkoxy group, a phenoxy group (optionally having, on the benzene mino, diethanolamino, triethanolamino, monoisopropanolamino, diisopropanolamino, triisopropanolamino, or an ammonium group.

Compounds of the following formula (M3) are typical examples of the dyes of formula (M2).

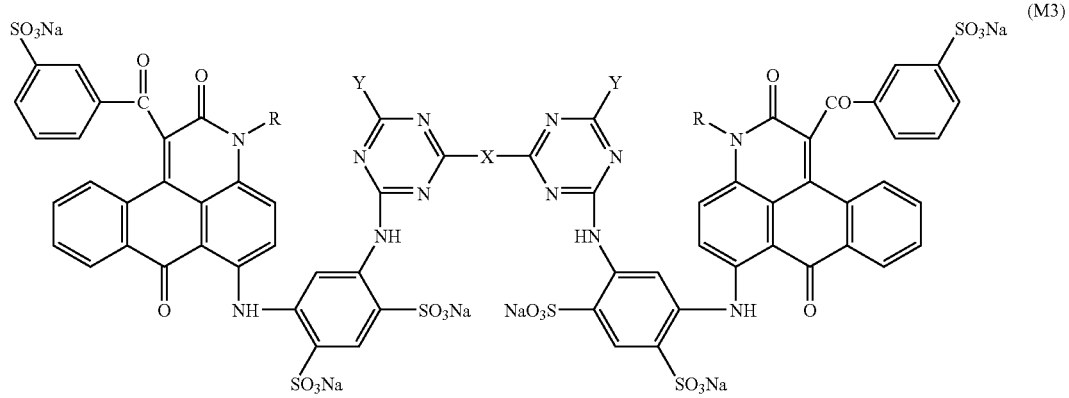

ring thereof, a substituent selected from a sulfonic acid group, a carboxyl group, an acetylamino group, an amino group and a hydroxyl group), an anilino group (optionally substituted with one or two substituents selected from a sulfonic acid group and a carboxyl group), a naphthylamino group (in which the naphthyl group may be substituted with a sulfonic acid group), or a mono or dialkylaminoalkylamino group; X represents a crosslinking group; Z represents a hydrogen atom, an alkali metal element, an alkaline earth metal element, an alkylamino group, an alkanolamino group, or an ammonium group.

Not specifically defined, the term "alkyl" as referred to herein is meant to indicate any and every ordinary alkyl group generally referred to in the art. In general, the alkyl group is preferably one having from 1 to 10 carbon atoms, more preferably from 1 to 4 carbon atoms, unless otherwise specifically indicated. The same shall apply also to the term, alkyl group in alkoxy and aralkyl groups.

In formulae (M2) and (M3) in the invention, the alkyl group for R is, for example, a C1-C4 alkyl group such as methyl, ethyl, n-propyl, n-butyl. The alkyl in the hydroxy-lower alkyl group and the cyano-lower alkyl group for R includes, for example, ethyl and propyl, but is preferably ethyl. The alkylamino group for Y is, for example, a C1-C8 alkylamino group such as methylamino, ethylamino, butylamino, 2-ethylhexylamino. The dialkylamino group is, for example, a C1-C8 dialkylamino group such as diethylamino, dibutylamino, dihexylamino. The aralkylamino group is, for example, a phenyl (C1-C6) alkylamino group such as benzylamino, phenethylamino, phenylpropylamino. The cycloalkylamino group is, for example, a cyclo (C5-C7) alkylamino group such as cyclohexylamino, cyclopentylamino. The alkoxy group is, for example, a C1-C4 alkoxy group such as methoxy, ethoxy, n-propoxy, isopropoxy, butoxy. The alkyl moiety in the sulfonic acid or carboxyl group having alkylamino group is, for example, a C1-C4 alkyl group such as methyl, ethyl, n-propyl, n-butyl.

Examples of the phenoxy group for Y, which may be substituted with a substituent selected from a sulfonic acid group, a carboxyl group, an acetylamino group, an amino group and a hydroxyl group, are 4-sulfophenoxy, 4-carboxyphenoxy, 4-acetylaminophenoxy, 4-aminophenoxy and 4-hydroxyphenoxy groups.

Examples of the alkylamino group for Y, which has a sulfonic acid group or a carboxyl group, are 2-sulfoethylamino, carboxymethylamino, 2-carboxyethylamino, 1-carboxyethylamino, 1,2-dicarboxyethylamino and di(carboxymethyl)amino groups. Examples of the hydroxyl group having alkylamino group are hydroxyethylamino and dihydroxyethylamino groups.

Examples of the anilino group for Y, which may be substituted with one or two substituents selected from a sulfonic acid group and a carboxyl group, are 2,5-disulfoanilino, 3-sulfoanilino, 2-sulfoanilino, 4-sulfoanilino, 2-carboxy-4-sulfoanilino and 2-carboxy-5-sulfoanilino groups.

Examples of the naphthylamino group for Y, which may be substituted with a sulfonic acid group, are
3,6,8-trisulfo-1-naphthylamino,
4,6,8-trisulfo-2-naphthylamino,
3,6,8-trisulfo-2-naphthylamino, and
4,8-disulfo-2-naphthylamino groups.

The crosslinking group for X is, for example, a divalent group of a hydrocarbon residue having from 1 to 20 carbon atoms and optionally containing any of nitrogen, oxygen and sulfur atoms, which has a nitrogen or oxygen atom at both ends thereof and which has two bonds extending from the nitrogen or oxygen atom at both ends thereof. Concretely, it may be represented by:

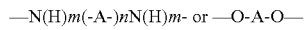
—N(H)m(-A-)nN(H)m- or —O-A-O— wherein A represents a divalent hydrocarbon residue having from 1 to 20 carbon atoms, and optionally containing any of nitrogen, oxygen and sulfur atoms; n indicates 1 or 2; m indicates 1 or 0; and when n is 1, then m is 1, and when n is 2, then m is 0.

The divalent hydro carbon residue having from 1 to 20 carbon atoms for A includes, for example, a divalent aliphatic group having from 1 to 15 carbon atoms and optionally containing 1 or 2 hetero atoms (e.g., nitrogen, oxygen, sulfur), a divalent aromatic group having from 3 to 10, preferably from 5 to 10 carbon atoms and optionally containing from 1 to 3 hetero atoms (e.g., nitrogen, oxygen, sulfur), and a divalent group of a combination of the aliphatic group and the aromatic group. These groups may have substituents (sulfonic acid group, carboxyl group, amino group, and, for aromatic group, lower alkyl group).

The aliphatic group includes, for example, a (poly)methylene having from 1 to 6 carbon atoms and optionally substituted with a lower alkyl group, such as methylene, dimethylene(ethylene), trimethylene(propylene), 2-methyltrimethylene(2-methylpropylene), tetramethylene (butylene), hexamethylene; a cycloalkylene having from 5 to 7 carbon atoms such as cyclopentane-1,2- or -1,3-diyl, cyclohexane-1,2-, -1,3- or -1,4-diyl, cycloheptane-diyl; an aliphatic group comprising a lower alkylene and an aliphatic ring having from 5 to 7 carbon atoms (optionally substituted with a lower alkyl group), such as methylenecyclohexane-1, 4-diylmethylene (—CH$_2$—C$_6$H$_{10}$—CH$_2$—), methylenedicyclohexane-diyl (—C$_6$H$_{10}$—CH$_2$—C$_6$H$_{10}$—), methylenebis(methylcyclohexane-diyl) {—C$_6$H$_{10}$(CH$_3$)—CH$_2$—C$_6$H$_{10}$(CH$_3$)—}, cyclohexane-diyl-dimethylene (—CH$_2$—C$_6$H$_{10}$—CH$_2$—); and an aliphatic group having from 1 to 7 carbon atoms and containing a hetero atom such as methyleneoxymethylene (—CH$_2$—O—CH$_2$—), bis(dimethylene) amino (—C$_2$H$_4$—NH—C$_2$H$_4$—), methylenethiomethylene (—CH$_2$—S—CH$_2$—), oxydicyclohexane-diyl (—C$_6$H$_{10}$—O—C$_6$H$_{10}$—).

The divalent aromatic group is, for example, an aromatic group having from 6 to 10 carbon atoms such as phenylene (—C$_6$H$_4$—), naphthylene (—C$_{10}$H$_6$—).

The divalent group formed by combining the aliphatic group and the aromatic group is, for example, a xylylene group (—CH—C$_6$H$_4$—CH—).

More preferably, A is dimethylene, hexamethylene, 1,3-xylylene, methylenedicyclohexane-4,1-diyl, methylenebis (2-methylcyclohexane-4,1-diyl), or cyclohexane-1,3-diyl-dimethylene.

The crosslinking group X includes, for example, a diaminoalkylene group such as 1,2-diaminoethylene (—NH—CH$_2$CH$_2$—NH—), 1,4-diaminobutylene (—NH—C$_4$H$_8$—NH—), 1,6-diaminohexylene (—NH—C$_6$H$_{12}$—NH—); a diaminophenylene group such as 1,4-piperazinediyl (—NC$_4$H$_8$N—), 1,4-diaminophenylene (—NH—C$_6$H$_4$-p-NH—), 1,3-diaminophenylene (—NH—C$_6$H$_4$-m-NH—); a substituted diaminophenylene group such as 4-sulfo-1,3-diaminophenylene {—NH—C$_6$H$_4$(p-SO$_3$H)-m-NH—}, 5-carboxy-1,3-diaminophenylene; 1,3-diaminoxylylene (—NH—CH$_2$—C$_6$H$_4$-m-CH$_2$—NH—), 1,4-diaminoxylylene (—NH—CH$_2$—C$_6$H$_4$-p-CH$_2$—NH—), 4,4'-diamino-2-sulfo-diphenylamino {—NH—C$_6$H$_4$ (m-SO$_3$H)—NH—C$_6$H$_4$-p-NH—}, 4,4'-diaminodicyclohexylmethane (—NH—C$_6$H$_{10}$-4-CH$_2$—C$_6$H$_{10}$-4'-NH—), 4,4'-diamino-3, 3'-dimethyldicyclohexylmethane {—NH—C$_6$H$_{10}$(3-CH$_3$)-4-CH$_2$—C$_6$H$_{10}$(3'-CH$_3$)-4'—NH—), 1,3-bis(aminomethyl) cyclohexane (—NH—CH$_2$—C$_6$H$_{10}$-3-CH—NH—); a dioxy-substituted alkylene group such as dioxyethylene (—O—CH$_2$CH$_2$—O—), 1,4-dioxybutylene (—O—C$_4$H$_8$—O—), 2,2'-dioxyethylether (—O—CH$_2$CH$_2$—O—CH$_2$CH$_2$—O—); 1,4-dioxyphenylene (—O—C$_6$H$_4$-p-O—), 1,3-dioxyphenylene (—O—C$_6$H$_4$-m-O—), 4,4'-dioxydiphenylether (—O—C$_6$H$_4$-p-O—C$_6$H$_4$-p-O—), 4,4'-dioxyphenylene-thioether (—O—C$_6$H$_4$-p-S—C$_6$H$_4$-p-O—), 2,5- and 2,6-norbornanediamino, 1,4-dioxymethylcyclohexylene (—O—CH—C$_6$H$_{10}$-4-CH$_2$—O—). One example of the group of formula —N(H)m(-A-)nN(H)m- where n is 2 and m is 0 is 1,4-piperazinediyl (—NC$_4$H$_8$N—).

Preferred combinations of R, Y and X are as follows: For example, R is a hydrogen atom or a methyl group; Y is a chlorine atom, a hydroxyl group or an amino group; and X is a diaminoethylene group, a 1,4-piperazinediyl group, a 1,3-diaminoxylylene group, a 4,4'-diaminodicyclohexylmethane group, a 4,4'-diamino-3,3'-dimethyldicyclohexylmethane group, or a 1,3-bis(aminomethyl)cyclohexane group.

Specific examples of the anthrapyridone compounds of formula (M3) are mentioned in the following Tables. In the Tables, diaminoethylene means 1,2-diaminoethylene (—NH—CH$_2$CH$_2$—NH—). Ph means phenyl. For example, PhO is phenoxy, NHPh is anilino, and the same shall apply to the others. NHPh(p-SO$_3$H) means 4-sulfoanilino (in which p-SO$_3$H means that the sulfonic acid group is in the para-position of the phenyl group). NHPh(COOH)$_2$(3,5) is 3,5-dicarboxyanilino (in which Ph(COOH)$_2$(3,5) means that the carboxyl groups are substituted at the 3- and 5-positions of the phenyl group). The same shall apply to the others. "naphthyl" is naphthyl; "NH-2naphthyl (SO$_3$H)3(3, 6, 8)" is 3,6,8-trisulfo-2-naphthylamino; and NH(cyclohexyl) is cyclohexylamino.

TABLE 1

| No. | R | X | Y |
|---|---|---|---|
| 1 | CH$_3$ | diaminoethylene | OH |
| 2 | CH$_3$ | diaminoethylene | Cl |
| 3 | CH$_3$ | diaminoethylene | NH$_2$ |
| 4 | CH$_3$ | 1,4-piperazinediyl | Cl |
| 5 | CH$_3$ | 1,4-piperazinediyl | NH$_2$ |
| 6 | CH$_3$ | 1,3-diaminoxylylene | Cl |
| 7 | CH$_3$ | 1,3-diaminoxylylene | NH$_2$ |
| 8 | CH$_3$ | 1,4-diaminoxylylene | NH$_2$ |
| 9 | CH$_3$ | bis(3-aminopropyl)ether | NH$_2$ |
| 10 | CH$_3$ | 3,3'-iminodi(propylamine) | NH$_2$ |
| 11 | CH$_3$ | 2,2'-iminodi(ethylamine) | NH$_2$ |
| 12 | CH$_3$ | 1,4-diaminobutylene | NH$_2$ |
| 13 | CH$_3$ | 1,4-diaminohexylene | NH$_2$ |
| 14 | CH$_3$ | 1,4-diaminophenylene | NH$_2$ |
| 15 | CH$_3$ | 1,3-diaminophenylene | NH$_2$ |
| 16 | CH$_3$ | 1,3-diamino-4-sulfophenylene | NH$_2$ |
| 17 | CH$_3$ | 1,3-diamino-5-carboxyphenylene | NH$_2$ |
| 18 | CH$_3$ | 4,4'-diamino-2-sulfodiphenylamine | NH$_2$ |
| 19 | CH$_3$ | 4,4'-diamino-3,3'-dimethyl-dicyclohexyl methane | NH$_2$ |
| 20 | CH$_3$ | 4,4-diamino-dicyclohexylmethane | NH$_2$ |
| 21 | CH$_3$ | diaminoethylene | NH(CH$_2$COOH) |
| 22 | CH$_3$ | diaminoethylene | NH(CH$_2$CH$_2$COOH) |
| 23 | CH$_3$ | diaminoethylene | NH(CH$_2$(COOH)CH$_2$COOH) |
| 24 | CH$_3$ | diaminoethylene | NH(CH$_2$(COOH)CH$_2$CH$_2$COOH) |
| 25 | CH$_3$ | diaminoethylene | CH$_3$O |
| 26 | CH$_3$ | diaminoethylene | C$_6$H$_5$O |
| 27 | CH$_3$ | diaminoethylene | NH(CH$_2$CH$_2$SO$_3$H) |
| 28 | CH$_3$ | diaminoethylene | NHC$_6$H$_5$ |
| 29 | CH$_3$ | diaminoethylene | NHPh(p-SO$_3$H) |
| 30 | CH$_3$ | diaminoethylene | NHPh(COOH)$_2$(3,5) |
| 31 | CH$_3$ | diaminoethylene | NHPh(COOH)$_2$(3,5) |
| 32 | CH$_3$ | diaminoethylene | NHPh(o-SO$_3$H) |
| 33 | CH$_3$ | diaminoethylene | NHPh(m-SO$_3$H) |

TABLE 2

| No. | R | X | Y |
|---|---|---|---|
| 34 | CH$_3$ | diaminoethylene | NHPh(SO$_3$H)$_2$(2,5) |
| 35 | CH$_3$ | diaminoethylene | NH(CH$_2$CH$_2$CH$_2$N(C$_2$H$_5$)$_2$) |
| 36 | CH$_3$ | diaminoethylene | NH(CH$_2$CH$_2$CH$_2$N(CH$_3$)$_2$) |
| 37 | CH$_3$ | diaminoethylene | NH-2naphthyl(SO$_3$H)$_3$(3,6,8) |
| 38 | CH$_3$ | diaminoethylene | NH-2naphthyl(SO$_3$H)$_3$(4,6,8) |
| 39 | CH$_3$ | diaminoethylene | NH-2naphthyl(SO$_3$H)$_2$(4,8) |
| 40 | CH$_3$ | diaminoethylene | NH(n-C$_4$H$_9$) |
| 41 | CH$_3$ | diaminoethylene | NH(cyclohexyl) |
| 42 | CH$_3$ | diaminoethylene | NH(CH$_2$CH$_2$OH) |
| 43 | CH$_3$ | diaminoethylene | N(CH$_2$CH$_2$OH)$_2$ |
| 44 | CH$_3$ | diaminoethylene | NHCH$_2$Ph |
| 45 | H | diaminoethylene | NH$_2$ |
| 46 | H | 1,3-diaminoxylylene | NH$_2$ |
| 47 | H | 1,4-piperazinediyl | NH$_2$ |
| 48 | C$_2$H$_5$ | 1,3-diaminoxylylene | NH$_2$ |
| 49 | C$_4$H$_9$ | 1,3-diaminoxylylene | NH$_2$ |
| 50 | iso-C$_3$H$_7$ | 1,3-diaminoxylylene | NH$_2$ |
| 51 | cyclohexyl | 1,3-diaminoxylylene | NH$_2$ |
| 52 | C$_3$H$_6$N(C$_2$H$_5$) | 1,3-diaminoxylylene | NH$_2$ |
| 53 | CH$_3$ | 1,4-dioxyphenylene | NH$_2$ |
| 54 | CH$_3$ | 4,4'-dioxydiphenylether | NH$_2$ |
| 55 | CH$_3$ | 4,4'-dioxydiphenylthioether | NH$_2$ |
| 56 | CH$_3$ | 4,4'-dioxydiphenylsulfone | NH$_2$ |
| 57 | CH$_3$ | 4,4'-dioxydiphenylmethane | NH$_2$ |
| 58 | CH$_3$ | 2,5- and 2,6-norbornanediamino | NH$_2$ |
| 59 | CH$_3$ | 1,4-dioxymethylcyclohexylene | NH$_2$ |
| 60 | CH$_3$ | 2,5-dimethyl-1,4-piperazinediyl | NH$_2$ |

The compounds of formula (M3) where the crosslinking group X has amino groups at both ends thereof may be obtained, for example, as follows: 2 mols of a compound of the following formula (M4) is reacted with from 2 to 2.4 mols of 2,4,6-trichloro-S-triazine (cyanuric chloride) in water at pH of from 3 to 7 and at 5 to 35° C. for 2 to 8 hours, and the resulting primary condensate, compound of the following formula (M5) is further reacted with one mol of a diamino compound of the following formula (M6), at pH of from 4 to 10 and at 5 to 90° C. for 10 minutes to 5 hours to give a secondary condensate of a compound of the following formula (M7) where Y is a chlorine atom and both ends of the crosslinking group X are amino groups.

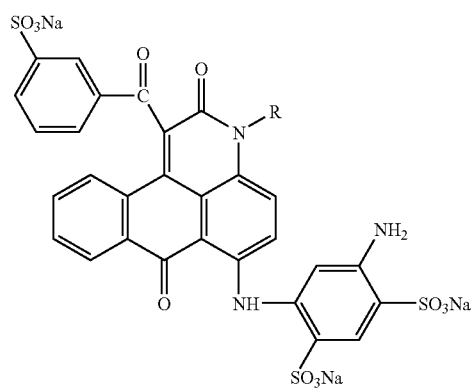

(M4)

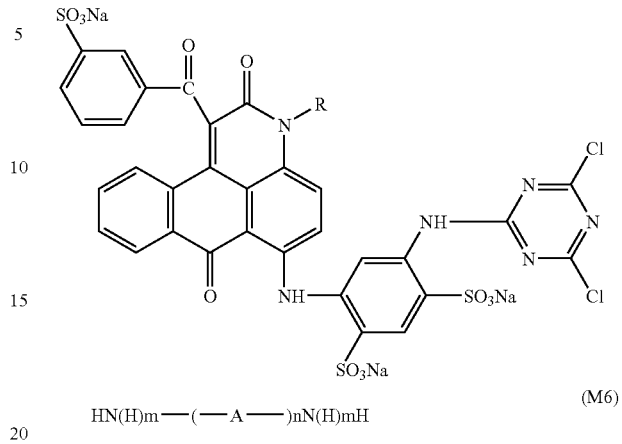

(M5)

$$HN(H)m\text{---}(\text{---}A\text{---})nN(H)mH$$

(M6)

wherein A represents a linking group, and is, for example, a divalent hydrocarbon residue having from 1 to 20 carbon atoms, and this may contain a nitrogen atom, an oxygen atom or a sulfur atom; n is 1 or 2; m is 1 or 0; when n is 1, then m is 1, and when n is 2, then m is 0. Preferably, A is a C1-C6 (poly)methylene, or an optionally-substituted phenylene, xylylene, methylenedicyclohexane-diyl, methylenebis(methylcyclohexane-diyl), or cyclohexane-diyl-dimethylene; more preferably dimethylene, hexamethylene, 1,3-xylylene, methylenedicyclohexane-4,1-diyl, methylenebis(2-methylcyclohexane)-4,1-diyl, or cyclohexane-1,3-diyl-dimethylene.

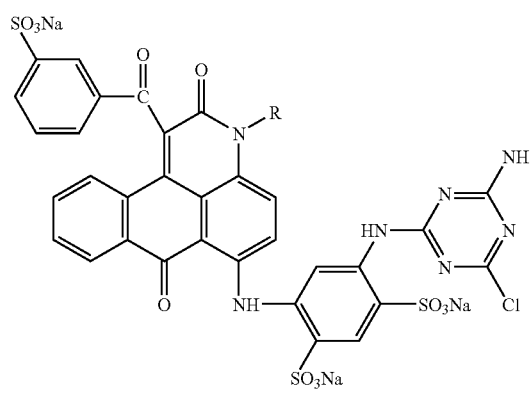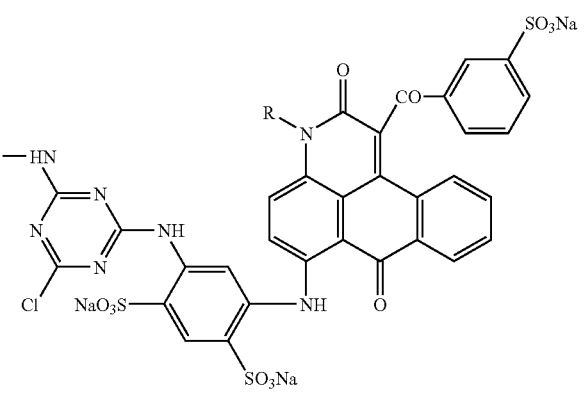

(M7)

However, when the compound (M6) used in the process is a compound of NH(-A-)$_2$NH (in formula (6), n=2, m=0) such as piperidine, then a compound of formula (M7) where —NH-A-NH— is replaced by —N(-A-)$_2$N— is obtained. Next, the compound (M7) is hydrolyzed at pH of from 9 to 12 and at 70 to 90° C. for 1 to 5 hours, or is reacted with ammonia or a corresponding amine, or with a phenol, naphthol or alcohol such as methanol, at pH of from 8 to 10 and at 90 to 100° C. for 3 to 8 hours, then a tertiary condensate, compound of the following formula (M8) where Y is not a chlorine atom.

When a glycol compound of a formula HO-A-OH (where A has the same meaning as above) is used in place of the diamino compound of formula (M6) and this is subjected to condensation in an ordinary manner, then a compound of formula (M7) in which the crosslinking group —NH-A-NH— is replaced by —O-A-O— is obtained. This may be processed in the same manner as in the above-mentioned process, and a compound of formula (M8) where the crosslinking group —NH-A-NH— is replaced by —O-A-O— is obtained.

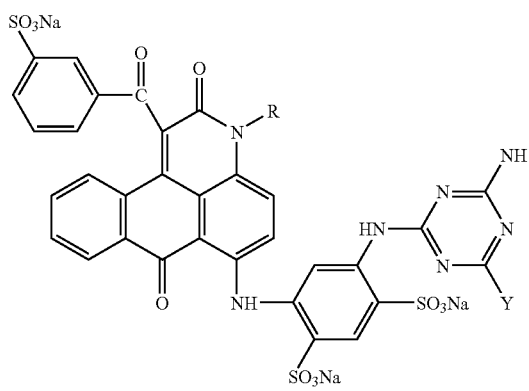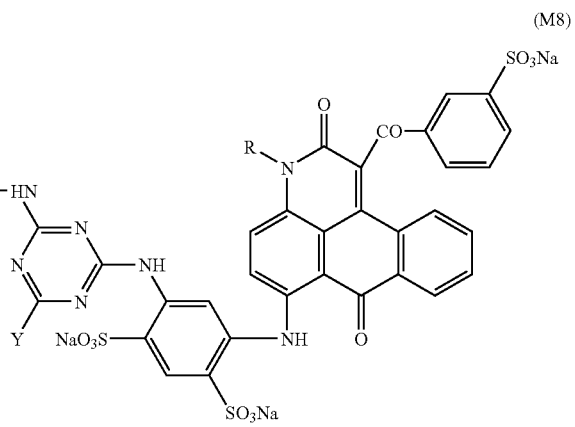

(M8)

When a compound of HN(-A)$_2$NH of formula (M6) is used in the process, then the compound of formula (M8) obtained has —N(-A-)$_2$N— in place of —NH-A-NH—. The order of the condensation reaction in the process may be suitably determined depending on the reactivity of the compounds to be reacted, and is not limited to the above-mentioned one.

Many compounds of formula (M8) are in Table 1 and Table 2 mentioned above. Preferred examples of the compounds of formula (M8) are shown below, including those in Tables 1 and 2.

The compounds thus obtained in the manner as above may be in any form of free acids or their salts. Accordingly, the compounds may be used as free acids or their salts such as alkali metal salts, alkaline earth metal salts, alkylamine salts, alkanolamine salts or ammonium salts. Preferably, they are in the form of alkali metal salts such as sodium salts, potassium salts, lithium salts; alkanolamine salts such as monoethanolamine salts, diethanolamine salts, triethanolamine salts, monoisopropanolamine salts, diisopropanolamine salts, triisopropanolamine salts; and ammonium salts.

TABLE 3

| No. | R | X | Y |
|---|---|---|---|
| 1 | CH$_3$ | methylenedicyclohexane-4,1-diyl | NH$_2$ |
| 2 | CH$_3$ | methylenedicyclohexane-4,1-diyl | ethylamino |
| 3 | CH$_3$ | methylenedicyclohexane-4,1-diyl | propylamino |
| 4 | CH$_3$ | methylenedicyclohexane-4,1-diyl | propylamino |
| 5 | CH$_3$ | methylenedicyclohexane-4,1-diyl | butylamino |
| 6 | CH$_3$ | methylenedicyclohexane-4,1-diyl | 2-ethylhexylamino |
| 7 | CH$_3$ | methylenedicyclohexane-4,1-diyl | benzyl |
| 8 | CH$_3$ | methylenebis(2-methylcyclohexane-4,1-diyl) | NH$_2$ |
| 9 | CH$_3$ | cyclohexane-1,3-diyl-dimethylene | NH$_2$ |
| 10 | CH$_3$ | cyclohexane-1,3-diyl-dimethylene | ethylamino |
| 11 | CH$_3$ | cyclohexane-1,3-diyl-dimethylene | butylamino |
| 12 | CH$_3$ | cyclohexane-1,3-diyl-dimethylene | dibutylamino |
| 13 | CH$_3$ | cyclohexane-1,3-diyl-dimethylene | 2-ethylhexylamino |
| 14 | CH$_3$ | methylenedicyclohexane-4,1-diyl | benzyl |
| 15 | CH$_3$ | methylenedicyclohexane-4,1-diyl | cyclohexylamino |
| 16 | CH$_3$ | methylenedicyclohexane-4,1-diyl | cyclopentylamino |
| 17 | CH$_3$ | methylenedicyclohexane-4,1-diyl | diethylaminopropylamino |
| 18 | CH$_3$ | methylenedicyclohexane-4,1-diyl | dibutylaminopropylamino |

(Ink Set)

The ink set of the invention may contain any other dyes along with the above-mentioned dyes for full-color image formation or for color tone control. Examples of the additional dyes that may be used in the invention are mentioned below.

Yellow dyes are, for example, aryl or heterylazo dyes having, as the coupling component thereof, phenols, naphthols, anilines, pyrazolones, pyridones or open-chain active methylene compounds; azomethine dyes having, as the coupling component thereof, open-chain active methylene compounds; methine dyes such as benzylidene dyes, monomethine-oxonole dyes; quinone dyes such as naphthoquinone dyes, anthraquinone dyes. Other dye species than these are quinophthalone dyes, nitro-nitroso dyes, acridine dyes, and acridinone dyes. These dyes may present yellow only after a part of the chromophore thereof has been dissociated. In such a case, the counter cation may be an inorganic cation such as alkali metal or ammonium ion, or an organic cation such as pyridinium or quaternary ammonium cation, or may also be a polymer cation having any of these as a partial structure thereof.

Magenta dyes are, for example, aryl or heterylazo dyes having, as the coupling component thereof, phenols, naphthols or anilines; azomethine dyes having, as the coupling component thereof, pyrazolones or pyrazolotriazoles; methine dyes such as arylidene dyes, styryl dyes, merocyanine dyes, oxonole dyes; carbonium dyes such as diphenylmethane dyes, triphenylmethane dyes, xanthene dyes; quinone dyes such as naphthoquinone dyes, anthraquinone dyes, anthrapyridone dyes; and condensed polycyclic dyes such as dioxazine dyes. These dyes may present magenta only after a part of the chromophore thereof has been dissociated. In such a case, the counter cation may be an inorganic cation such as alkali metal or ammonium ion, or an organic cation such as pyridinium or quaternary ammonium cation, or may also be a polymer cation having any of these as a partial structure thereof.

Cyan dyes are, for example, azomethine dyes such as indaniline dyes, indophenol dyes; polymethine dyes such as cyanine dyes, oxonole dyes, merocyanine dyes; carbonium dyes such as diphenylmethane dyes, triphenylmethane dyes, xanthene dyes; phthalocyanine dyes; anthraquinone dyes; aryl or heterylazo dyes having, as the coupling component thereof, phenols, naphthols or anilines; and indigo and thioindigo dyes. These dyes may present cyan only after a part of the chromophore thereof has been dissociated. In such a case, the counter cation may be an inorganic cation such as alkali metal or ammonium ion, or an organic cation such as pyridinium or quaternary ammonium cation, or may also be a polymer cation having any of these as a partial structure thereof.

Further, black dyes such as polyazo dyes may also be used.

In addition, water-soluble dyes such as direct dyes, acid dyes, edible dyes, basic dyes and reactive dyes may also be used herein. Above all, especially preferred are the following:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, 247;

C.I. Direct Violet 7, 9, 47, 48, 51, 66, 90, 93, 94, 95, 98, 100, 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397;

C.I. Acid Violet 5, 34, 43, 47, 48, 90, 103, 126;

C.I. Acid Yellow 17, 19, 23, 25, 39, 40, 42, 44, 49, 50, 61, 64, 76, 79, 110, 127, 135, 143; 151, 159, 169, 174, 190, 195, 196, 197, 199, 218, 219, 222, 227;

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326;

C.I. Acid Black 7, 24, 29, 48, 52:1, 172;

C.I. Reactive Red 3, 13, 17, 19, 21, 22, 23, 24, 29, 35, 37, 40, 41, 43, 45, 49, 55;

C.I. Reactive Violet 1, 3, 4, 5, 6, 7, 8, 9, 16, 17, 22, 23, 24, 26, 27, 33, 34;

C.I. Reactive Yellow 2, 3, 13, 14, 15, 17, 18, 23, 24, 25, 26, 27, 29, 35, 37, 41, 42;

C.I. Reactive Blue 2, 3, 5, 8, 10, 13, 14, 15, 17, 18, 19, 21, 25, 26, 27, 28, 29, 38;

C.I. Reactive Black 4, 5, 8, 14, 21, 23, 26, 31, 32, 34;

C.I. Basic Red 12, 13, 14, 15, 18, 22, 23, 24, 25, 27, 29, 35, 36, 38, 39, 45, 46;

C.I. Basic Violet 1, 2, 3, 7, 10, 15, 16, 20, 21, 25, 27, 28, 35, 37, 39, 40, 48;

C.I. Basic Yellow 1, 2, 4, 11, 13, 14, 15, 19, 21, 23, 24, 25, 28, 29, 32, 36, 39, 40;

C.I. Basic Blue 1, 3, 5, 7, 9, 22, 26, 41, 45, 46, 47, 54, 57, 60, 62, 65, 66, 69, 71;

C.I. Basic Black 8.

Pigments and dyes may be combined in the ink of the invention.

The pigments usable in the ink of the invention are commercially-available ones and any other known ones described in various references. The references are, for example, *Color Index* (by the Society of Dyers and colorists); *Revised New Version, Pigment Handbook* (by Nippon Pigment Technology Association, 1989); *Latest Pigment Application Technology* (by CMC Publishing, 1986); *Printing Ink Technology* (by CMC Publishing, 1984); W. Herbst & K. Hunger, *Industrial Organic Pigments* (by VCH Verlagsgesellshaft, 1993). Concretely, organic pigments are azo pigments (azo-lake pigments, insoluble azo pigments, condensed azo pigments, chelate-azo pigments), polycyclic pigments (phthalocyanine pigments, anthraquinone pigments, perylene and perinone pigments, indigo pigments, quinacridone pigments, dioxazine pigments, isoindolinone pigments, quinophthalone pigments, diketopyrrolopyrrole pigments), dyeing lake pigments (lake pigments of acid or basic dyes), and azine pigments; and inorganic pigments are yellow pigments such as C.I. Pigment Yellow 34, 37, 42, 53; red pigments such as C.I. Pigment Red 101, 108; blue pigments such as C.I. Pigment Blue 27, 29, 17:1; black pigments such as C.I. Pigment Black 7, magnetite; and white pigments such as C.I. Pigment White 4, 6, 18, 21.

Pigments preferred for color image formation are blue or cyan pigments such as phthalocyanine pigments, anthraquinone-based indanthrone pigments (e.g., C.I. Pigment Blue 60), and dyeing lake pigments such as triarylcarbonium pigments. Especially preferred are phthalocyanine pigments, and their preferred examples are copper phthalocyanines such as C.I. Pigment Blue 15:1, 15:2, 15:3, 15:4, 15:6; monochloro or low-chloro-copper phthalocyanines, aluminium phthalocyanines such as those in EP 860475; non-metal phthalocyanine, C.I. Pigment Blue 16; and phthalocyanines with a center metal atom of Zn, Ni or Ti. Most preferred are C.I. Pigment Blue 15:3, 15:4, and aluminium phthalocyanines.

Red to violet pigments are azo dyes (preferably C.I. Pigment Red 3, 5, 11, 22, 38, 48:1, 48:2, 48:3, 48:4, 49:1, 52:1, 53:1, 57:1, 63:2, 144, 146, 184; more preferably C.I. Pigment Red 57:1, 146, 184); quinacridone pigments (preferably C.I. Pigment Red 122, 192, 202, 207, 209, C.I. Pigment Violet 19, 42; more preferably C.I. Pigment Red 122); dyeing lake pigments such as triarylcarbonium pigments (preferably xanthene-type C.I. Pigment Red 81:1, C.I. Pigment Violet 1, 2, 3, 27, 39); dioxazine pigments (e.g., C.I. Pigment Violet 23, 37); diketopyrrolopyrrole pigments (e.g., C.I. Pigment Red 254); perylene pigments (e.g., C.I. Pigment Violet 29); anthraquinone pigments (e.g., C.I. Pigment Violet 5:1, 31, 33); thioindigo pigments (e.g., C.I. Pigment Red 38, 88).

Yellow pigments are azo pigments (preferably monoazo pigments such as C.I. Pigment Yellow 1, 3, 74, 98; disazo pigments such as C.I. Pigment Yellow 12, 13, 14, 16, 17, 83; general azo pigments such as C.I. Pigment Yellow 93, 94, 95, 128, 155; benzimidazolone pigments such as C.I. Pigment Yellow 120, 151, 154, 156, 180; more preferably those not using benzidine compounds for their starting material); isoindoline or isoindolinone pigments (preferably C.I. Pigment Yellow 109, 110, 137, 139); quinophthalone pigments (preferably C.I. Pigment Yellow 138); flavanthrone pigments (e.g., C.I. Pigment Yellow 24).

Black pigments are inorganic pigments (preferably carbon black, magnetite) and aniline black. In addition to these, orange pigments (e.g., C.I. Pigment Orange 13, 16) and green pigments (e.g., C.I. Pigment Green 7) are also usable herein.

The pigments usable in the ink of the invention may be the above-mentioned nude pigments or may be surface-treated ones. For their surface treatment, the pigments may be coated with resin or wax, or surfactant may be applied to the pigments, or a reactive substance (e.g., radical from silane coupling agent, epoxy compound, polyisocyanate, diazonium salt) may be bound to the pigment surface. These are described, for example, in the following references and patent publications.

<1> Properties and Applications of Metal Soap (by Miyuki Publishing),

<2> Printing Ink (by CMC Publishing, 1984),

<3> Latest Pigment Application Technology (by CMC Publishing, 1986),

<4> U.S. Pat. Nos. 5,554,739, 5,571,311,

<5> JP-A 9-151342, 10-140065, 10-292143, 11-166145.

In particular, self-dispersible pigments prepared by reacting a diazonium salt with carbon black as in the US patents of above <4>, and capsulated pigments prepared according to the methods in the Japanese patent publications of above <5> are effective, since they are stably dispersed in ink not requiring any superfluous dispersant.

In the invention, the pigments may be dispersed by the use of a dispersant. Depending on the pigments to be used, various known dispersants may be used. For example, surfactant-type low-molecular dispersants or polymer-type dispersants may be used. Examples of the dispersants usable herein are described in, for example, JP-A3-69949, and EP549486. When the dispersant is used, a pigment derivative that is referred to as a synergist may be added thereto for promoting the dispersant adsorption by pigment.

The particle size of the pigment usable in the ink of the invention is preferably from 0.01 to 10 µm, more preferably from 0.05 to 1 µm, in terms of the size of the dispersed particles.

For pigment dispersion, employable is any known technology generally used in ink production or toner production. The dispersing machine may be any of horizontal or vertical agitator mills, attritors, colloid mills, ball mills, three-roll mills, pearl mills, super mills, impellers, dispersers, KD mills, dynatrons, pressure kneaders. They are described in detail in *Latest Pigment Application Technology* (by CMC Publishing, 1986).

The ink for inkjet recording of the invention may contain a surfactant, and the surfactant is described below.

The surfactant in the ink of the invention is effective for controlling the liquid properties of the ink, for improving the jet-out stability of the ink, for improving the waterproofness of the images formed of the ink, and for preventing ink bleeding on prints.

The surfactant includes anionic surfactants such as sodium dodecylsulfate, sodium dodecyloxysulfonate, sodium alkylbenzenesulfonate; cationic surfactants such as cetylpyridinium chloride, trimethylcetylammonium chloride, tetrabutylammonium chloride; and nonionic surfactants such as polyoxyethylene nonylphenyl ether, polyoxyethylene naphthyl ether, polyoxyethylene octylphenyl ether. Especially preferred are nonionic surfactants.

The surfactant content of the ink may be from 0.001 to 20% by weight, preferably from 0.005 to 10% by weight, more preferably from 0.01 to 5% by weight.

The ink for inkjet recording of the invention may be produced by dissolving or dispersing the above-mentioned dyes preferably along with a surfactant, in an aqueous medium. The "aqueous medium" as referred to herein is meant to indicate water or a mixture of water and a small amount of a water-miscible organic solvent, optionally containing additives such as moisturizer, stabilizer and preservative.

In case where the dye is soluble in water, then it is preferably first dissolved in water in preparing the ink of the invention. Next, various solvent and additive are added to it, dissolved and mixed to give a uniform ink composition.

For dissolving the components, for example, various methods of stirring, ultrasonic irradiation or shaking may be employed. Especially preferred is a method of stirring the components. When the components are stirred, various methods known in the art are employable. For example, they may be stirred in a mode of fluidization, reversed agitation, shear force stirring with dissolver, etc. Also preferably employed herein is a magnetic stirring method in which a magnetic stirrer is used for utilizing the shear force to the container bottom.

Examples of the water-miscible organic solvent that may be used in the invention are alcohols (e.g., methanol, ethanol, propanol, isopropanol, butanol, isobutanol, sec-butanol, t-butanol, pentanol, hexanol, cyclohexanol, benzyl alcohol), polyalcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethylenimine, tetramethylpropylenediamine), and other polar solvents (e.g., formamide, N,N-dimethylformamide, N,N-dimethylacetamide, dimethylsulfoxide, sulforane, 2-pyrrolidone, N-methyl-2-pyrrolidone, N-vinyl-2-pyrrolidone, 2-oxazolidone, 1,3-dimethyl-2-imidazolidinone, acetonitrile, acetone). Two or more of these water-miscible organic solvents may be used as combined.

In case where the above-mentioned dyes are oil-soluble dyes, then they may be dissolved in a high-boiling-point organic solvent, and then emulsified and dispersed in an aqueous medium to prepare the ink of the invention.

The boiling point of the high-boiling-point organic solvent for use in the invention is 150° C. or higher, but preferably 170° C. or higher.

For example, the solvent includes phthalate (e.g., dibutyl phthalate, dioctyl phthalate, dicyclohexyl phthalate, di-2-ethylhexyl phthalate, decyl phthalate, bis(2,4-di-tert-amylphenyl)isophthalate, bis(1,1-diethylpropyl)phthalate), phosphoric acid or phosphoneesters (e.g., diphenylphosphate, triphenylphosphate, tricresyl phosphate, 2-ethylhexyldiphenyl phosphate, dioctylbutyl phosphate, tricyclohexyl phosphate, tri-2-ethylhexyl phosphate, tridecyl phosphate, di-2-ethylhexylphenyl phosphate), benzoates (e.g., 2-ethylhexyLbenzoate, 2,4-dichlorobenzoate, dodecylbenzoate, 2-ethylhexyl p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chloroparaffins (e.g., paraffins having a chlorine content of from 10% to 80%), trimesates (e.g., tributyl trimesate), dodecylbenzene, diisopropylnaphthalane, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxybutyric acid, 2-ethoxyoctane-decanoic acid), alkyl phosphates (e.g., di-2 (ethylhexyl)phosphate, diphenyl phosphate). The amount of the high-boiling-point organic solvent to be used may be from 0.01 to 3 times, preferably from 0.01 to 1.0 time the oil-soluble dye in terms of the ratio by weight of the two.

The high-boiling-point organic solvents may be used either singly or as combined (for example, tricresyl phosphate and dibutyl phthalate; trioctyl phosphate and di(2-ethylhexyl)sebacate; dibutyl phthalate and poly(N-t-butylacrylamide)).

Other examples than those mentioned hereinabove for the high-boiling-point organic solvent usable in the invention and/or methods for producing these high-boiling-point organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,837, 4,430,421, 4,430,422, 4,464,464, 4,483,918, 4,540,657, 4,684,606, 4,728,599, 4,745,049, 4,935,321, 5,013,639; EP276,319A, 286,253A, 289,820A, 309,158A, 309,159A, 309,160A, 509,311A, 510, 576A; East German Patents 147,009, 157,147, 159,573, 225, 240A; British Patent 2,091,124A; JP-A 48-47335, 50-26530, 51-25133, 51-26036, 51-27921, 51-27922, 51-149028, 52-46816, 53-1520, 53-1521, 53-15127, 53-146622, 54-91325, 54-106228, 54-118246; 55-59464, 56-64333, 56-81836, 59-204041, 61-84641, 62-118345, 62-247364, 63-167357, 63-214744, 63-301941, 64-9452, 64-6454, 64-68745, 1-101543, 1-102454, 2-792, 2-4239, 2-43541, 4-29237, 4-30165, 4-232946, 4-346338.

The amount of the high-boiling-point organic solvent to be used may be from 0.01 to 3 times, preferably from 0.01 to 1.0 time the oil-soluble dye in terms of the ratio by weight of the two.

In the invention, the oil-soluble dye and the high-boiling-point organic solvent are emulsified and dispersed in an aqueous medium. For their better emulsification, a low-boiling-point organic solvent may be used. The low-boiling-point organic solvent has a boiling point at normal pressure of from about 30° C. to 150° C. Its preferred examples are esters (e.g., ethyl acetate, butyl acetate, ethyl propionate, β-ethoxyethyl acetate, methyl cellosolve acetate), alcohols (e.g., isopropyl alcohol, n-butyl alcohol, sec-butyl alcohol), ketones (e.g., methyl isobutyl ketone, methyl ethyl ketone, cyclohexanone), amides (e.g., dimethylformamide, N-methylpyrrolidone), ethers (e.g., tetrahydrofuran, dioxane), which, however, are not limitative.

The emulsifying dispersion is as follows: A dye is dissolved in a high-boiling-point organic solvent alone, or its mixture with a low-boiling-point organic solvent to prepare an oil phase, and this is dispersed in an aqueous phase essentially comprising water to thereby form fine oily droplets of the oily phase. In this process, additives such as surfactant, moisturizer, dye stabilizer, emulsion stabilizer, preservative and antifungal may be added to any one or both of the aqueous phase and the oily phase, if desired.

For the emulsification, in general, the oily phase is added to the aqueous phase. Contrary to this, however, the aqueous phase may be dropwise added to the oily phase in a mode of phase-conversion emulsification. This is also preferable in the invention. When the dye for use in the invention is a water-soluble one and the additives are oil-soluble ones, then the emulsification method may also be employed.

Various surfactants may be used in the emulsification. For example, preferred are anionic surfactants such as fatty acid salts, alkyl sulfate salts, alkylbenzenesulfonate salts, alkylnaphthalene sulfonate salts, dialkylsulfosuccinate salts, alkylphosphate salts, naphthalenesulfonate-formalin condensates, polyoxyethylene alkylsulfate salts; and nonionic surfactants such as polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters, oxyethylene-oxypropylene block copolymers. Also preferred are acetylene-based polyoxyethylene oxide surfactants, Surfynols (by Air Products & Chemicals). Also preferred are amine oxide-type ampholytic surfactants such as N,N-dimethyl-N-alkylamine oxides. In addition, the surfactants described in JP-A 59-157636, pp. 37-38; and Research Disclosure No. 308119 (1989) are also usable herein.

For stabilizing the emulsion immediately after its preparation, a water-soluble polymer may be added thereto along with the above-mentioned surfactant. Preferred examples of the water-soluble polymer are polyvinyl alcohol, polyvinylpyrrolidone, polyethylene oxide, polyacrylic acid, polyacrylamide and their copolymers. Also preferably used are natural water-soluble polymers such as polysaccharides, casein, gelatin. For stabilizing the dye dispersion, further usable are polymers not substantially dissolving in aqueous media, for example, polyvinyl compounds, polyurethanes, polyesters, polyamides, polyureas, polycarbonates and others that are obtained through polymerization of acrylates, methacrylates, vinyl esters, acrylamides, methacrylamides, olefins, styrenes, vinyl ethers, acrylonitriles, etc. Preferably, these polymers have —$SO_3^-$ or —$COO^-$. When such polymers not substantially dissolving in aqueous media are used herein, their amount is preferably at most 20% by weight, more preferably at most 10% by weight of the high-boiling-point organic solvent.

When the oil-soluble dye and the high-boiling-point organic solvent are emulsified and dispersed to prepare aqueous ink, it is a matter of great importance to control the particle size of the dye dispersion. In order to increase the color purity and the density of the image formed in a mode of inkjet, it is indispensable to reduce the mean particle size of the dye particles in the inkjet ink. Preferably, the volume-average particle size of the dye particles is at most 1 µm, more preferably from 5 to 100 nm.

The volume-average particle size and the particle size distribution of the dispersed dye particles may be readily determined in any known method. For it, for example, employable is a static light scattering method, a dynamic light scattering method, a centrifugal precipitation method, as well as the methods described in *Lecture of Experimental Chemistry*, 4th Ed., pp. 417-418. Concretely, an ink sample is diluted with distilled water to have a dye particle concentration of from 0.1 to 1% by weight, and then analyzed with a commercially-available, volume-average particle sizer (e.g., Microtrack UPA, by Nikkiso) to determine the particle size of the dye particles. A dynamic light scattering method based on a laser Doppler effect is especially preferred for the measurement, in which even small particles can be measured.

The volume-average particle size is a mean particle size that is weighted by the volume of the particles. This is obtained by dividing the sum total of the products that are obtained by multiplying the diameter of each aggregated particle by the volume thereof, by the overall volume of all the particles. The volume-average particle size is described, for example, in S. Muroi, *Chemistry of Polymer Latex* (by Polymer Publishing), page 119.

It has become obvious that coarse particles have a significant influence on the printability of ink. Concretely, coarse particles clog heads, or even though not clogging, they soil heads and, as a result, ink could not be jetted out at all or is jetted unevenly. To that effect, coarse particles have a significant influence on the printability of ink. To evade the trouble, it is important that 1 µl of ink contains at most 10 particles having a particle size of 5 µm or more and at most 1000 particles having a particle size of 1 µm or more.

To remove such coarse particles, for example, employable is any known centrifugation or precision filtration. The treatment for removing the coarse particles may be effected just after an emulsified dispersion for ink has been prepared, or after various additives such as moisturizer, surfactant and others have been added to the emulsified dispersion and just before the resulting ink is charged into an ink cartridge.

For effectively reducing the mean particle size and for removing coarse particles, employable is a mechanical emulsifier.

The emulsifier may be any known one, including, for example, simple stirrers, impeller-assisted stirrers, in-line stirrers, mills such as colloid mills, ultrasonic stirrers. Above all, high-pressure homogenizers are especially preferred.

The mechanism of high-pressure homogenizers is described in detail, for example, in U.S. Pat. No. 4,533,254 and JP-A6-47264. Gaulin Homogenizer (by A.P.V. Gaulin), Microfluidizer (by Microfluidex) and Ultimizer (by Sugino Machine) are commercially available.

Recently, high-pressure homogenizers as in U.S. Pat. No. 5,720,551 have been developed, which are equipped with a mechanism of finely pulverizing particles in an ultra-high pressure jet flow, and these are preferred for the treatment of emulsification and dispersion in the invention. One example of the emulsifier with such an ultra-high pressure jet flow mechanism is DeBEE2000 (by Bee International).

The pressure in emulsification in such a high-pressure emulsifying disperser is at least 50 MPa, preferably at least 60 MPa, more preferably at least 180 MPa.

Using at least two different types of emulsifiers is especially preferred in the invention. For example, the constituent components are first emulsified in a stirring emulsifier and then further emulsified in a high-pressure homogenizer. Also preferred is a method that comprises once emulsifying and dispersing the constituent components in the emulsifier as above, then adding additives such as moisturizer, surfactant and others to the resulting emulsion, and further emulsifying it in a high-pressure homogenizer before the resulting ink is charged into a cartridge.

In case where a low-boiling-point organic solvent is used along with the high-boiling-point organic solvent as above, it is desirable to remove the low-boiling-point solvent from the emulsion for ensuring the stability, the safety and the sanitation of the emulsion. For removing the low-boiling-point solvent, various methods may be employed depending on the type of the solvent to be removed. For example, employable is evaporation, vacuum evaporation or ultrafiltration. It is desirable that the low-boiling-point organic solvent is removed as soon as possible immediately after the preparation of the emulsion.

Methods of preparing inkjet ink are described in detail, for example, in JP-A 5-148436, 5-295312, 7-97541, 7-82515, 7-118584, and the description may apply to the preparation of the ink for inkjet recording of the invention.

In preparing the ink for inkjet recording of the invention, ultrasonic waves may be given to the system where dyes and additives are dissolved in a medium.

The ultrasonic vibration in the ink preparation is for removing bubbles from the ink. This is because, when ink receives pressure from a recording head, then it may produce bubbles. To prevent this, ultrasonic energy which is equal to or higher than the energy that the ink may receive from a recording head is previously applied to the ink so as to remove the bubbles.

The ultrasonic vibration is generally at a frequency of at least 20 kHz, preferably at least 40 kHz, more preferably at least 50 kHz. The energy to be applied to the ink by the ultrasonic vibration is generally at least $2 \times 10^7$ J/m$^3$, preferably at least $5 \times 10^7$ J/m$^3$, more preferably at least $1 \times 10^8$ µm$^3$. The time for the ultrasonic vibration is generally from 10 minutes to 1 hour or so.

The ultrasonic vibration may be effectively attained at anytime after the dye has been put into a medium. After the finished ink has been once stored, it may be exposed to ultrasonic waves, and this is also effective. However, it is more desirable that ultrasonic waves are applied to the dye while the dye is dissolved and/or dispersed in a medium, since their effect to remove bubbles is larger and since they promote the dissolution and/or dispersion of the dye in the medium.

Accordingly, the ultrasonic treatment may be effected in any stage while or after the dye is dissolved and/or dispersed in a medium. In other words, the ultrasonic treatment may be effected at least once at anytime after the ink has been prepared and before it is finished to be a commercial product.

In one preferred embodiment of the invention, the process of dissolving and/or dispersing the dye in a medium comprises a step of dissolving it in a part of a medium and a step of mixing the remaining medium with the resulting dye solution. Preferably, ultrasonic waves are applied to the system in at least any one of these steps. More preferably, ultrasonic waves are applied to the system in the former step of dissolving the dye in a part of a medium.

The latter step of mixing the remaining medium with the resulting dye solution may be effected in one stage or in plural stages.

In preparing the ink of the invention, it is desirable that the system is degassed under heat or under reduced pressure. This is preferable for more effectively removing bubbles from the ink. The step of degassing the system under heat or under reduced pressure is preferably effected simultaneously with or after the step of mixing the remaining medium with the previously-prepared dye solution.

Ultrasonic waves to be applied to the system of ink preparation may be generated by the use of any known ultrasonicator.

In preparing the ink for inkjet recording of the invention, it is also important to filter the prepared ink composition so as to remove impurities from it. In this treatment, a filter is used. The filter has an effective pore size of at most 1 µm, preferably from 0.05 µm to 0.3 µm, more preferably from 0.25 µm to 0.3 µm. Various materials may be used for forming the filter. Especially for the ink of water-soluble dye, the filter is preferably one that is specifically designed for aqueous solvents. More preferably, the filer is formed of a polymer material that may well trap impurities. For the filtration, the ink composition may be passed through the filter in a mode of ordinary liquid feeding. Apart from it, any other mode of pressure filtration or reduced pressure filtration may also be employed herein.

After the filtration, the ink may often take air therein. Bubbles from the air may often cause disturbed images in inkjet recording. Therefore, it is desirable that the ink is further processed for additional degassing as in the above. For degassing it, for example, the ink may be kept static for awhile after filtered, or it may be degassed ultrasonically or under reduced pressure by the use of commercially-available devices. Preferably, the ultrasonic degassing is effected for 30 seconds to 2 hours, more preferably for 5 minutes to 1 hour or so.

These treatments are preferably effected in a space of clean room or clean bench in order to prevent the ink from being contaminated with impurities during the treatments. In the invention, it is desirable that the treatments are effected in a space having a degree of cleanness of at most class 1000. The "degree of cleanness" indicates the value measured with a dust counter.

The ink for inkjet recording of the invention may contain a drying inhibitor for preventing the ink from drying at the inkjet nozzle orifice and for preventing the nozzle from being clogged, a penetration promoter for promoting the penetration of the ink into paper, and other various additives such as UV absorbent, antioxidant, viscosity improver, surface tension improver, dispersant, dispersion stabilizer, antifungal, rust-proofing agent, pH-controlling agent, defoaming agent, chelating agent. The ink of the invention may contain any of these suitably selected for it.

For the drying inhibitor, preferred is a water-soluble organic solvent having a lower vapor pressure than water. Its concrete examples are polyalcohols such as typically ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylolpropane; polyalcohol lower alkyl ethers such as ethylene glycol monomethyl (or ethyl)ether, diethylene glycol monomethyl (or ethyl)ether, triethylene glycol monoethyl (or butyl)ether; heterocyclic compounds such as 2-pyrrolidone, N-methyl-2-pyrrolidone, 1,3-dimethyl-2-imidazolidinone, N-ethylmorpholine; sulfur-containing compounds such as sulforane, dimethyl sulfoxide, 3-sulforene; polyfunctional compounds such as diacetone alcohol, diethanolamine; and urea derivatives. Of those, more preferred are polyalcohols such as glycerin and diethylene glycol. One or more of these drying inhibitors may be used either singly or as combined. Preferably, the drying inhibitor content of the ink is from 10 to 50% by weight.

For the penetration promoter, for example, herein usable are alcohols such as ethanol, isopropanol, butanol, di(tri) ethylene glycol monobutyl ether, 1,2-hexanediol; and nonionic surfactants such as sodium laurylsulfate, sodium oleate. In general, the penetration promoter is enough when its amount in the ink is from 10 to 30% by weight. However, its amount is preferably so controlled that the ink does not cause bleeding and print-through.

The UV absorbent is for improving the image stability. For the UV absorbent, herein usable are benzotriazole compounds as in JP-A 58-185677, 61-190537, 2-782, 5-197075, 9-34057; benzophenone compounds as in JP-A 46-2784, 5-194483, and U.S. Pat. No. 3,214,463; cinnamate compounds as in JP-B 48-30492, 56-21141, and JP-A 10-88106; triazine compounds as in JP-A 4-298503, 8-53427, 8-239368, 10-182621, and JP-T 8-501291 (the term "JP-T" as used herein means a published Japanese translation of a PCT patent application); compounds as in Research Disclosure No. 24239; and other compounds capable of absorbing UV rays to emit fluorescence, or that is, fluorescent brighteners such as typically stilbene compounds and benzoxazole compounds.

The antioxidant is for improving the image stability. For it, herein usable are various organic or metal complex-type fading inhibitors. The organic fading inhibitors include hydroquinones, alkoxyphenols, dialkoxyphenols, phenols, anilines, amines, indanes, chromans, alkoxyanilines, and heterocyclic compounds; and the metal complexes include nickel complexes and zinc complexes. More concretely, herein usable are the compounds described in the patent publications that are referred to in Research Disclosure No. 17643, Items VII-I to J, No. 15162, No. 18716, page 650, left column, No. 36544, page 527, No. 307105, page 872, and No. 15162, as well as the compounds that fall within the range of the general formula to indicate the typical compounds and the examples of the compounds described in pp. 127-137 of JP-A 62-215272.

The antifungal agent includes sodium dehydroacetate, sodium benzoate, sodium pyridinethione-1-oxide, ethyl p-hydroxybenzoate, 1,2-benzisothiazolin-3-one and its salts. Preferably, its amount in the ink is from 0.02 to 5.00% by weight.

Its details are described in, for example, Dictionary of Antibacterials and Antifungals (by the Dictionary Section of the Antibacterial and Antifungal Society of Japan).

The rust-proofing agent includes, for example, acidic sulfites, sodium thiosulfate, ammonium thioglycolate, diisopropylammonium nitrite, pentaerythritol tetranitrate, dicyclohexylammonium nitrite, benzotriazole. Preferably, its amount in the ink is from 0.02 to 5.00% by weight.

The pH-controlling agent is preferably used for pH control and for dispersion stabilization. Preferably, the pH of the ink is controlled to fall between 8 and 11 at 25° C. If the pH is lower than 8, then the dye solubility will lower and nozzles will be readily clogged. However, if the pH is higher than 11, the waterproofness of the ink will be poor. The pH-controlling agent may be a basic compound such as organic bases and inorganic alkalis, or an acidic compound such as organic acids and inorganic acids.

The basic compound includes, for example, sodium hydroxide, potassium hydroxide, sodium carbonate, potassium carbonate, sodium hydrogencarbonate, potassium hydrogencarbonate, sodium acetate, potassium acetate, sodium phosphate, sodium monohydrogen phosphate and other inorganic compounds, as well as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine, collidine and other organic bases.

The acidic compound includes, for example, inorganic compounds such as hydrochloric acid, sulfuric acid, phosphoric acid, boric acid, sodium hydrogensulfate, potassium hydrogensulfate, potassium dihydrogenphosphate, sodium dihydrogenphosphate; and organic compounds such as acetic acid, tartaric acid, benzoic acid, trifluoroacetic acid, methanesulfonic acid, ethanesulfonic acid, benzenesulfonic acid, p-toluenesulfonic acid, saccharinic acid, phthalic acid, picolinic acid, quinolinic acid.

The conductivity of the ink of the invention may fall between 0.01 and 10 S/m, preferably between 0.05 and 5 S/m.

The conductivity may be measured according to an electrode method using a commercially-available saturated potassium chloride.

The conductivity may be controlled essentially by the ion concentration of the aqueous solution. When the salt concentration thereof is high, the solution may be de-salted through ultrafiltration. When a salt or the like is added to control the conductivity of the solution, various organic salts or inorganic salts may be used for the purpose.

The inorganic and organic salts are, for example, inorganic compounds such as potassium halides, sodium halides, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium monohydrogenphosphate, borates, potassium dihydrogenphosphate, sodium dihydrogenphosphate; and organic compounds such as sodium acetate, potassium acetate, sodium tartrate, sodium tartrate, sodium benzoate, potassium benzoate, sodium p-toluenesulfonate, potassium saccharinate, potassium phthalate, sodium picolinate.

The conductivity of the ink may also be controlled by specifically selecting the components of the other additives.

The viscosity of the ink of the invention may be from 1 to 20 mPa·s at 25° C., but is preferably from 2 to 15 mPa·s, more preferably from 2 to 10 mPa·s. If the viscosity is higher than 20 mPa·s, the fixation of the recorded image may be retarded and the ink jet-out potency may lower. If the viscosity is lower than 1 mPa·s, the recorded image may be blurred and its quality is therefore lowered.

The viscosity may be controlled in any desired manner by controlling the amount of the ink solvent. The ink solvent includes, for example, glycerin, diethylene glycol, triethanolamine, 2-pyrrolidone, diethylene glycol monobutyl ether, triethylene glycol monobutyl ether.

If desired, a viscosity improver may be used. The viscosity improver includes, for example, celluloses, water soluble polymers such as polyvinyl alcohol, and nonionic surfactants. Its details are described in, for example, Viscosity Control Technology (by the Technology Information Association, 1999), Chap. 9; *Chemicals for Inkjet Printers* (extra ed., '98)—Investigation of Trends and Views in Development of Materials (by CMC, 1997), pp. 162-174.

Methods of measuring the viscosity of liquid are described in detail in JIS Z8803. In the invention, the viscosity of the ink may be readily measured in a simple manner by the use of commercially-available viscometers. For example, there are known Tokyo Instrument's rotary viscometers, B-type Viscometer and E-type Viscometer. In the invention, Yamaichi Electric's shaking viscometer, VM-100A-L Model was used to measure the viscosity at 25° C. The viscosity unit is Pascal-second (Pa·s), but generally milli-Pascal·second (mPa·s).

Preferably, the surface tension of the ink of the invention is from 20 to 50 mN/m at 25° C., both in terms of the dynamic surface tension and the static surface tension. More preferably, it is from 20 to 40 mN/m. If the surface tension is higher than 50 mN/m, then the jet-out stability of the ink will be poor. If so, in addition, the print formed through multi-color superimposition will be blurred and whiskered and the print quality will be significantly lowered. On the other hand, if the surface tension thereof is lower than 20 mN/m, the ink may adhere to the surfaces of printer tools to worsen the print quality.

For controlling the surface tension of the ink, various cationic, anionic or nonionic surfactants such as those mentioned hereinabove may be added to the ink. Preferably, the amount of the surfactant that may be in the ink is from 0.01 to 20% by weight, more preferably from 0.1 to 10% by weight. If desired, two or more different types of surfactants may be combined for use in the ink.

For measuring the static surface tension of ink, known are a capillary ascending method, a dropping method, and a ring hanging method. In the invention, the static surface tension of the ink is measured according to a vertical plate method.

Briefly, when a thin plate of glass or platinum is hung vertically while a part of it is dipped in a liquid, then the surface tension of the liquid acts in the downward direction along the part at which the liquid is in contact with the plate. The force of surface tension is balanced with a force acting in the upward direction to thereby determine the surface tension of the liquid.

For measuring the dynamic surface tension of ink, known are a vibration jetting method, a meniscus dropping method, and a maximum bubble pressure method, for example, as in *Lecture of New Experimental Chemistry*, Vol. 18, "Interface and Colloid" (by Maruzen), pp. 69-90 (1977). Also known is a liquid membrane breaking method, for example, as in JP-A3-2064. In the invention, the dynamic surface tension of the ink is measured according to a bubble pressure differential method. The principle and the mechanism of the method are described below.

When an uniform solution prepared by stirring it is bubbled, then new vapor-liquid interfaces are formed, and surfactant molecules in the solution gather around the surface of water at a constant rate. In that condition, the bubble rate (bubble-forming rate) is varied. When the bubble rate is slow, then a larger number of surfactant molecules gather around the surfaces of the bubbles formed, and the maximum bubble pressure just before the bubbles crack is low. The maximum bubble pressure (surface tension) to the bubble rate is detected. One preferred embodiment of measuring the dynamic surface tension of the ink is as follows: One large probe and one small probe, totaling two, are used, and bubbles are formed in the ink. In the maximum bubble pressure condition of the two probes, the differential pressure is measured, and the dynamic surface tension of the ink is calculated from it.

Preferably, the nonvolatile content of the ink of the invention is from 10 to 70% by weight of the ink for ensuring the jet-out stability of the ink and ensuring the good print quality thereof in point of the image fastness, the image blurring resistance and the non-stickiness of the printed matter. More preferably, it is from 20 to 60% by weight for more favorably ensuring the jet-out stability of the ink and ensuring the good print quality thereof especially in point of the image blurring resistance of the printed matter.

The nonvolatile content includes liquid and solid components and polymer components having a boiling point not lower than 150° C. under one atmosphere. The nonvolatile components of ink for inkjet recording are dye, high-boiling-point solvent, and other optional polymer latex, surfactant, dye stabilizer, antifungal and buffer. Most of these nonvolatile components except dye stabilizer lower the dispersion stability of ink, and remain on the printed paper to interfere with dye association and stabilization thereon, and, as a result, the image fastness is thereby worsened and the printed image is often blurred under high-humidity condition.

The ink of the invention may contain a polymer compound. The polymer compound is meant to indicate any and every polymer compound having a number-average molecular weight of at least 5000 in the ink. The polymer compound includes water-soluble polymer compounds that are substantially soluble in aqueous media, water-dispersible polymer compounds such as polymer latex and polymer emulsion, as well as alcohol-soluble polymer compounds that are soluble in polyalcohols serving as auxiliary solvent. So far as they substantially uniformly dissolve or disperse in ink, any polymer compounds may be in the ink of the invention.

Examples of the water-soluble polymer compounds are polyvinyl alcohol, silanol-modified polyvinyl alcohol, carboxymethyl cellulose, hydroxyethyl cellulose, polyvinylpyrrolidone, polyalkylene oxides such as polyethylene oxide, polypropylene oxide, polyalkylene oxide derivatives and other water-soluble polymers; as well as natural water-soluble polymers such as polysaccharides, starch, cationated starch, casein, gelatin; aqueous acrylic resins such as polyacrylic acid, polyacrylamide and their copolymers; aqueous alkyd resins, and other water-soluble polymer compounds having $—SO_3^-$ or $—COO^-$ in the molecule and substantially soluble in aqueous media.

The polymer latex includes, for example, styrene-butadiene latex, styrene-acryl latex, polyurethane latex. The polymer emulsion is acrylic emulsion, etc.

These water-soluble polymer compounds may be used either singly or as combined.

The water-soluble polymer compound is used as a viscosity improver, as so mentioned hereinabove, for controlling the ink viscosity to fall within a suitable viscosity region for ensuring good jet-out potency of the ink. However, if the ink contains the compound too much, then the ink viscosity may increase and the jet-out stability of the ink will be poor. If so, in addition, the ink may form precipitates when stored, and may therefore clog nozzles.

The amount of the polymer compound to be added to the ink for viscosity control may be from 0 to 5% by weight of the ink, though depending on the molecular weight of the compound (the amount of the compound having a higher molecular weight may be smaller). Preferably, it is from 0 to 3% by weight, more preferably from 0 to 1% by weight.

Apart from the surfactants mentioned above, other various nonionic, cationic or anionic surfactants may also be sued as surface tension improver. For example, the anionic surfactants are fatty acid salts, alkylsulfate salts, alkylbenzenesulfonate salts, alkylnaphthalenesulfonate salts, dialkylsulfosuccinate salts, alkylphosphate salts, naphthalenesulfonateformalin condensates, polyoxyethylene alkylsulfate salts.

The nonionic surfactants are polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters, oxyethylene-oxy propylene block copolymers. Also preferred are acetylene-based polyoxyethylene oxide surfactants, Surfynols (by Air Products & Chemicals). Also preferred are amine oxide-type ampholytic surfactants such as N,N-dimethyl-N-alkylamine oxides. In addition, the surfactants described in JP-A59-157636, pp. 37-38; and Research Disclosure No. 308119 (1989) are also usable herein.

In the invention, various cationic, anionic and nonionic surfactants such as those mentioned hereinabove may be used as a dispersant and a dispersion stabilizer, and fluorine-containing compounds, silicone compounds and chelating agents such as EDTA may be used as a defoaming agent, if desired.

(Image-Receiving Material)

The image-receiving material for use in the invention include reflection media such as recording paper and recording films that are described hereinafter.

The support for recording paper and recording films may be formed of chemical pulp such as LBKP, NBKP; mechanical pulp such as GP, PGW, RMP, TMP, CTMP, CMP, CGP; or recycled paper pulp such as DIP. If desired, any known additives such as pigment, binder, sizing agent, fixer, cationating agent and paper strength enhancer may be added thereto. Various paper-making machines such as Fourdrinier paper machine and cylinder paper machine may be used for producing the support. Apart from these supports, also usable herein are synthetic paper and plastic film sheets. Preferably, the thickness of the support is from 10 to 250 µm, and the unit weight thereof is from 10 to 250 g/m².

An image-receiving layer and a back coat layer may be directly formed on the support to prepare the image-receiving material for the ink of the invention. If desired, size pressing or anchor coating with starch, polyvinyl alcohol or the like may be applied to the support, and then the support is coated with an image-receiving layer and a back coat layer to be the image-receiving material for use in the invention. Further if desired, the support may be leveled through machine calendering, TG calendering, soft calendering or the like.

For the support for use in the invention, more preferred are paper and plastic films, both surfaces of which are laminated with polyolefin (e.g., polyethylene, polystyrene, polybutene or their copolymer) or polyethylene terephthalate. Also preferably, white pigment (e.g., titanium oxide, zinc oxide) or tinting dye (e.g., cobalt blue, ultramarine, neodymium oxide) is added to polyolefin.

The image-receiving layer formed on the support contains a porous material and an aqueous binder. Preferably, the image-receiving layer contains a pigment. For the pigment, preferred is white pigment. The white pigment includes inorganic white pigment such as calcium carbonate, kaolin, talc, clay, diatomaceous earth, synthetic amorphous silica, aluminium silicate, magnesium silicate, calcium silicate, aluminium hydroxide, alumina, lithopone, zeolite, barium sulfate, calcium sulfate, titanium dioxide, zinc sulfide, lead carbonate; and organic white pigment such as styrenic pigment, acrylic pigment, urea resin, melamine resin. Porous, inorganic white pigment is especially preferred, and synthetic amorphous silica having a large pore area is more preferred. Synthetic amorphous silica may be any of anhydrous silica obtained in a dry process (vapor phase process) or a hydrous silica obtained in a wet process.

Examples of the recording paper that contains the above-mentioned pigment in its image-receiving layer are concretely disclosed in JP-A 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, 2001-301314, and any of these may be used herein.

The aqueous binder to be in the image-receiving layer includes water-soluble polymers such as polyvinyl alcohol, silanol-modified polyvinyl alcohol, starch, cationated starch, casein, gelatin, carboxymethyl cellulose, hydroxyethyl cellulose, polyvinylpyrrolidone, polyalkylene oxide, polyalkylene oxide derivatives; and water-dispersive polymers such as styrene-butadiene latex, acrylic emulsion. One or more of these aqueous binders may be used herein either singly or as combined. Of those, especially preferred are polyvinyl alcohol and silanol-modified polyvinyl alcohol in point of their adhesiveness to pigment and of the peeling resistance of the ink-receiving layer.

In addition to the pigment and the aqueous binder therein, the image-receiving layer may contain any other additives such as mordant, water-proofing agent, lightfastness improver, vapor resistance improver, surfactant and hardener.

Preferably, the mordant to be in the ink-receiving layer is passivated. Concretely, a polymer mordant is preferred.

The polymer mordant is described, for example, in JP-A 48-23825, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236; U.S. Pat. Nos. 2,484,430, 2,548,564, 3,148,061, 3,309,690, 4,115,124, 4,124,386, 4,193,800, 4,273,853, 4,282,305, 4,450,224. The polymer mordant described in JP-A 1-161236, pp. 212-215 is especially preferred for use in the image-receiving material in the invention. It gives images of good quality and good lightfastness.

The water-proofing agent is effective for making images resistant to water. For the water-proofing agent, especially preferred are cationic resins. The cationic resins are, for example, polyamide-polyamine-epichlorohydrin, polyethylene-imine, polyamine-sulfone, dimethyldiallylammonium chloride polymer, cationic polyacrylamide. The cationic resin content of the ink-receiving layer is preferably from 1 to 15% by weight, more preferably from 3 to 10% by weight of the overall solid content of the layer.

The lightfastness improver and the vapor resistance improver include, for example, phenol compounds, hindered phenol compounds, thioether compounds, thiourea compounds, thiocyanate compounds, amine compounds, hindered amine compounds, TEMPO compounds, hydrazine compounds, hydrazide compounds, amidine compounds, vinyl-containing compounds, ester compounds, amide compounds, ether compounds, alcohol compounds, sulfinate compounds, saccharides, water-soluble reducible compounds, organic acids, inorganic acids, hydroxyl-containing organic acids, benzotriazole compounds, benzophenone compounds, triazine compounds, heterocyclic compounds, water-soluble metal salts, organic metal compounds, metal complexes.

Specific examples of these compounds are described in JP-A10-182621, 2001-260519, 2000-260519; JP-B4-34953, 4-34513, 4-34512; JP-A 11-170686, 60-67190, 7-276808, 2000-94829; JP-T 8-512258; JP-A 11-321090.

The surfactant serves as a coating aid, a release improver, a slide improver or an antistatic agent. It is described in, for example, JP-A 62-173463, 62-183457.

In place of surfactant, organic fluorine-containing compounds may be used. Preferably, the organic fluorine-containing compounds for use herein are hydrophobic. Examples of the organic fluorine-containing compounds are fluorine-containing surfactants, oily fluorine-containing compounds (e.g., fluorine oil), and solid fluorine-containing compound resins (e.g., tetrafluoroethylene resin). The organic fluorine-containing compounds are described in JP-B 57-9053 (columns 8-17); JP-A 61-20994, 62-135826.

For the hardener, herein usable are those described in JP-A 1-16123.6 (page 222), 9-263036, 10-119423, 2001-310547.

Other additives that may be in the image-receiving layer are pigment dispersant, tackifier, defoaming agent, dye, fluorescent brightener, preservative, pH-controlling agent, mat agent, and hardener. The image-receiving material may have one or more ink-receiving layers.

The recording paper and the recording films may have a back coat layer. The layer may contain white pigment, aqueous binder and other components.

The white pigment that may be in the back coat layer includes, for example, inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminium silicate, diatomaceous earth, calcium silicate, magnesium silicate, synthetic amorphous silica, colloidal silica, colloidal alumina, pseudo-boehmite, aluminium hydroxide, alumina, lithopone, zeolite, hydrated halloysite, magnesium carbonate, magnesium hydroxide; and organic white pigments such as styrenic plastic pigment, acrylic plastic pigment, polyethylene microcapsules, urea resin, melamine resin.

The aqueous binder that may be in the back coat layer includes, for example, water-soluble polymers such as styrene/maleic acid salt copolymer, styrene/acrylic acid salt copolymer, polyvinyl alcohol, silanol-modified polyvinyl alcohol, starch, cationated starch, casein, gelatin, carboxymethyl cellulose, hydroxyethyl cellulose, polyvinylpyrrolidone; and water-dispersive polymers such as styrene-butadiene latex, acrylic emulsion. The other components that may be in the back coat layer are defoaming agent, antifoaming agent, dye, fluorescent brightener, preservative, waterproofing agent, etc.

A dispersion of polymer particles may be added to the constitutive layers (including back layer) of the inkjet recording paper and films in the invention. The dispersion of polymer particles is for improving the physical properties of the coating layers, for example, for improving the dimensional stability of the layers and for preventing the layers from curling, blocking and cracking. The dispersion of polymer particles is described in, for example, JP-A62-245258, 62-1316648, 62-110066. When a dispersion of polymer particles having a low glass transition temperature (not higher than 40° C.) is added to the mordant-containing layer, then it is effective for preventing the layer from cracking and curling. When a dispersion of polymer particles having a high glass transition point is added to the back layer, it is also effective for preventing the layer from curling.

(Inkjet Recording)

The dot volume of the ink on the recording material in the invention is preferably from 0.1 pl to 100 pl, more preferably from 0.5 pl to 50 pl, even more preferably from 2 pl to 50 pl.

The system for the inkjet recording method in the invention is not specifically defined, for which any known system is employable. For example, employable is any of a charge control system of jetting out ink through electrostatic attractive force; a drop-on-demand system (pressure pulse system)

of using the oscillation pressure of a piezoelectric device; an acoustic inkjet system of converting an electric signal into an acoustic beam, applying it to ink, and jetting out the ink under radiation pressure; or a thermal inkjet (bubble jet) system of heating ink to form bubbles and utilizing the resulting pressure.

The inkjet recording system includes a system of jetting a large number of small-volume drops of photoink of low concentration, a system of using multiple inks of substantially the same color which, however, differ in concentration to improve the image quality, and a system of using colorless transparent ink. The dot volume on the recording material is controlled mainly by print head.

For example, in a thermal inkjet system, the dot volume may be controlled depending on the structure of the print head. Concretely, the ink chamber, the heating zone and the nozzle size are varied, and the dot volume may be thereby varied in any desired manner. When multiple print heads that differ in point of the heating zone and the nozzle size are used in a thermal inkjet system, then ink drops of different sizes may be realized.

In a drop-on-demand system using a piezoelectric device, the dot volume may also be varied depending on the structure of the print head, like in the thermal inkjet system as above. In this, however, the waveform of the driving signals of the piezoelectric device may be controlled, as will be mentioned hereinafter, and ink drops of different sizes may be thereby realized through the print head of one and the same structure.

When the ink of the invention is dropwise jetted onto a recording material, the jet-out frequency is preferably at least 1 kHz.

For obtaining high-quality images like photographs, small ink drops must be used for reproducing sharp and high-quality images. For it, the dot density must be at least 600 dpi (dots per inch).

On the other hand, in a recording system where ink is jetted out through heads each having multiple nozzles and where the recording paper moves vertically to the heads, the number of the heads that may be driven at the same time therein may be from tens to 200 or so. Even in a line-head system where plural heads are fixed, the number of the heads that may be driven at the same time therein is limited to hundreds. This is because the driving power is limited, and the heat of the heads may have some influences on the images formed, and therefore a larger number of head nozzles could not be driven at the same time. Accordingly, when the dot density is increased in recording images, then the recording time may be prolonged. However, if the driving frequency is increased, then the recording speed may be increased.

For controlling the inkjet frequency in a thermal inkjet system, the frequency of the head-driving signal to heat the head may be controlled.

In a piezoelectric system, the frequency of the signal to drive the piezoelectric device may be controlled.

The driving mechanism of piezoelectric head is described. The image signal for printing is controlled in a printer control zone in point of the dot size, the dot speed, and the dot frequency, and a signal to drive the print head is formed. Thus formed, the driving signal is led to the print head. The piezo-driving signal controls the dot size, the dot speed and the dot frequency. The dot size and the dot speed may be determined by the form and the amplitude of the driving waves, and the frequency is determined by the signal repetitive cycle.

When the dot frequency is set as 10 kHz, then the head is driven in every 100 microseconds, and one line recording will finish within 400 microseconds. When the recording paper traveling speed is so set that the recording paper may travel by 1/600 inches, or that is, by about 42 microns per 400 microseconds, then one sheet may be printed in every 1.2 seconds.

Regarding the constitution of the printing device and the constitution of the printer for use in the invention, for example, the embodiments as in JP-A 11-170527 are preferably referred to. For the ink cartridge, for example, preferred are those illustrated in JP-A5-229133. Regarding the constitution of the suction mechanism in printing and the constitution of the cap to cover the printing head, for example, preferably referred to are those illustrated in JP-A 7-276671. Also preferably, a filter for bubble removal is provided near the head, for example, as in JP-A 9-277552.

Also preferably, the nozzle surface is processed for water repellency, for example, as in JP-A-2002-292878. Regarding its applications, the ink of the invention may be used in printers that are to be connected with computers, or may be used in printers that are specifically designed exclusively for photographs.

It is desirable that, in the inkjet recording method of the invention, the ink is jetted out onto a recording material at a mean dot rate of at least 2 m/sec, more preferably at least 5 m/sec.

For controlling the dot speed, the form and the amplitude of the head-driving waves may be controlled.

When plural driving waves of different forms are selectively used in one printer, then inkdots of different sizes may be jetted out through one and the same head in the printer.

(Inkjet Applications)

The ink for inkjet recording of the invention may be utilized for any other applications than those for inkjet recording. For example, it may be utilized for display image formation, indoor decorative image formation, and outdoor decorative image formation.

The applications for display image formation are meant to indicate images written or attached to posters, wallpapers, decorative small articles (e.g., ornaments, figures), advertising leaflets, wrapping paper, wrapping materials, paper bags, polyvinyl bags, packaging materials, signboards, sides of transport facilities (e.g., cars, buses, trains), as well as logotype-having clothes, etc. When the dye of the invention is used to form such display images, then the images include not only those in the narrow sense of the word but also all color patterns that may be recognized by people such as abstract designs, letters, geometric patterns, etc.

The indoor decorative material for image formation thereon is meant to include various articles such as wallpapers, decorative small articles (e.g., ornaments, figures), lighting instruments, furniture parts, design parts of floors and ceilings, etc. When the dye of the invention is used to form images on such materials, then the images include not only those in the narrow sense of the word but also all color patterns that may be recognized by people such as abstract designs, letters, geometric patterns, etc.

The outdoor decorative material for image formation thereon is meant to include various articles such as wall materials, roofing materials, signboards, gardening materials, outdoor decorative small articles (e.g., ornaments, figures), parts of outdoor lighting instruments, etc. When the dye of the invention is used to form images on such materials, then the images include not only those in the narrow sense of the word but also all color patterns that may be recognized by people such as abstract designs, letters, geometric patterns, etc.

In the above-mentioned applications, the media on which patterns are formed include paper, fibers, cloths (including nonwoven cloths), plastics, metals, ceramics and other various matters. Regarding the dyeing mode on them, the dye may be applied and fixed thereon in any mode of mordanting, printing or chemical reaction for reactive dye with reactive group introduced thereinto. Above all, especially preferred is the mordanting mode of fixing the dye on the media.

EXAMPLES

The invention is described with reference to the following Examples, to which, however, the invention should not be limited.

Example 1

Ultrapure water (resistance, at least 18 MΩ) was added to the components shown below to make one liter, and then stirred under heat at 30 to 40° C. for 1 hour. Next, the resulting mixture was filtered under reduced pressure through a microfilter having a mean pore size of 0.25 μm, to prepare an yellow ink, Y-101.

(Formulation of Yellow Ink, Y-101)

| (Solid Components) | |
|---|---|
| Yellow Dye (DYE-83) | 50 g/liter |
| Proxel | 5 g/liter |
| Urea | 25 g/liter |
| (Liquid Components) | |
| Triethylene Glycol Monobutyl Ether (TGB) | 100 g/liter |
| Glycerin (GR) | 115 g/liter |
| Triethylene Glycol (TEG) | 100 g/liter |
| 2-Pyrrolidone | 35 g/liter |
| Triethanolamine (TEA) | 8 g/liter |
| Surfynol STG (SW) | 10 g/liter |

The yellow dye (DYE-83) used herein had an oxidation potential of 1.23 V (vs SCE), measured in a cyclic voltammetry (CV) method and a rotary ring disc electrode method of analyzing an aqueous solution of the dye (1 mmol/liter).

For comparison, an yellow ink cartridge, Epson's PM-980 was used.

Other yellow inks shown in the Table below were prepared in the same manner as that for the yellow ink Y-101, for which, however, an yellow dye C, DYE-51, YJ-3 or YJ-7 was used in place of the dye, DYE-83.

The yellow dye C used herein had an oxidation potential of 0.98 V (vs SCE), and the others than it all had an oxidation potential over 1.2 V (vs SCE).

TABLE 4

Yellow Dye C:

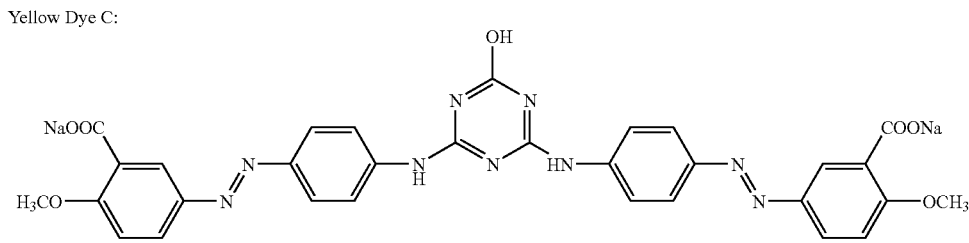

| No. | Yellow Dye |
|---|---|
| PM-950C (comparison) | — |
| Y-101 (comparison) | DYE-83 (50 g/liter) |
| Y-102 (comparison) | C (55 g/liter) |
| Y-103 (comparison) | YJ-3 (60 g/liter) |
| Y-104 (comparison) | DYE-51 (45 g/liter) |
| Y-105 (comparison) | YJ-7 (50 g/liter) |
| Y-106 (comparison) | DYE-83 (25 g/liter) |
| | C (28 g/liter) |
| Y-107 (the invention) | DYE-83 (20 g/liter) |
| | YJ-3 (36 g/liter) |
| Y-108 (the invention) | DYE-83 (40 g/liter) |
| | YJ-3 (12 g/liter) |
| Y-109 (the invention) | DYE-83 (35 g/liter) |
| | YJ-3 (18 g/liter) |
| Y-110 (the invention) | DYE-83 (30 g/liter) |
| | YJ-3 (18 g/liter) |
| Y-111 (the invention) | DYE-83 (40 g/liter) |
| | YJ-3 (10 g/liter) |

These inks were charged in yellow ink cartridges for Epson's inkjet printer PM-980C with other color inks of PM-980C in the respective ink cartridges, and the printer was driven in a mode of 6-color printing to thereby print a stepwise density-varying monochromatic yellow image patterns and gray image patterns.

The image-receiving sheet used herein is Fuji Photo Film's inkjet paper, photo-glossy paper "Gasai". The printed samples were evaluated in point of the image quality, the image fastness and the ink jet-out stability.

(Evaluation Tests)

1) Under different conditions at varying ambient temperature and relative humidity mentioned below, the jet-out stability test is effected as follows: The cartridges are set in the printer, and inks are jetted out through the respective nozzles. After this, 300 sheets of A4-size paper are printed under all such different conditions to have images thereon, and these are all analyzed in point of their image quality. When the ink has been used up all during the test, then the cartridge is exchanged and the printing test is continued.

(Test Conditions)

Four different conditions of 30° C. 80% RH; 30° C. 20% RH; 10° C. 80% RH; and 10° C. 20% RH.

(Evaluation Criteria)

A: No print disorder is found from the start to the end of the printing operation.

B: Some print disorder is found.

C: Print disorder is found throughout the printing operation.

2) The printed samples were evaluated for the image storability.

(1) The light fastness is evaluated as follows: The image density Ci of the fresh sample just after printed is measured with X-Rite 310. Then, the printed image is exposed to xenon light (8,000 lux) from Atlas' weather meter for 20 days, and then its image density Cf is measured. The dye retentiveness is obtained from $\{(Cf/Ci) \times 100\}$, and this indicates the light fastness of the printed sample. Regarding the dye retentiveness, three points having a reflection density of 1, 1.5 and 2 are analyzed in every sample. The samples having a dye retentiveness of at least 70% at every point are "A"; those having a dye retentiveness of less than 70% at two points are "B"; and those having a dye retentiveness of less than 70% at all three points are "C".

(2) The heat fastness is evaluated as follows: The printed samples are kept at 80° C. and 70% RH for 10 days, and their density before and after the storage is measured with X-Rite 310. From the data, the dye retentiveness in each sample is determined, and this indicates the heat fastness of the sample. Regarding the dye retentiveness, three points having a reflection density of 1, 1.5 and 2 are analyzed in every sample. The samples having a dye retentiveness of at least 90% at every point are "A"; those having a dye retentiveness of less than 90% at two points are "B"; and those having a dye retentiveness of less than 90% at all three points are "C".

When the samples that have cleared the dye retentiveness level of 90% at every point are stored under the condition as above for 1 day and when the density increase in them after the one-day storage is 5% or more, then the evaluation rank of the samples is "AX".

(3) The ozone resistance is evaluated as follows: The printed samples are kept in a box having a constant ozone gas concentration of 5 ppm, for 3 days. Before and after exposure to ozone gas, the image density of each sample is measured with a reflection densitometer (X-Rite 310TR), and the dye retentiveness in every sample is determined. Regarding the dye retentiveness, three points having a reflection density of 1, 1.5 and 2 are analyzed in every sample. The ozone gas concentration in the box is kept constant by the use of an ozone gas monitor (Applics' Model OZG-EM-01).

Thus tested, the samples are grouped into three ranks: Those having a dye retentiveness of at least 80% at every point are "A"; those having a dye retentiveness of less than 80% at one or two points are "B"; and those having a dye retentiveness of less than 70% at all three points are "C".

The results obtained are shown in Table below.

TABLE 5

| No. | Jet-Out Stability | Light Fastness | Heat Fastness | $O_3$ Fastness |
|---|---|---|---|---|
| PM-950C (comparison) | A | C | B | C |
| Y-101 (comparison) | A | A | AX | A |
| Y-102 (comparison) | A | C | B | C |
| Y-103 (comparison) | A | B | A | B |
| Y-104 (comparison) | A | A | AX | A |
| Y-105 (comparison) | A | B | A | B |
| Y-106 (comparison) | A | B | A | B |
| Y-107 (the invention) | A | A | A | A |
| Y-108 (the invention) | A | A | A | A |
| Y-109 (the invention) | A | A | A | A |
| Y-110 (the invention) | A | A | A | A |
| Y-111 (the invention) | A | A | A | A |

In thermal fastness evaluation with Y-107, a density increase of 3% in one-day storage was seen.

The results in the Table confirm that the systems using the ink of the invention give good images having good fastness and having good color-balance stability.

Example 2

Ultrapure water (resistance, at least 18 MΩ) was added to the components shown below to make one liter, and then stirred under heat at 30 to 40° C. for 1 hour. Next, the resulting mixture was filtered under reduced pressure through a microfilter having a mean pore size of 0.25 μm, to prepare an yellow ink, Y-201.

(Formulation of Yellow Ink, Y-201)

| (Solid Components) | |
|---|---|
| Yellow Dye of the invention (DYE-83) | 30 g/liter |
| Proxel | 5 g/liter |
| Urea | 20 g/liter |
| (Liquid Components) | |
| Triethylene Glycol Monobutyl Ether (TGB) | 60 g/liter |
| Glycerin (GR) | 100 g/liter |
| Triethylene Glycol (TEG) | 40 g/liter |
| Isopropanol | 40 g/liter |
| 1,5-Pentanediol | 40 g/liter |
| Triethanolamine (TEA) | 8 g/liter |
| Surfynol STG (SW) | 10 g/liter |

Other yellow inks shown in the Table below were prepared in the same manner as that for the yellow ink Y-201, for which, however, the dye indicated below was used in place of the dye, DYE-83.

TABLE 6

| No. | Yellow Dye |
|---|---|
| PM-950C (comparison) | — |
| Y-201 (comparison) | DYE-83 (30 g/liter) |
| Y-202 (comparison) | C (33 g/liter) |
| Y-203 (comparison) | YJ-3 (36 g/liter) |
| Y-204 (comparison) | DYE-51 (27 g/liter) |
| Y-205 (comparison) | YJ-7 (30 g/liter) |
| Y-206 (comparison) | DYE-83 (15 g/liter) C (17 g/liter) |
| Y-207 (the invention) | DYE-51 (11 g/liter) YJ-3 (21 g/liter) |
| Y-208 (the invention) | DYE-83 (24 g/liter) YJ-3 (7 g/liter) |

TABLE 6-continued

| No. | Yellow Dye |
|---|---|
| Y-209 (the invention) | DYE-51 (19 g/liter) YJ-3 (11 g/liter) |
| Y-210 (the invention) | DYE-51 (18 g/liter) YJ-7 (10 g/liter) |
| Y-211 (the invention) | DYE-83 (24 g/liter) YJ-7 (6 g/liter) |

These inks were charged in yellow ink cartridges for Canon's inkjet printer BJ-950 with other color inks of BJ-950 in the respective ink cartridges, and the printer was driven to print a stepwise density-varying monochromatic yellow image patterns and gray image patterns.

The image-receiving sheet used herein is Fuji Photo Film's inkjet paper, photo-glossy paper "Gasai". The printed samples were evaluated in point of the image quality, the image fastness and the ink jet-out stability, in the same manner as in Example 1.

The results are given below.

TABLE 7

| No. | Jet-Out Stability | Light Fastness | Heat Fastness | $O_3$ Fastness |
|---|---|---|---|---|
| PM-950C (comparison) | A | C | B | C |
| Y-201 (comparison) | A | A | AX | A |
| Y-202 (comparison) | A | C | C | C |
| Y-203 (comparison) | A | B | B | B |
| Y-204 (comparison) | A | A | AX | A |
| Y-205 (comparison) | A | B | A | B |
| Y-206 (comparison) | A | B | A | B |
| Y-207 (the invention) | A | A | A | A |
| Y-208 (the invention) | A | A | A | A |
| Y-209 (the invention) | A | A | A | A |
| Y-210 (the invention) | A | A | A | A |
| Y-211 (the invention) | A | A | A | A |

In thermal fastness evaluation with Y-207, a density increase of 3% in one-day storage was seen.

Like in Example 1, the results in the Table confirm that the systems using the ink of the invention give good images having good fastness and having good color-balance stability.

Example 3

Ultrapure water (resistance, at least 18 MΩ) was added to the components shown below to make one liter, and then stirred under heat at 30 to 40° C. for 1 hour. Next, the resulting mixture was filtered under reduced pressure through a microfilter having a mean pore size of 0.25 μm. Inks of different colors were thus prepared.

(Formulation of Light Cyan Ink)

| (Solid Components) | |
|---|---|
| Cyan Dye (C-1) | 20 g/liter |
| Urea (UR) | 15 g/liter |
| Benzotriazole (BTZ) | 0.08 g/liter |
| Proxel XL2 (PXL | 3.5 g/liter |
| (Liquid Components) | |
| Triethylene Glycol (TEG) | 110 g/liter |
| Glycerin (GR) | 130 g/liter |
| Triethylene Glycol Monobutyl Ether (TGB) | 110 g/liter |
| 2-Pyrrolidone (PRD) | 60 g/liter |
| Triethanolamine (TEA) | 7 g/liter |
| Surfynol STG (SW) | 10 g/liter |

Cyan Dye (C-1):

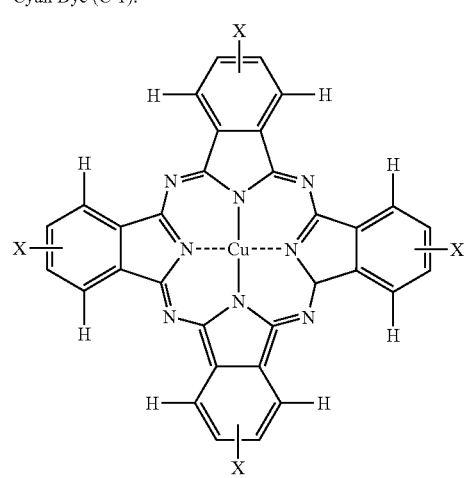

X = A or B
A: $SO_2(CH_2)_3SO_3Li$
B: $SO_2(CH_2)_3SO_2NHCH_2CH(CH_3)OH$
C-1: A/B = 75/25

(Formulation of Cyan Ink)

| (Solid Components) | |
|---|---|
| Cyan Dye (C-1) | 60 g/liter |
| Urea (UR) | 30 g/liter |
| Benzotriazole (BTZ) | 0.08 g/liter |
| Proxel XL2 (PXL) | 3.5 g/liter |
| (Liquid Components) | |
| Triethylene Glycol (TEG) | 110 g/liter |
| Glycerin (GR) | 130 g/liter |
| Triethylene Glycol Monobutyl Ether (TGB) | 130 g/liter |
| 2-Pyrrolidone (PRD) | 60 g/liter |
| Triethanolamine (TEA) | 7 g/liter |
| Surfynol STG (SW) | 10 g/liter |

(Formulation of Light Magenta Ink)

| (Solid Components) | |
|---|---|
| Magenta Dye (M-1) | 7.5 g/liter |
| Urea (UR) | 10 g/liter |
| Proxel | 5 g/liter |
| (Liquid Components) | |
| Diethylene Glycol (DEG) | 90 g/liter |
| Glycerin (GR) | 70 g/liter |
| Triethylene Glycol Monobutyl Ether (TGB) | 70 g/liter |

-continued

| | |
|---|---|
| Triethanolamine (TEA) | 6.9 g/liter |
| Surfynol STG (SW) | 10 g/liter |

Magenta Dye (M-1):

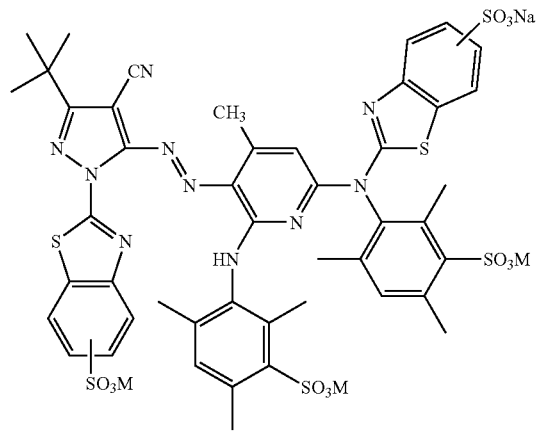

(Formulation of Magenta Ink)

| (Solid Components) | |
|---|---|
| Magenta Dye (M-1) | 23 g/liter |
| Urea (UR) | 15 g/liter |
| Proxel | 5 g/liter |
| (Liquid Components) | |
| Diethylene Glycol | 90 g/liter |
| Glycerin | 70 g/liter |
| Triethylene Glycol Monobutyl Ether (TGB) | 70 g/liter |
| Triethanolamine | 6.9 g/liter |
| Surfynol STG | 10 g/liter |

(Formulation of Yellow Ink)

| (Solid Components) | |
|---|---|
| Yellow Dye (Y-1) | 35 g/liter |
| Proxel | 3.5 g/liter |
| Benzotriazole (BTZ) | 0.08 g/liter |
| Urea | 10 g/liter |
| (Liquid Components) | |
| Triethylene Glycol Monobutyl Ether (TGB) | 130 g/liter |
| Glycerin (GR) | 115 g/liter |
| Diethylene Glycol (DEG) | 120 g/liter |
| 2-Pyrrolidone | 35 g/liter |

-continued

| | |
|---|---|
| Triethanolamine (TEA) | 8 g/liter |
| Surfynol STG (SW) | 10 g/liter |

Yellow Dye (Y-1):

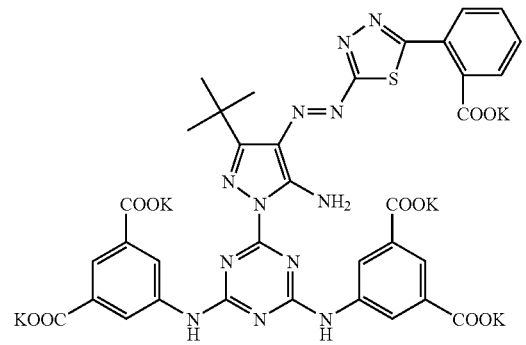

(Formulation of Dark Yellow Ink)

| (Solid Components) | |
|---|---|
| Yellow Dye (Y-1) | 35 g/liter |
| Magenta Dye (M-1) | 2 g/liter |
| Cyan Dye (C-1) | 2 g/liter |
| Proxel | 5 g/liter |
| Benzotriazole (BTZ) | 0.08 g/liter |
| Urea | 10 g/liter |
| (Liquid Components) | |
| Triethylene Glycol Monobutyl Ether (TGB) | 140 g/liter |
| Glycerin (GR) | 125 g/liter |
| Diethylene Glycol (DEG) | 120 g/liter |
| 2-Pyrrolidone | 35 g/liter |
| Triethanolamine (TEA) | 8 g/liter |
| Surfynol STG (SW) | 10 g/liter |

(Formulation of Black Ink)

| (Solid Components) | |
|---|---|
| Black Dye (Bk-1) ($\lambda$max, 587 nm; half-value width, 105 nm) | 75 g/liter |
| Black Dye (Bk-2) ($\lambda$max, 447 nm) | 30 g/liter |
| Proxel | 5 g/liter |
| Urea | 10 g/liter |
| Benzotriazole | 3 g/liter |
| (Liquid Components) | |
| Diethylene Glycol Monobutyl Ether (DGB) | 120 g/liter |
| Glycerin (GR) | 125 g/liter |
| Diethylene Glycol (DEG) | 100 g/liter |
| 2-Pyrrolidone | 35 g/liter |

-continued

| Triethanolamine (TEA) | 8 g/liter |
| Surfynol STG (SW) | 10 g/liter |

Black Dye (BK-1):

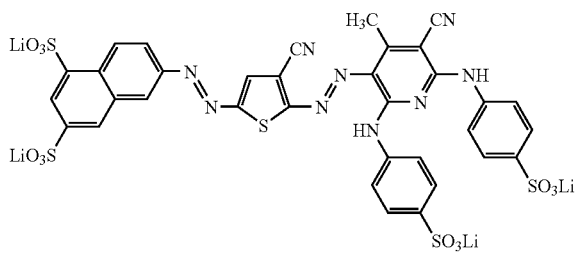

Black Dye (BK-2):

-continued

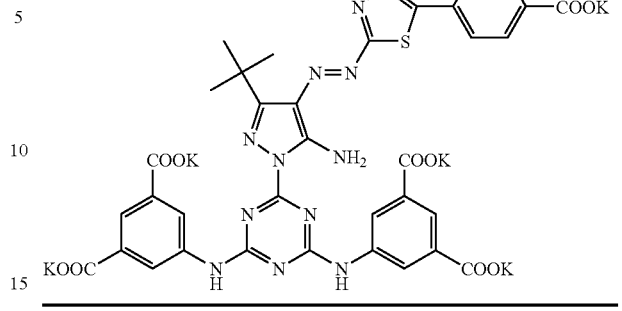

An ink set of these inks was prepared, and this is IS-101. In addition, other ink sets IS-102 to IS-108 were prepared in the same manner as above, in which, however, the dye of the black ink was partly changed as in the following Table.

The dyes used herein all had an oxidation potential (Eox) over 1.2 V (vs SCE).

TABLE 8

|  | Additive |
| --- | --- |
| IS-101 (comparison) | no |
| IS-102 (comparison) | A half of BK-1 in IS-101 was changed to dye A. |
| IS-103 (comparison) | A half of BK-1 in IS-101 was changed to dye B. |
| IS-104 (the invention) | A half of BK-1 in IS-101 was changed to dye C. |
| IS-105 (the invention) | A half of BK-1 in IS-101 was changed to dye D. |
| IS-106 (the invention) | 1/3 of BK-1 in IS-101 was changed to dye C. |
| IS-107 (the invention) | 1/3 of BK-1 in IS-101 was changed to dye D. |
| IS-108 (the invention) | A half of BK-1 in 15-101 was changed to dye E. |

Dye A: C.I. Direct Black 38

Dye B:

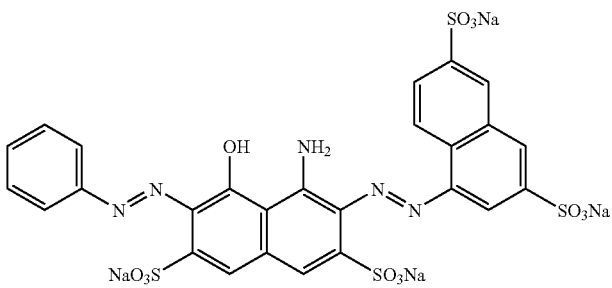

TABLE 8-continued

Additive

Dye C:

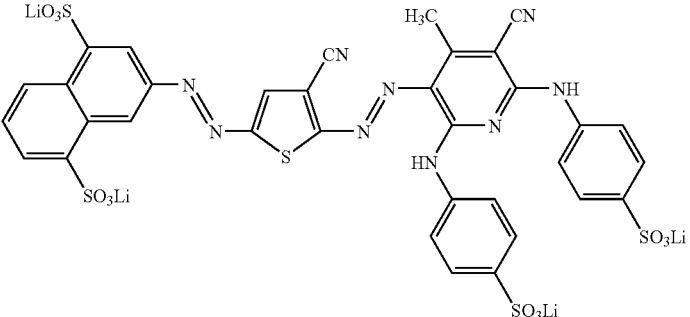

Dye D:

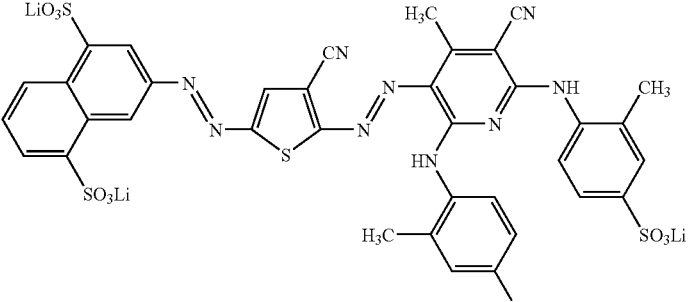

Dye E:

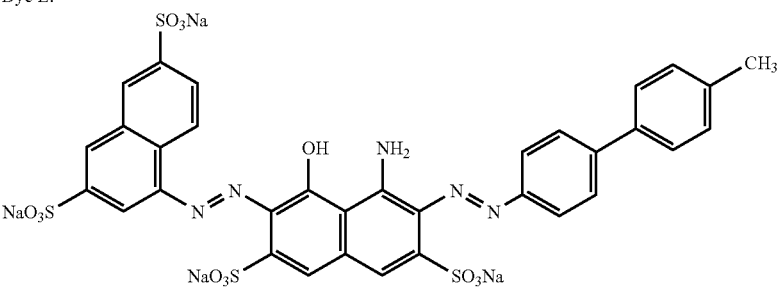

These inks were charged in ink cartridges of Epson's inkjet printer PM-980C, and the printer was driven in a mode of monochromatic image formation to thereby print a stepwise density-varying gray image pattern on an image-receiving sheet.

The image-receiving sheet used herein is Fuji Photo Film's inkjet paper, photo-glossy paper "Gasai".

(Evaluation Tests)

1) Using a densitometer, X-Rite, a value of Dvis of each sample is measured, and this indicates the maximum gray density.

2) The image storability of the gradation gray image is evaluated, as follows:

(1) The lightfastness is evaluated as follows: The image density Ci of the fresh sample just after printed is measured with X-Rite 310. Then, the printed image is exposed to xenon light (85,000 lux) from Atlas' weather meter for 20 days, and then its image density Cf is measured. The dye retentiveness is obtained from {(Cf/Ci)×100}, and this indicates the light fastness of the printed sample. Regarding the dye retentiveness, three points having a reflection density of 1, 1.5 and 2 are analyzed in every sample. The samples having a dye retentiveness of at least 80% at every point are "A"; those having a dye retentiveness of less than 80% at two points are "B"; and those having a dye retentiveness of less than 80% at all three points are "C".

(2) The ozone resistance is evaluated as follows: The printed samples are kept in a box having a constant ozone gas concentration of 5 ppm, for 7 days. Before and after exposure to ozone gas, the image density of each sample is measured with a reflection densitometer (X-Rite 310TR), and the dye retentiveness in every sample is determined. Regarding the dye retentiveness, three points having a reflection density of 1, 1.5 and 2 are analyzed in every sample. The ozone gas concentration in the box is kept constant by the use of an ozone gas monitor (Applics' Model OZG-EM-01).

Thus tested, the samples are grouped into three ranks: Those having a dye retentiveness of at least 80% at every point are "A"; those having a dye retentiveness of less than 80% at one or two points are "B"; and those having a dye retentiveness of less than 80% at all three points are "C".

(3) The ink jet-out stability is evaluated as follows: Under a controlled condition at 30° C. and 80% RH, 100 sheets of A4-size paper are printed with each ink set. The printed black images are checked for image disorder and thin spots. The samples with no trouble are A; those having some image disorder and other trouble are B; and those having many troubles are C.

TABLE 9

|  | Maximum Density | Light Fastness | Ozone Resistance | Ink Jet-Out Stability |
|---|---|---|---|---|
| PM-980C (comparison) | 2.43 | C | C | A |
| IS-101 (comparison) | 2.21 | A | A | C |
| IS-102 (comparison) | 2.31 | B | B | C |
| IS-103 (comparison) | 2.35 | B | B | C |
| IS-104 (the invention) | 2.42 | A | A | A |
| IS-105 (the invention) | 2.41 | A | A | A |
| IS-106 (the invention) | 2.42 | A | A | A |
| IS-107 (the invention) | 2.39 | A | A | A |
| IS-108 (the invention) | 2.39 | A | A | A |

The results as above well support the effect of the invention.

Example 4

Ultrapure water (resistance, at least 18 MΩ) was added to the components shown below to make one liter, and then stirred under heat at 30 to 40° C. for 1 hour. Next, the resulting mixture was filtered under reduced pressure through a microfilter having a mean pore size of 0.25 µm. Inks of different colors were thus prepared.

(Formulation of Photo Cyan Ink)

| (Solid Components) | |
|---|---|
| Cyan Dye (C-1) | 10 g/liter |
| Urea (UR) | 15 g/liter |
| Benzotriazole (BTZ) | 0.08 g/liter |
| Proxel XL2 (PXL) | 3.5 g/liter |
| (Liquid Components) | |
| Triethylene Glycol (TEG) | 50 g/liter |
| Glycerin (GR) | 100 g/liter |
| Triethylene Glycol Monobutyl Ether (TGB) | 60 g/liter |
| 1,5-pentanediol (PTD) | 40 g/liter |
| Isopropanol (IPA) | 20 g/liter |
| Triethanolamine (TEA) | 7 g/liter |
| Surfynol STG (SW) | 10 g/liter |

(Formulation of Cyan Ink)

| (Solid Components) | |
|---|---|
| Cyan Dye (C-1) | 30 g/liter |
| Urea (UR) | 40 g/liter |
| Benzotriazole (BTZ) | 0.08 g/liter |
| Proxel XL2 (PXL) | 3.5 g/liter |
| (Liquid Components) | |
| Triethylene Glycol (TEG) | 40 g/liter |
| Glycerin (GR) | 100 g/liter |
| Triethylene Glycol Monobutyl Ether (TGB) | 70 g/liter |
| 1,5-Pentanediol (PTD) | 50 g/liter |
| Isopropanol (IPA) | 20 g/liter |
| Triethanolamine (TEA) | 7 g/liter |
| Surfynol STG (SW) | 10 g/liter |

(Formulation of Photo Magenta Ink)

| (Solid Components) | |
|---|---|
| Magenta Dye (M-1) | 7.5 g/liter |
| Urea (UR) | 10 g/liter |
| Proxel | 5 g/liter |
| (Liquid Components) | |
| Triethylene Glycol (TEG) | 40 g/liter |
| Glycerin (GR) | 100 g/liter |
| Triethylene Glycol Monobutyl Ether (TGB) | 60 g/liter |
| 1,5-Pentanediol (PTD) | 40 g/liter |
| Isopropanol (IPA) | 20 g/liter |
| Triethanolamine (TEA) | 6.9 g/liter |
| Surfynol STG (SW) | 10 g/liter |

(Formulation of Magenta Ink)

| (Solid Components) | |
|---|---|
| Magenta Dye (M-1) | 23 g/liter |
| Urea (UR) | 15 g/liter |
| Proxel | 5 g/liter |
| (Liquid Components) | |
| Triethylene Glycol (TEG) | 50 g/liter |
| Glycerin (GR) | 100 g/liter |
| Triethylene Glycol Monobutyl Ether (TGB) | 50 g/liter |
| 1,5-Pentanediol (PTD) | 40 g/liter |
| Isopropanol (IPA) | 20 g/liter |
| Triethanolamine | 6.9 g/liter |
| Surfynol STG | 10 g/liter |

(Formulation of Yellow Ink)

| (Solid Components) | |
|---|---|
| Yellow Dye (Y-1) | 35 g/liter |
| Proxel | 3.5 g/liter |
| Benzotriazole (BTZ) | 0.08 g/liter |
| Urea | 10 g/liter |
| (Liquid Components) | |
| Triethylene Glycol (TEG) | 40 g/liter |
| Glycerin (GR) | 100 g/liter |
| Triethylene Glycol Monobutyl Ether (TGB) | 70 g/liter |
| 1,5-Pentanediol (PTD) | 60 g/liter |
| Isopropanol (IPA) | 20 g/liter |
| Triethanolamine (TEA) | 8 g/liter |
| Surfynol STG (SW) | 10 g/liter |

(Formulation of Black Ink)

| (Solid Components) | |
|---|---|
| Black Dye (Bk-1) | 75 g/liter |
| Black Dye (Bk-2) | 30 g/liter |
| Proxel | 5 g/liter |
| Urea | 10 g/liter |
| Benzotriazole | 3 g/liter |
| (Liquid Components) | |
| Triethylene Glycol (TEG) | 60 g/liter |
| Glycerin (GR) | 100 g/liter |
| Triethylene Glycol Monobutyl Ether (TGB) | 70 g/liter |
| 1,5-Pentanediol (PTD) | 50 g/liter |

-continued

| | |
|---|---|
| Isopropanol (IPA) | 20 g/liter |
| Triethanolamine (TEA) | 8 g/liter |
| Surfynol STG (SW) | 10 g/liter |

An ink set of these inks was prepared, and this is IS-201. In addition, other ink sets IS-202 to IS-208 were prepared in the same manner as above, to which, however, the additive as in the following Table was added. The dyes A to E used herein are all the same as those in Example 3.

TABLE 10

| | Additive |
|---|---|
| IS-201 (comparison) | no |
| IS-202 (comparison) | A half of BK-1 in IS-201 was changed to dye A. |
| IS-203 (comparison) | A half of BK-1 in IS-201 was changed to dye B. |
| IS-204 (the invention) | A half of BK-1 in IS-201 was changed to dye C. |
| IS-205 (the invention) | A half of BK-1 in IS-201 was changed to dye D. |
| IS-206 (the invention) | ⅓ of BK-1 in IS-201 was changed to dye C. |
| IS-207 (the invention) | ⅓ of BK-1 in IS-201 was changed to dye D. |
| IS-208 (the invention) | A half of BK-1 in IS-201 was changed to dye E. |

These inks were charged in ink cartridges of Canon's inkjet printer PIXUS9501, and the printer was driven to print a stepwise density-varying image pattern of 6 colors C, M, Y, B, G and R and gray on an image-receiving sheet.

The image-receiving sheet used herein is copying wood free paper, and Fuji Photo Film's inkjet paper, photo-glossy paper "Gasai".

The printed images were evaluated in the same manner as in Example 3.

The results are given below.

TABLE 11

| | Maximum Density | Light Fastness | Ozone Resistance | Ink Jet-Out Stability |
|---|---|---|---|---|
| PIXUS950i (comparison) | 2.33 | C | C | A |
| IS-201 (comparison) | 2.11 | A | A | C |
| IS-202 (comparison) | 2.11 | B | B | C |
| IS-203 (comparison) | 2.15 | B | B | C |
| IS-204 (the invention) | 2.32 | A | A | A |
| IS-205 (the invention) | 2.31 | A | A | A |
| IS-206 (the invention) | 2.32 | A | A | A |
| IS-207 (the invention) | 2.33 | A | A | A |
| IS-208 (the invention) | 2.33 | A | A | A |

The results as above well support the effect of the invention.

Example 5

Ultrapure water (resistance, at least 18 MΩ) was added to the components shown below to make one liter, and then stirred under heat at 30 to 40° C. for 1 hour. Next, the resulting mixture was filtered under reduced pressure through a microfilter having a mean pore size of 0.25 μm. Inks of different colors were thus prepared.

A light magenta ink of the invention was prepared, according to the formulation mentioned below.

(Formulation of Light Magenta Ink)

| (Solid Components) | |
|---|---|
| Magenta Dye (M-1) | 8 g/liter |
| Urea (UR) | 10 g/liter |
| Proxel | 5 g/liter |
| (Liquid Components) | |
| Diethylene Glycol (DEG) | 90 g/liter |
| Glycerin (GR) | 120 g/liter |
| Triethylene Glycol Monobutyl Ether (TGB) | 110 g/liter |
| Triethanolamine (TEA) | 8 g/liter |
| Surfynol STG (SW) | 10 g/liter |

According to the formulation mentioned below, a magenta ink was prepared in which the magenta dye (M-1) was increased to 28 g.

(Formulation of Magenta Ink)

| (Solid Components) | |
|---|---|
| Magenta Dye (M-1) | 28 g/liter |
| Urea (UR) | 15 g/liter |
| Proxel | 5 g/liter |
| (Liquid Components) | |
| Diethylene Glycol | 100 g/liter |
| Glycerin | 130 g/liter |
| Triethylene Glycol Monobutyl Ether | 110 g/liter |
| Triethanolamine | 8 g/liter |
| Surfynol STG | 10 g/liter |

Magenta Dye (M-1):

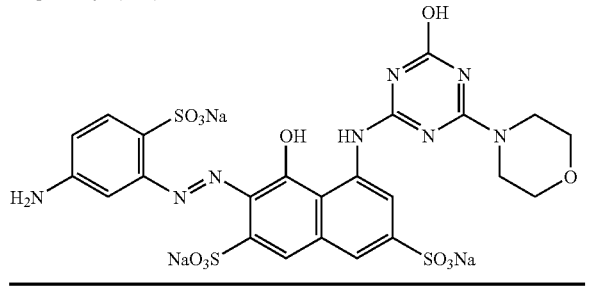

Other inks to form an ink set of the invention were prepared, according to the formulations mentioned below.

(Formulation of Light Cyan Ink)

| (Solid Components) | |
|---|---|
| Cyan Dye (C-1) | 20 g/liter |
| Urea (UR) | 15 g/liter |
| Benzotriazole (BTZ) | 0.08 g/liter |
| Proxel XL2 (PXL) | 3.5 g/liter |
| (Liquid Components) | |
| Triethylene Glycol (TEG) | 110 g/liter |
| Glycerin (GR) | 130 g/liter |
| Triethylene Glycol Monobutyl Ether (TGB) | 110 g/liter |
| 2-Pyrrolidone (PRD) | 60 g/liter |

-continued

| | |
|---|---|
| Triethanolamine (TEA) | 7 g/liter |
| Surfynol STG (SW) | 10 g/liter |

Cyan Dye (C-1):

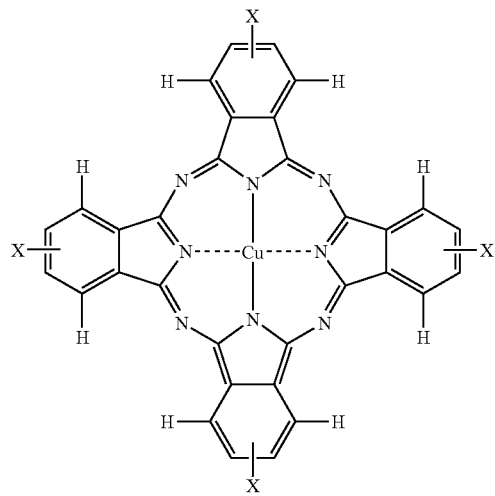

X = A or B

A: SO$_2$(CH$_2$)$_3$SO$_3$Li

B: SO$_2$(CH$_2$)$_3$SO$_2$NHCH$_2$CH(CH$_3$)OH

C-1: A/B = 75/25

(Formulation of Cyan Ink)

| (Solid Components) | |
|---|---|
| Cyan Dye (C-1) | 60 g/liter |
| Urea (UR) | 30 g/liter |
| Benzotriazole (BTZ) | 0.08 g/liter |
| Proxel XL2 (PXL) | 3.5 g/liter |
| (Liquid Components) | |
| Triethylene Glycol (TEG) | 110 g/liter |
| Glycerin (GR) | 130 g/liter |
| Triethylene Glycol Monobutyl Ether (TGB) | 130 g/liter |
| 2-Pyrrolidone (PRD) | 60 g/liter |
| Triethanolamine (TEA) | 7 g/liter |
| Surfynol STG (SW) | 10 g/liter |

(Formulation of Yellow Ink)

| (Solid Components) | |
|---|---|
| Yellow Dye (Y-1) | 35 g/liter |
| Proxel | 3.5 g/liter |
| Benzotriazole (BTZ) | 0.08 g/liter |
| Urea | 10 g/liter |
| (Liquid Components) | |
| Triethylene Glycol Monobutyl Ether (TGB) | 130 g/liter |
| Glycerin (GR) | 115 g/liter |
| Diethylene Glycol (DEG) | 120 g/liter |
| 2-Pyrrolidone (PRD) | 35 g/liter |

-continued

| | |
|---|---|
| Triethanolamine (TEA) | 8 g/liter |
| Surfynol STG (SW) | 10 g/liter |

Yellow Dye (Y-1)

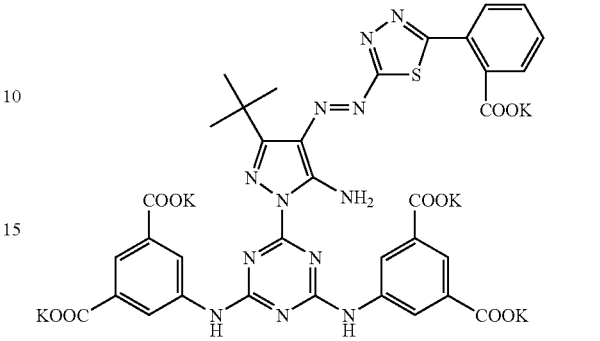

(Formulation of Dark Yellow Ink)

| (Solid Components) | |
|---|---|
| Yellow Dye (Y-1) | 35 g/liter |
| Magenta Dye (M-1) | 2 g/liter |
| Cyan Dye (C-1) | 2 g/liter |
| Proxel | 5 g/liter |
| Benzotriazole (BTZ) | 0.08 g/liter |
| Urea | 10 g/liter |
| (Liquid Components) | |
| Triethylene Glycol Monobutyl Ether (TGB) | 140 g/liter |
| Glycerin (GR) | 125 g/liter |
| Diethylene Glycol (DEG) | 120 g/liter |
| 2-Pyrrolidone | 35 g/liter |
| Triethanolamine (TEA) | 8 g/liter |
| Surfynol STG (SW) | 10 g/liter |

(Formulation of Black Ink)

| (Solid Components) | |
|---|---|
| Black Dye (Bk-1) | 75 g/liter |
| Black Dye (Bk-2) | 30 g/liter |
| Proxel | 5 g/liter |
| Urea | 10 g/liter |
| Benzotriazole | 3 g/liter |
| (Liquid Components) | |
| Diethylene Glycol Monobutyl Ether (DGB) | 120 g/liter |
| Glycerin (GR) | 125 g/liter |
| Diethylene Glycol (DEG) | 100 g/liter |
| 2-Pyrrolidone | 35 g/liter |
| Triethanolamine (TEA) | 8 g/liter |
| Surfynol STG (SW) | 10 g/liter |

Black Dye (Bk-1):

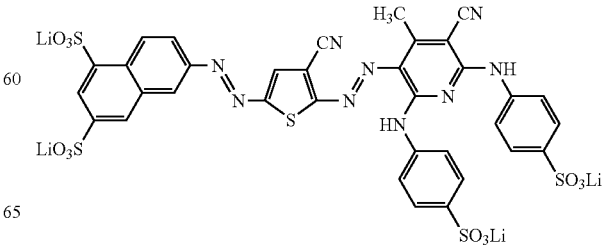

Black Dye (Bk-2):

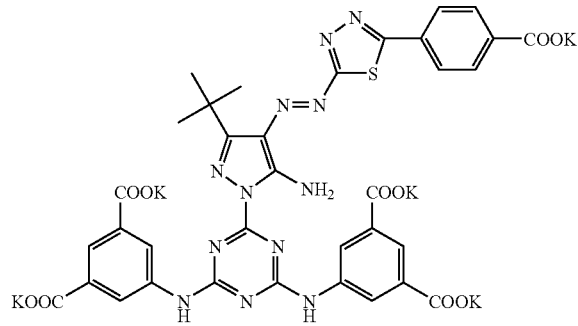

An ink set of these inks was prepared. This is IS-301. Other ink sets IS-302 to IS-308 were prepared in the same manner as herein, in which, however, the magenta dye in the magenta ink and the light magenta ink was changed as in the following Table.

The dyes M-1, M-2 and M-3 used herein all have an oxidation potential over 1.0 V (vs SCE).

TABLE 12

| | Light Magenta Ink | Magenta Ink |
|---|---|---|
| IS-301 (comparison) | M-1 8 g/liter | M-1 28 g/liter |
| IS-302 (comparison) | M-2 20 g/liter | M-2 60 g/liter |
| IS-303 (comparison) | M-3 9 g/liter | M-3 30 g/liter |
| IS-304 (the invention) | M-2 20 g/liter | M-2 20 g/liter M-3 20 g/liter |
| IS-305 (the invention) | M-2 20 g/liter | M-1 7 g/liter M-2 15 g/liter M-3 15 g/liter |
| IS-306 (the invention) | M-3 9 g/liter | M-2 20 g/liter M-3 20 g/liter |
| IS-307 (the invention) | M-2 8 g/liter M-3 7.5 g/liter | M-1 7 g/liter M-2 15 g/liter M-3 15 g/liter |
| IS-308 (the invention) | M-2 13.5 g/liter M-3 6 g/liter | M-2 20 g/liter M-3 20 g/liter |

M-2:

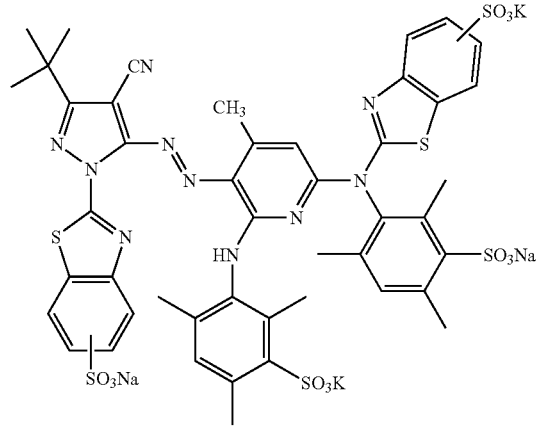

TABLE 12-continued

| Light Magenta Ink | Magenta Ink |
|---|---|

M-3:

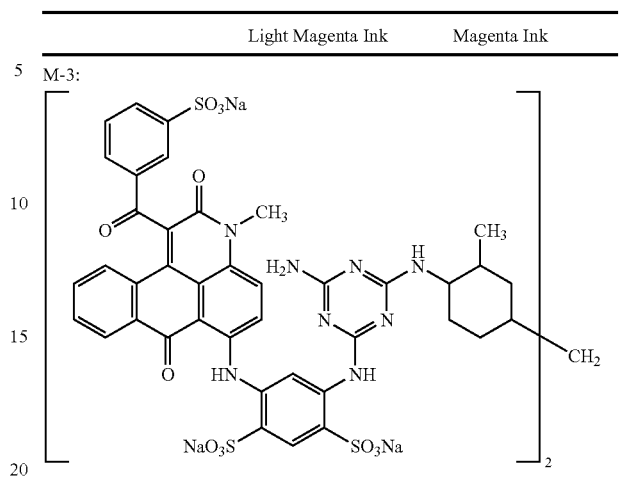

These inks were charged in ink cartridges of Epson's inkjet printer PM-980C. The printer was driven to print a stepwise density-varying image pattern of 6 colors C, M, Y, B, G and R and gray on an image-receiving sheet.

The image-receiving sheet used herein is Fuji Photo Film's inkjet paper, photo-glossy paper "Gasai".

(Evaluation Tests)

1) The jet-out stability test is as follows:

The cartridges are set in the printer, and inks are jetted out through the respective nozzles. With that, 100 sheets of A4-size paper are printed, and evaluated according to the following criteria:

A: No print disorder is found from the start to the end of the printing operation.

B: Some print disorder is found.

C: Print disorder is found throughout the printing operation.

2) The image storability of magenta gradation images is evaluated as follows:

(1) The light fastness is evaluated as follows: The image density Ci of the fresh sample just after printed is measured with X-Rite 310. Then, the printed image is exposed to xenon light (85,000 lux) from Atlas' weather meter for 20 days, and then its image density Cf is measured. The dye retentiveness is obtained from {(Cf/Ci)×100}, and this indicates the light fastness of the printed sample. Regarding the dye retentiveness, three points having a reflection density of 1, 1.5 and 2 are analyzed in every sample. The samples having a dye retentiveness of at least 70% at every point are "A"; those having a dye retentiveness of less than 70% at two points are "B"; and those having a dye retentiveness of less than 70% at all three points are "C".

(2) The ozone resistance is evaluated as follows: The printed samples are kept in a box having a constant ozone gas concentration of 5 ppm, for 7 days. Before and after exposure to ozone gas, the image density of each sample is measured with a reflection densitometer (X-Rite 310TR), and the dye retentiveness in every sample is determined. Regarding the dye retentiveness, three points having a reflection density of 1, 1.5 and 2 are analyzed in every sample. The ozone gas concentration in the box is kept constant by the use of an ozone gas monitor (Applics' Model OZG-EM-01).

Thus tested, the samples are grouped into three ranks: Those having a dye retentiveness of at least 70% at every point are "A"; those having a dye retentiveness of less than 70% at one or two points are "B"; and those having a dye retentiveness of less than 70% at all three points are "C".

(3) The image bleeding resistance under high-humidity condition is evaluated as follows: Four magenta square of 3 cm×3 cm each are patterned with a white line distance of 1 mm therebetween to form a print pattern of "田". The image sample is kept under a condition of 25° C. and 90% RH for 72 hours, and the bleeding of the magenta dye in the white line distance is checked through a status A magenta filter. This is compared with the bleeding in fresh samples just after printed. When the magenta density increase in the white line distance after the storage is less than 0.01, then the samples are "A"; when it is from 0.01 to 0.05, then the samples are "B"; and when it is over 0.05, then the samples are "C".

The results are given below.

TABLE 13

| Ink Set No. | Jet-Out Stability | Light Fastness | Ozone Resistance | Bleeding |
|---|---|---|---|---|
| PM-980C (comparison) | A | C | C | B |
| IS-301 (comparison) | A | C | C | A |
| IS-302 (comparison) | C | B | A | A |
| IS-303 (comparison) | A | A | A | C |
| IS-304 (the invention) | A | A | A | A |
| IS-305 (the invention) | A | A | A | A |
| IS-306 (the invention) | A | A | A | A |
| IS-307 (the invention) | A | A | A | A |
| IS-308 (the invention) | A | A | A | A |

The results as above well support the effect of the invention.

Example 6

Ultrapure water (resistance, at least 18 MΩ) was added to the components shown below to make one liter, and then stirred under heat at 30 to 40° C. for 1 hour. Next, the resulting mixture was filtered under reduced pressure through a microfilter having a mean pore size of 0.25 μm. Inks of different colors were thus prepared.

(Formulation of Photo Magenta Ink)

| (Solid Components) | |
|---|---|
| Magenta Dye (M-1) | 5 g/liter |
| Urea (OR) | 10 g/liter |
| Proxel | 5 g/liter |
| (Liquid Components) | |
| Triethylene Glycol (TEG) | 40 g/liter |
| Glycerin (GR) | 100 g/liter |
| Triethylene Glycol Monobutyl Ether (TGB) | 60 g/liter |
| 1,5-Pentanediol (PTD) | 40 g/liter |
| Isopropanol (IPA) | 20 g/liter |
| Triethanolamine (TEA) | 6.9 g/liter |
| Surfynol STG (SW) | 10 g/liter |

(Formulation of Magenta Ink)

| (Solid Components) | |
|---|---|
| Magenta Dye (M-1) | 15 g/liter |
| Urea (OR) | 15 g/liter |
| Proxel | 5 g/liter |
| (Liquid Components) | |
| Triethylene Glycol (TEG) | 50 g/liter |
| Glycerin (GR) | 100 g/liter |
| Triethylene Glycol Monobutyl Ether (TGB) | 50 g/liter |
| 1,5-Pentanediol (PTD) | 40 g/liter |
| Isopropanol (IPA) | 20 g/liter |
| Triethanolamine | 6.9 g/liter |
| Surfynol STG | 10 g/liter |

(Formulation of Photo Cyan Ink)

| (Solid Components) | |
|---|---|
| Cyan Dye (C-1) | 10 g/liter |
| Urea (UR) | 15 g/liter |
| Benzotriazole (BTZ) | 0.08 g/liter |
| Proxel XL2 (PXL) | 3.5 g/liter |
| (Liquid Components) | |
| Triethylene Glycol (TEG) | 50 g/liter |
| Glycerin (GR) | 100 g/liter |
| Triethylene Glycol Monobutyl Ether (TGB) | 60 g/liter |
| 1,5-pentanediol (PTD) | 40 g/liter |
| Isopropanol (IPA) | 20 g/liter |
| Triethanolamine (TEA) | 7 g/liter |
| Surfynol STG (SW) | 10 g/liter |

(Formulation of Cyan Ink)

| (Solid Components) | |
|---|---|
| Cyan Dye (C-1) | 30 g/liter |
| Urea (UR) | 40 g/liter |
| Benzotriazole (BTZ) | 0.08 g/liter |
| Proxel XL2 (PXL) | 3.5 g/liter |
| (Liquid Components) | |
| Triethylene Glycol (TEG) | 40 g/liter |
| Glycerin (GR) | 100 g/liter |
| Triethylene Glycol Monobutyl Ether (TGB) | 70 g/liter |
| 1,5-Pentanediol (PTD) | 50 g/liter |
| Isopropanol (IPA) | 20 g/liter |
| Triethanolamine (TEA) | 7 g/liter |
| Surfynol STG (SW) | 10 g/liter |

(Formulation of Yellow Ink)

| (Solid Components) | |
|---|---|
| Yellow Dye (Y-1) | 35 g/liter |
| Proxel | 3.5 g/liter |
| Benzotriazole (BTZ) | 0.08 g/liter |
| Urea | 10 g/liter |
| (Liquid Components) | |
| Triethylene Glycol (TEG) | 40 g/liter |
| Glycerin (GR) | 100 g/liter |
| Triethylene Glycol Monobutyl Ether (TGB) | 70 g/liter |
| 1,5-Pentanediol (PTD) | 60 g/liter |
| Isopropanol (IPA) | 20 g/liter |
| Triethanolamine (TEA) | 8 g/liter |
| Surfynol STG (SW) | 10 g/liter |

(Formulation of Black Ink)

| (Solid Components) | |
| --- | --- |
| Black Dye (Bk-1) | 75 g/liter |
| Black Dye (Bk-2) | 30 g/liter |
| Proxel | 5 g/liter |
| Urea | 10 g/liter |
| Benzotriazole | 3 g/liter |
| (Liquid Components) | |
| Triethylene Glycol (TEG) | 60 g/liter |
| Glycerin (GR) | 100 g/liter |
| Triethylene Glycol Monobutyl Ether (TGB) | 70 g/liter |
| 1,5-Pentanediol (PTD) | 50 g/liter |
| Isopropanol (IPA) | 20 g/liter |
| Triethanolamine (TEA) | 8 g/liter |
| Surfynol STG (SW) | 10 g/liter |

An ink set of these inks was prepared. This is IS-401. Other ink sets IS-402 to IS-408 were prepared in the same manner as herein, in which, however, the dyes in the magenta ink and the photo magenta ink were changed as in the following Table.

TABLE 14

| | Photo Magenta Ink | | Magenta Ink | |
| --- | --- | --- | --- | --- |
| IS-401 (comparison) | M-1 | 5 g/liter | M-1 | 15 g/liter |
| IS-402 (comparison) | M-2 | 15 g/liter | M-2 | 45 g/liter |
| IS-403 (comparison) | M-3 | 5 g/liter | M-3 | 15 g/liter |
| IS-404 (the invention) | M-2 | 15 g/liter | M-2 | 15 g/liter |
| | | | M-3 | 10 g/liter |
| IS-405 (the invention) | M-2 | 15 g/liter | M-1 | 5 g/liter |
| | | | M-2 | 15 g/liter |
| | | | M-3 | 5 g/liter |
| IS-406 (the invention) | M-3 | 5 g/liter | M-2 | 15 g/liter |
| | | | M-3 | 10 g/liter |
| IS-407 (the invention) | M-2 | 5 g/liter | M-1 | 7 g/liter |
| | M-3 | 4 g/liter | M-2 | 15 g/liter |
| | | | M-3 | 15 g/liter |
| IS-408 (the invention) | M-2 | 10 g/liter | M-2 | 15 g/liter |
| | M-3 | 2 g/liter | M-3 | 10 g/liter |

These inks were charged in ink cartridges of Canon's inkjet printer PIXUS9501. The printer was driven to print a stepwise density-varying image pattern of 6 colors C, M, Y, B, G and R and gray on an image-receiving sheet.

The image-receiving sheet used herein is Fuji Photo Film's inkjet paper, photo-glossy paper "Gasai".

The image fastness and the ink jet-out stability were evaluated in the same manner as in Example 5.

The results are given below.

TABLE 15

| Ink Set No. | Jet-Out Stability | Light Fastness | Ozone Resistance | Bleeding |
| --- | --- | --- | --- | --- |
| PIXUS950i (comparison) | A | C | C | A |
| IS-401 (comparison) | A | C | C | A |
| IS-402 (comparison) | C | B | A | A |
| IS-403 (comparison) | A | A | A | C |
| IS-404 (the invention) | A | A | A | A |
| IS-405 (the invention) | A | A | A | A |
| IS-406 (the invention) | A | A | A | A |
| IS-407 (the invention) | A | A | A | A |
| IS-408 (the invention) | A | A | A | A |

The results as above well support the effect of the invention.

The present invention has been explained in detail and by referring to specific embodiments, but it will be apparent for those skilled in the art that various modification and alterations can be added within the scope and spirit of the invention.

This application is based on Japanese Patent Application Nos. JP2003-363727, JP2003-363728 and JP2003-363883, all filed on Oct. 23, 2003, the contents of which is incorporated herein by reference.

INDUSTRIAL APPLICABILITY

The invention is applicable to inkjet recording method without specifically defined. For example, employable is any of a charge control system of jetting out ink through electrostatic attractive force; a drop-on-demand system (pressure pulse system) of using the oscillation pressure of a piezoelectric device; an acoustic inkjet system of converting an electric signal into an acoustic beam, applying it to ink, and jetting out the ink under radiation pressure; or a thermal inkjet (bubble jet) system of heating ink to form bubbles and utilizing the resulting pressure.

The invention claimed is:

1. A yellow ink for inkjet recording, which comprises:
   an aqueous medium; and
   at least two dyes, wherein the at least two dyes each independently has: a $\lambda$max of from 390 nm to 470 nm; a ratio of I ($\lambda$max+70 nm) to I ($\lambda$max) of 0.4 or less, wherein I($\lambda$max+70 nm) represents an absorbance at a wavelength of $\lambda$max+70 nm and I($\lambda$max) represents an absorbance at a wavelength of $\lambda$max; and an oxidation potential higher than 1.0 V versus SCE, and
   wherein at least one of the at least two dyes is a dye represented by formula (Y1):

$(A_{11}-N{=}N-B_{11})n\text{-}L$ wherein
   $A_{11}$ and $B_{11}$ each independently represents a heterocyclic group that may be substituted; n is 1 or 2; and L represents a hydrogen atom, a monovalent substituent, a single bond, or
   a divalent linking group,
   provided that when n is 1, L is a hydrogen atom or a monovalent substituent, and $A_{11}$ and $B_{11}$ are both monovalent heterocyclic groups; and when n is 2, L is a single bond or a
   divalent linking group, $A_{11}$ is a monovalent heterocyclic group, and $B_{11}$ is a divalent heterocyclic group; and
   wherein at least one of the at least two dyes is a dye represented by formulae (Y2) or (Y3):

$$P-N{=}N\text{-}Q \qquad (Y2)$$

wherein, P represents an aryl group that may be substituted; and Q represents a heterocyclic group that may be substituted, $$X-N{=}N-Y \qquad (Y3)$$

wherein, X and Y each represents an aryl group that may be substituted.

2. The yellow ink for inkjet recording according to claim 1, wherein a content of the dye represented by formula (Y1) is 50% or more by weight with respect to total amount of all dyes in the yellow ink.

3. A black ink for inkjet recording, which comprises:
   an aqueous medium; and
   at least two dyes, wherein the at least two dyes each independently has: a $\lambda$max of from 500 nm to 700 nm; and a half-value width of 100 nm or more in an absorption spectrum of a diluted solution, the absorption spectrum being standardized to have an absorbance of 1.0 at the λmax,
wherein at least one of the at least two dyes has an oxidation potential higher than 1.0 V versus SCE.

4. The black ink for inkjet recording according to claim 3, which further comprises a dye having a λmax of from 350 nm to 500 nm.

5. The black ink for inkjet recording according to claim 3, wherein at least one dye is a compound represented formula (B1):

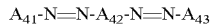

wherein $A_{41}, A_{42}$ and $A_{43}$ each independently represents an aromatic group or a heterocyclic group that may be substituted; $A_{41}$ and $A_{43}$ are monovalent groups; and $A_{42}$ is a divalent group.

6. The black ink for inkjet recording according to claim 3, wherein at least one dye is a compound represented by formula (B2):

P—(N═N-Q$x$)$y$-N—N—R wherein P, Q and R each represent an aromatic group that may be substituted; x is an integer of 1 or more; and y is an integer of 0 or more.

7. The black ink for inkjet recording according to claim 6, wherein Q in formula (B2) is a polycyclic aromatic ring.

8. The black ink for inkjet recording according to claim 4, wherein the dye having the λmax of from 350 nm to 500 nm a compound represented by formula (B1):

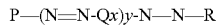   (B1)

wherein $A_{43}, A_{42}$ and $A_{43}$ each independently represents an aromatic group or a heterocyclic group that may be substituted; $A_{41}$ and $A_{43}$ are monovalent groups; and $A_{42}$ is a divalent group.

9. A magenta ink for inkjet recording, which comprises: a first dye; and a second dye having a different structure from the first dye, the first dye and the second dye each independently having an oxidation potential higher than 1.0 V versus SCE,
wherein the first dye is an azo dye comprising an azo group, each end of the azo group having a hetero ring; and the second dye is an anthrapyridone dye.

10. The magenta ink for inkjet recording according to claim 9, wherein the azo dye is a compound represented by formula (M1):

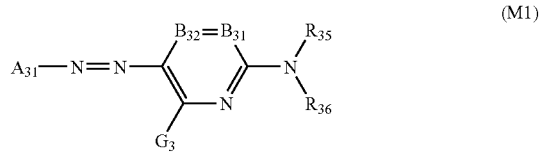

wherein
$A_{31}$ represents a 5-membered heterocyclic ring;
$B_{31}$ and $B_{32}$ each represents ═CR$_{31}$— or —CR$_{32}$═, or either one of $B_{31}$ and $B_{32}$ represents a nitrogen atom while the other one represents ═CR$_{31}$— or —CR$_{32}$═;
$R_{35}$ and $R_{36}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group,
$G_3, R_{31}$ and $R_{32}$ each independently represents a hydrogen tom, a halogen atom, an aliphatic group, an aromatic group, heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an arylamino group, a heterocyclic amino group, an acylamino group, an ureido group, a sulfamoylamino group, an alkoxvoarbonylamino group, an aryloxycarbonylamino group, an alkylsulfonylamino group, an arylsulfonylamino group, a heterocyclic sulfonylamino group, a nitro group, an alkylthio group, an arylthio group, an alkylsulfonyl group, an arylsulfonyl group, a heterocyclic sulfonyl group, an alkylsulfinyl group, an aryl sulfinyl group, a heterocyclic sulfinyl group, a sulfamoyl group, a sulfo group or a heterocyclic thio group, each of which may be further substituted; and
$R_{31}$, and $R_{35}$, or $R_{35}$ and $R_{36}$ may be bonded to form a 5- or 6-membered ring.

11. The magenta ink for inkjet recording according to claim 9, wherein the anthrapyridone dye is a compound represented by formula (M2):

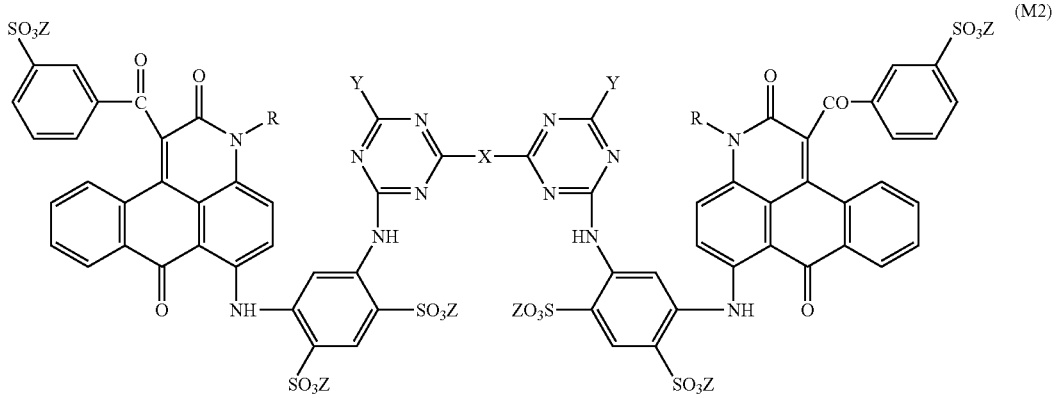

wherein

R represents a hydrogen atom, an alkyl group, a hydroxy-lower alkyl group, a cyclohexyl group, a mono or dialkylaminoalkyl group, or a cyano-lower alkyl group;

Y represents a chlorine atom; a hydroxyl group; an amino group; a mono or dialkylamino group in which the alkyl moiety may have a substituent selected from the group consisting of a sulfonic acid group, a carboxyl group and a hydroxyl group; an aralkylamino group; a cycloalkylamino group; an alkoxy group; a phenoxy group in which the benzene ring may have a substituent selected from the group consisting of a sulfonic acid group, a carboxyl group, an acetylamino group, an amino group and a hydroxyl group; an anilino group that may have one or two substituents selected from the group consisting of a sulfonic acid group and a carboxyl group; a naphthylamino group in which the naphthyl group may be substituted with a sulfonic acid group; or a mono or dialkylaminoalkylamino group;

X represents a crosslinking group; and

Z represents a hydrogen atom, an alkali metal element, an alkaline earth metal element, an alkylamino group, an alkanolamino group, or an ammonium group.

12. An ink set for inkjet recording, which comprises at least one of:

yellow ink, comprising:
an aqueous medium; and
at least two dyes, wherein the at least two dyes each independently has: a λmax of from 390 nm to 470 nm; a ratio of I (λmax+70 nm) to I (λmax) of 0.4 or less, wherein I(λmax+70 nm) represents an absorbance at a wavelength of λmax+70 nm and I(λmax) represents an absorbance at a wavelength of λmax; and an oxidation potential higher than 1.0 V versus SCE,
wherein at least one of the at least two dyes is a dye represented by formula (Y1):

$(A_{11}-N=N-B_{11})_n-L$ wherein $A_{11}$ and $B_{11}$ each independently represents a heterocyclic group that may be substituted; n is 1 or 2; and L represents a hydrogen atom, a monovalent substituent, a single bond, or a divalent linking group, provided that when n is 1, L is a hydrogen atom or a monovalent substituent, and $A_{11}$ and $B_{11}$ are both monovalent heterocyclic groups;
and when n is 2, L is a single bond, or a divalent linking group, $A_{11}$ is a monovalent heterocyclic group, and $B_{11}$ is a divalent heterocyclic group;

a black ink, comprising:
an aqueous medium; and
at least two dyes, wherein the at least two dyes each independently has: a λmax of from 500 nm to 700 nm; and a half-value width of 100 nm or more in an absorption spectrum of a diluted solution, the absorption spectrum being standardized to have an absorbance of 1.0 at the λmax,
wherein at least one of the at least two dyes has an oxidation potential higher than 1.0 V versus SCE; and a magenta ink, comprising:
a first dye; and a second dye having a different structure from the first dye, the first dye and the second dye each independently having an oxidation potential higher than 1.0 V versus SCE,
wherein the first dye is an azo dye comprising an azo group, each end of the azo group having a hetero ring.

13. An ink set for inkjet recording, which comprises at least two magenta inks each independently comprising a dye having an oxidation potential higher than 1.0 V versus SCE, wherein at least one of the at least two magenta inks comprises a dye represented by formula (M2):

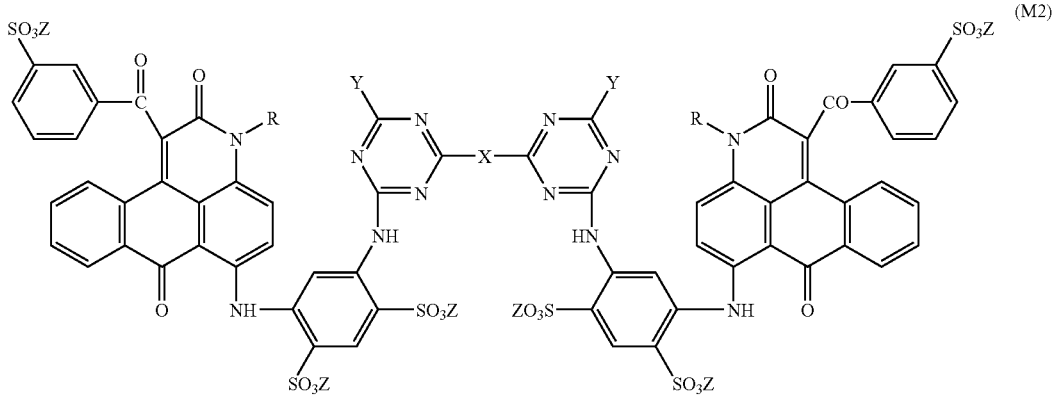

wherein,

R represents a hydrogen atom, an alkyl group, a hydroxy-lower alkyl group, a cyclohexyl group, a mono or dialkylaminoalkyl group, or a cyano-lower alkyl group;

Y represents a chlorine atom; a hydroxyl group; an amino group; a mono or dialkylamino group in which the alkyl moiety may have a substituent selected from the group consisting of a sulfonic acid group, a carboxyl group and a hydroxyl group; an aralkylamino group; a cycloalkylamino group; an alkoxy group; a phenoxy group in which the benzene ring may have a substituent selected from the group consisting of a sulfonic acid group, a carboxyl group, an acetylamino group, an amino group and a hydroxyl group; an anilino group that may have one or two substituents selected from the group consisting of a sulfonic acid group and a carboxyl group; a naphthylamino group in which the naphthyl group may be substituted with a sulfonic acid group; or a mono or dialkylaminoalkylamino group;

X represents a crosslinking group; and

Z represents a hydrogen atom, an alkali metal element, an alkaline earth metal element, an alkylamino group, an alkanolamino group, or an ammonium group; wherein one magenta ink comprises an azo dye comprising: an azo group; and hetero rings bonding to both ends of the azo group, and the other magenta ink comprises a dye having a structure other than the azo dye.

14. The ink set for inkjet recording according to claim 13, wherein at least one of the at least two magenta inks comprises a dye represented by formula (M1):

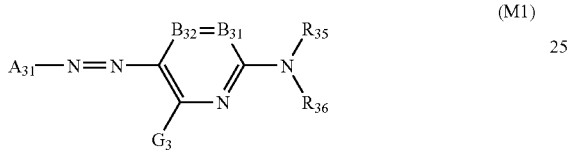

(M1)

wherein, $A_{31}$ represents a 5-membered heterocyclic ring;

$B_{31}$ and $B_{32}$ each represents $=CR_{31}$— or —$CR_{32}=$, or either one of $B_{31}$ and $B_{32}$ represents a nitrogen atom while the other one represents $=CR_{31}$— or —$CR_{32}=$;

$R_{35}$ and $R_{36}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, $G_3$, $R_{31}$ and $R_{32}$ each independently represents a hydrogen tom, a halogen atom, an aliphatic group, an aromatic group, heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an arylamino group, a heterocyclic amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, an alkylsulfonyl group, an arylsulfonyl group, a heterocyclic sulfonyl group, an alkylsulfinyl group, an aryl sulfinyl group, a heterocyclic sulfinyl group, a sulfamoyl group, a sulfo group or a heterocyclic thio group, each of which may be further substituted; and $R_{31}$ and $R_{35}$ and $R_{36}$ may be bonded to form a 5- or 6-membered ring.

15. An ink set for inkjet recording which comprises at least two magenta inks each independently comprising a dye having an oxidation potential higher than 1.0 V versus SCE, wherein one magenta ink comprises an azo dye comprising: an azo group; and hetero rings bonding to both ends of the azo group, and the other magenta ink comprises a dye having a structure other than the azo dye, and wherein at least one of the at least two magenta inks comprises: a dye represented by formula (M1):

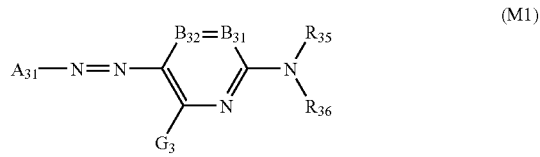

(M1)

wherein, $A_{31}$ represents a 5-membered heterocyclic ring;

$B_{31}$ and $B_{32}$ each represents $=CR_{31}$— or —$CR_{32}=$, or either one of $B_{31}$ and $B_{32}$ represents a nitrogen atom while the other one represents $=CR_{31}$— or —$CR_{32}=$;

$R_{35}$ and $R_{36}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, $G_3$, $R_{31}$ and $R_{32}$ each independently represents a hydrogen tom, a halogen atom, an aliphatic group, an aromatic group, heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an arylamino group, a heterocyclic amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, an alkylsulfonyl group, an arylsulfonyl group, a heterocyclic sulfonyl group, an alkylsulfinyl group, an aryl sulfinyl group, a heterocyclic sulfinyl group, a sulfamoyl group, a sulfo group or a heterocyclic thio group, each of which may be further substituted; and $R_{31}$ and $R_{35}$, or $R_{35}$ and $R_{36}$ may be bonded to form a 5- or 6-membered ring; and a dye represented by formula (M2):

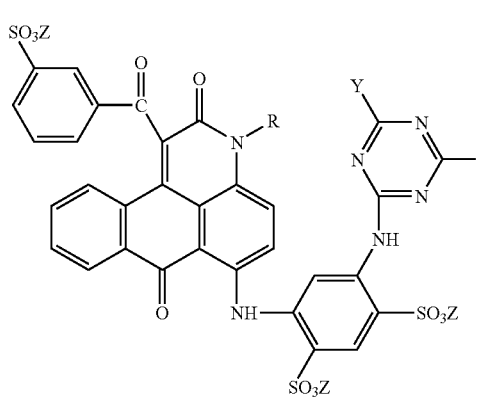 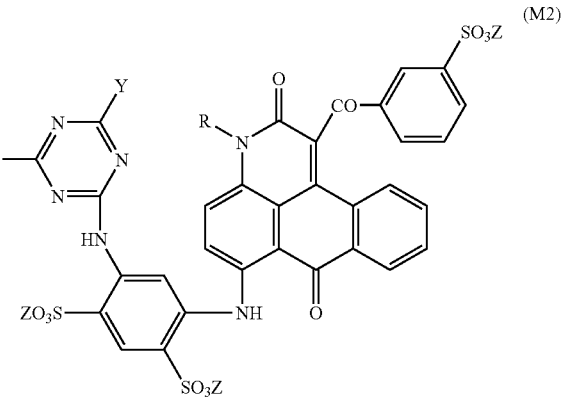

(M2)

wherein,

R represents a hydrogen atom, an alkyl group, a hydroxy-lower alkyl group, a cyclohexyl group, a mono or dialkylaminoalkyl group, or a cyano-lower alkyl group;

Y represents a chlorine atom; a hydroxyl group; an amino group; a mono or dialkylamino group in which the alkyl moiety may have a substituent selected from the group consisting of a sulfonic acid group, a carboxyl group and a hydroxyl group; an aralkylamino group; a cycloalkylamino group; an alkoxy group; a phenoxy group in which the benzene ring may have a substituent selected from the group consisting of a sulfonic acid group, a carboxyl group, an acetylamino group, an amino group and a hydroxyl group; an anilino group that may have one or two substituents selected from the group consisting of a sulfonic acid group and a carboxyl group; a naphthylamino group in which the naphthyl group may be substituted with a sulfonic acid group; or a mono or dialkylaminoalkylamino group;

X represents a crosslinking group; and

Z represents a hydrogen atom, an alkali metal element, an alkaline earth metal element, an alkylamino group, an alkanolamino group, or an ammonium group.

* * * * *